(12) United States Patent
Zhang et al.

(10) Patent No.: US 10,845,463 B2
(45) Date of Patent: Nov. 24, 2020

(54) METHOD, APPARATUS, AND SYSTEM FOR WIRELESS OBJECT SCANNING

(71) Applicant: ORIGIN WIRELESS, INC., Greenbelt, MD (US)

(72) Inventors: Feng Zhang, Greenbelt, MD (US); Chenshu Wu, Greenbelt, MD (US); Beibei Wang, Clarksville, MD (US); K. J. Ray Liu, Potomac, MD (US); Oscar Chi-Lim Au, San Jose, CA (US)

(73) Assignee: ORIGIN WIRELESS, INC., Greenbelt, MD (US)

( * ) Notice: Subject to any disclaimer, the term of this patent is extended or adjusted under 35 U.S.C. 154(b) by 0 days.

(21) Appl. No.: 16/798,337

(22) Filed: Feb. 22, 2020

(65) Prior Publication Data

US 2020/0191913 A1 Jun. 18, 2020

Related U.S. Application Data

(63) Continuation-in-part of application No. 16/790,627, filed on Feb. 13, 2020, and a continuation-in-part of application No. 16/790,610, filed on Feb. 13, 2020, and a continuation-in-part of application No. 16/667,648, filed on Oct. 29, 2019, and a continuation of application No. 16/667,757, filed on Oct. 29, 2019, (Continued)

(51) Int. Cl.
*G01S 13/00* (2006.01)
*G01S 7/41* (2006.01)
*G01S 7/00* (2006.01)

(52) U.S. Cl.
CPC ............. *G01S 7/412* (2013.01); *G01S 7/006* (2013.01); *G01S 7/415* (2013.01); *G01S 13/003* (2013.01)

(58) Field of Classification Search
CPC .......... G01S 7/412; G01S 7/006; G01S 7/415; G01S 13/003
See application file for complete search history.

(56) References Cited

U.S. PATENT DOCUMENTS 9,551,758 B2 * 1/2017 Bourilkov ............ G01R 31/385
2012/0319819 A1 * 12/2012 Tkachenko ........... G01S 13/878
340/10.1

(Continued)

*Primary Examiner* — Timothy A Brainard

(57) ABSTRACT

Methods, apparatus and systems for wireless object scanning are described. In one example, a described wireless scanning system comprises: a transmitter, a receiver, and a processor. The transmitter is configured for transmitting a first wireless signal using a plurality of transmit antennas towards an object in a venue through a wireless multipath channel of the venue. The receiver is configured for: receiving a second wireless signal using a plurality of receive antennas through the wireless multipath channel between the transmitter and the receiver. The second wireless signal differs from the first wireless signal due to the wireless multipath channel and a modulation of the first wireless signal by the object. The processor is configured for obtaining a set of channel information (CI) of the wireless multipath channel based on the second wireless signal received by the receiver, and generating an imaging of the object based on the set of CI. Each CI in the set is associated with a respective one of the plurality of transmit antennas and a respective one of the plurality of receive antennas.

30 Claims, 11 Drawing Sheets

100

Related U.S. Application Data and a continuation-in-part of application No. 16/446,589, filed on Jun. 19, 2019, and a continuation-in-part of application No. 16/200,608, filed on Nov. 26, 2018, and a continuation-in-part of application No. 16/127,151, filed on Sep. 10, 2018, and a continuation-in-part of application No. 16/125,748, filed on Sep. 9, 2018, and a continuation-in-part of application No. 15/861,422, filed on Jan. 3, 2018, which is a continuation-in-part of application No. PCT/US2017/021963, filed on Mar. 10, 2017, which is a continuation-in-part of application No. PCT/US2017/015909, filed on Jan. 31, 2017, which is a continuation-in-part of application No. 15/326,112, filed as application No. PCT/US2015/041037 on Jul. 17, 2015.

(60) Provisional application No. 62/950,093, filed on Dec. 18, 2019, provisional application No. 62/902,357, filed on Sep. 18, 2019, provisional application No. 62/900,565, filed on Sep. 15, 2019, provisional application No. 62/873,781, filed on Jul. 12, 2019, provisional application No. 62/868,782, filed on Jun. 28, 2019, provisional application No. 62/849,853, filed on May 18, 2019, provisional application No. 62/846,686, filed on May 12, 2019, provisional application No. 62/846,688, filed on May 12, 2019.

(56) References Cited

U.S. PATENT DOCUMENTS

| | | | |
|---|---|---|---|
| 2013/0082858 A1* | 4/2013 | Chambers | G01V 3/15 342/22 |
| 2014/0313071 A1* | 10/2014 | McCorkle | G01S 7/28 342/202 |
| 2016/0213258 A1* | 7/2016 | Lashkari | G01S 15/8927 |

* cited by examiner

METHOD, APPARATUS, AND SYSTEM FOR WIRELESS OBJECT SCANNING

CROSS-REFERENCE TO RELATED APPLICATIONS

The present application is related to U.S. patent application with Ser. No. 16/798,343, entitled "METHOD, APPARATUS, AND SYSTEM FOR WIRELESS OBJECT TRACKING," filed on Feb. 22, 2020, which is expressly incorporated by reference herein in its entirety.

The present application hereby incorporates by reference the entirety of the disclosures of, and claims priority to, each of the following cases:
  (a) U.S. patent application Ser. No. 15/326,112, entitled "WIRELESS POSITIONING SYSTEMS", filed on Jan. 13, 2017,
    (1) which is a national stage entry of PCT patent application PCT/US2015/041037, entitled "WIRELESS POSITIONING SYSTEMS", filed on Jul. 17, 2015, published as WO 2016/011433A2 on Jan. 21, 2016,
  (b) U.S. patent application Ser. No. 16/127,151, entitled "METHODS, APPARATUS, SERVERS, AND SYSTEMS FOR VITAL SIGNS DETECTION AND MONITORING", filed on Sep. 10, 2018,
    (1) which is a continuation-in-part of PCT patent application PCT/US2017/021963, entitled "METHODS, APPARATUS, SERVERS, AND SYSTEMS FOR VITAL SIGNS DETECTION ANDMONITORING", filed on Mar. 10, 2017, published as WO2017/156492A1 on Sep. 14, 2017,
  (c) U.S. patent application Ser. No. 16/125,748, entitled "METHODS, DEVICES, SERVERS, APPARATUS, AND SYSTEMS FOR WIRELESS INTERNET OF THINGS APPLICATIONS", filed on Sep. 9, 2018,
    (1) which is a continuation-in-part of PCT patent application PCT/US2017/015909, entitled "METHODS, DEVICES, SERVERS, APPARATUS, AND SYSTEMS FOR WIRELESS INTERNET OF THINGS APPLICATIONS", filed on Jan. 31, 2017, published as WO2017/155634A1 on Sep. 14, 2017,
  (d) U.S. patent application Ser. No. 15/861,422, entitled "METHOD, APPARATUS, SERVER, AND SYSTEMS OF TIME-REVERSAL TECHNOLOGY", filed on Jan. 3, 2018,
  (e) U.S. patent application Ser. No. 16/200,608, entitled "METHOD, APPARATUS, SERVER AND SYSTEM FOR VITAL SIGN DETECTION AND MONITORING", filed on Nov. 26, 2018,
  (f) U.S. Provisional Patent application 62/846,686, entitled "METHOD, APPARATUS, AND SYSTEM FOR WIRELESS INERTIAL MEASUREMENT", filed on May 12, 2019,
  (g) U.S. Provisional Patent application 62/846,688, entitled "Method, Apparatus, and System for Processing and Presenting Life Log based on a Wireless Signal", filed on May 12, 2019,
  (h) U.S. Provisional Patent application 62/849,853, entitled "Method, Apparatus, and System for Wireless Artificial Intelligent in Smart Car", filed on May 18, 2019,
  (i) U.S. patent application Ser. No. 16/446,589, entitled "METHOD, APPARATUS, AND SYSTEM FOR OBJECT TRACKING AND SENSING USING BROADCASTING", filed on Jun. 19, 2019,
  (j) U.S. Provisional Patent application 62/868,782, entitled "METHOD, APPARATUS, AND SYSTEM FOR VITAL SIGNS MONITORING USING HIGH FREQUENCY WIRELESS SIGNALS", filed on Jun. 28, 2019,
  (k) U.S. Provisional Patent application 62/873,781, entitled "METHOD, APPARATUS, AND SYSTEM FOR IMPROVING TOPOLOGY OF WIRELESS SENSING SYSTEMS", filed on Jul. 12, 2019,
  (l) U.S. Provisional Patent application 62/900,565, entitled "QUALIFIED WIRELESS SENSING SYSTEM", filed on Sep. 15, 2019,
  (m) U.S. Provisional Patent application 62/902,357, entitled "METHOD, APPARATUS, AND SYSTEM FOR AUTOMATIC AND OPTIMIZED DEVICE-TO-CLOUD CONNECTION FOR WIRELESS SENSING", filed on Sep. 18, 2019,
  (n) U.S. patent application Ser. No. 16/667,648, entitled "METHOD, APPARATUS, AND SYSTEM FOR WIRELESS PROXIMITY AND PRESENCE MONITORING", filed on Oct. 29, 2019,
  (o) U.S. patent application Ser. No. 16/667,757, entitled "METHOD, APPARATUS, AND SYSTEM FOR HUMAN IDENTIFICATION BASED ON HUMAN RADIO BIOMETRIC INFORMATION", filed on Oct. 29, 2019,
  (p) U.S. Provisional Patent application 62/950,093, entitled "METHOD, APPARATUS, AND SYSTEM FOR TARGET POSITIONING", filed on Dec. 18, 2019,
  (q) U.S. patent application Ser. No. 16/790,610, entitled "METHOD, APPARATUS, AND SYSTEM FOR WIRELESS GAIT RECOGNITION", filed Feb. 13, 2020,
  (r) U.S. patent application Ser. No. 16/790,627, entitled "METHOD, APPARATUS, AND SYSTEM FOR OUTDOOR TARGET TRACKING", filed Feb. 13, 2020.

TECHNICAL FIELD

The present teaching generally relates to wireless object scanning. More specifically, the present teaching relates to scanning objects based on wireless channel information in a rich-scattering environment.

BACKGROUND

Wireless imaging based on radio frequency (RF) signals is a long-standing, challenging problem in the evolving community of wireless sensing. Given the ubiquity of wireless fidelity (WiFi), it is of particular interest to enable imaging using WiFi reflection signals, i.e., creating images of humans and objects without attaching any radio source to the target. It would enable pervasive human and object sensing with rich contexts, not only the location but also silhouette/shape, size, pose, etc., for new applications such as interactive gaming, pose estimation, exercise assessment, human recognition, etc., all in a privacy-preserving, lightweight and cost-effective way.

Despite advances in reusing WiFi devices for wireless sensing, such as activity sensing, gesture recognition, vital sign monitoring, etc., RF imaging faces significant challenges and remains unsolved. Prior works related to RF imaging on WiFi bands can track human motion and activities, map large obstacles, and detect malicious objects. But they require specialized hardware with large antennas unavailable on commodity radios or suffer from poor imaging quality. For example, when using WiFi radios with multiple antennas for object imaging, an existing system is inherently limited by WiFi signals at 2.4 GHz/5 GHz, and/or require multiple specialized frequency-modulated continuous wave (FMCW) radars with relatively large arrays. Generally, the imaging capability of 2.4 GHz/5 GHz WiFi is fundamentally limited by narrow bandwidth, small antenna number, and large wavelength. While existing millimeter-wave (mmWave) systems can offer imaging with large lens radars and dedicated circuits, they are all specialized radars and not suitable for ubiquitous applications.

SUMMARY

The present teaching generally relates to a wireless scanning system. In one embodiment, the present teaching relates to a super-resolution imaging system serving as a millimeter-wave camera on commodity 60 GHz WiFi devices. A novel super-resolution imaging algorithm is proposed based on multiple signal classification (MUSIC) with joint transmitter smoothing. Experiments show that the disclosed system achieves remarkable imaging performance for both humans and everyday objects, comparable to that of dedicated depth sensors like Kinect, and can image a person behind a thin drywall.

In one embodiment, a wireless scanning system is described. The wireless scanning system comprises: a transmitter, a receiver, and a processor. The transmitter is configured for transmitting a first wireless signal using a plurality of transmit antennas towards an object in a venue through a wireless multipath channel of the venue. The receiver is configured for: receiving a second wireless signal using a plurality of receive antennas through the wireless multipath channel between the transmitter and the receiver. The second wireless signal differs from the first wireless signal due to the wireless multipath channel and a modulation of the first wireless signal by the object. The processor is configured for obtaining a set of channel information (CI) of the wireless multipath channel based on the second wireless signal received by the receiver, and computing an imaging of the object based on the set of CI. Each CI in the set is associated with a respective one of the plurality of transmit antennas and a respective one of the plurality of receive antennas. According to various embodiments, the processor is physically coupled to at least one of the transmitter and the receiver.

In another embodiment, a described apparatus for wireless scanning is in a venue where a transmitter and a receiver are located. The described apparatus comprises: a processor and at least one of the transmitter and the receiver. The transmitter is configured for transmitting a first wireless signal using a plurality of transmit antennas towards an object in a venue through a wireless multipath channel of the venue. The receiver is configured for receiving a second wireless signal using a plurality of receive antennas through the wireless multipath channel between the transmitter and the receiver. The second wireless signal differs from the first wireless signal due to the wireless multipath channel and a modulation of the first wireless signal by the object. The processor is configured for: obtaining a set of channel information (CI) of the wireless multipath channel based on the second wireless signal, wherein each CI in the set is associated with a respective one of the plurality of transmit antennas and a respective one of the plurality of receive antennas; and computing an imaging of the object based on the set of CI.

In one embodiment, the apparatus includes the receiver but not the transmitter. The receiver receives the second wireless signal and extracts the CI, e.g. a channel state information (CSI), for performing the object scanning. In another embodiment, the apparatus includes the transmitter but not the receiver. The CSI is extracted by the receiver and obtained by the processor for object scanning. In still another embodiment, the apparatus includes the transmitter but not the receiver. The CSI is extracted at the receiver that sends the CSI to the transmitter. The object scanning is performed at the transmitter.

In a different embodiment, a method, implemented by a processor, a memory communicatively coupled with the processor, and a set of instructions stored in the memory to be executed by the processor, is described. The method comprises: obtaining a set of channel information (CI) of a wireless multipath channel of a venue, wherein: a transmitter transmits a first wireless signal using a plurality of transmit antennas towards an object in a venue through the wireless multipath channel of the venue, a receiver receives a second wireless signal using a plurality of receive antennas through the wireless multipath channel and computes the set of CI of the wireless multipath channel based on the second wireless signal, and the second wireless signal differs from the first wireless signal due to the wireless multipath channel and a modulation of the first wireless signal by the object; and computing an imaging of the object based on the set of CI.

Other concepts relate to software for implementing the present teaching on wireless object scanning in a rich-scattering environment. Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

BRIEF DESCRIPTION OF DRAWINGS

The methods, systems, and/or devices described herein are further described in terms of exemplary embodiments. These exemplary embodiments are described in detail with reference to the drawings. These embodiments are non-limiting exemplary embodiments, in which like reference numerals represent similar structures throughout the several views of the drawings.

DETAILED DESCRIPTION

Figure 1:
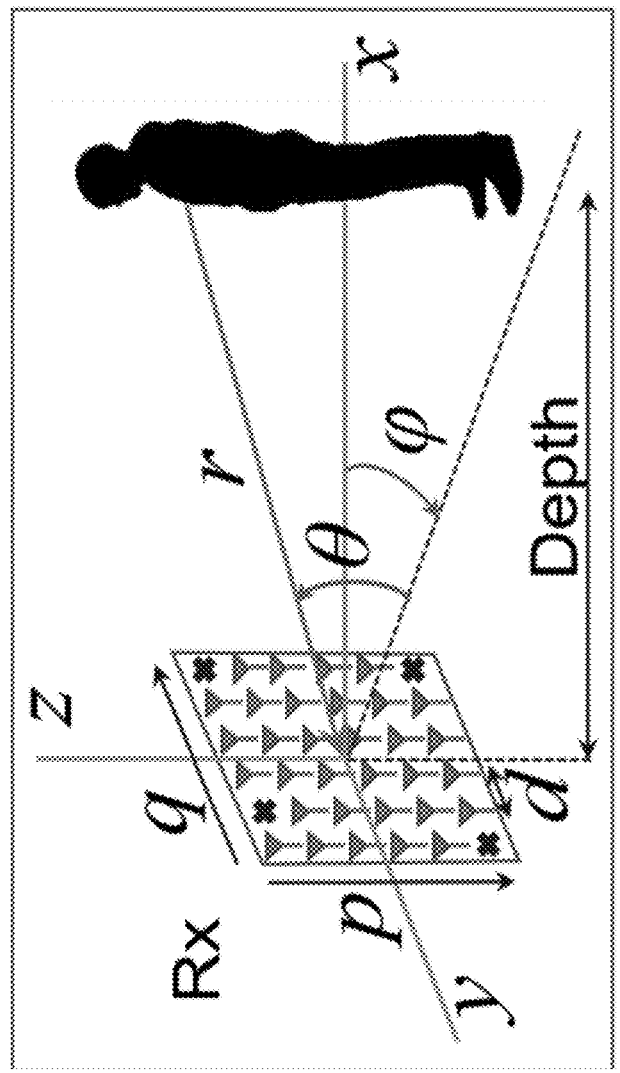
FIG. 1 illustrates an exemplary coordinate system for wireless object scanning, according to some embodiments of the present teaching.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

In one embodiment, the present teaching discloses a method, apparatus, device, system, and/or software (method/apparatus/device/system/software) of a wireless monitoring system. A time series of channel information (CI) of a wireless multipath channel (channel) may be obtained (e.g. dynamically) using a processor, a memory communicatively coupled with the processor and a set of instructions stored in the memory. The time series of CI (TSCI) may be extracted from a wireless signal (signal) transmitted between a Type 1 heterogeneous wireless device (e.g. wireless transmitter, TX) and a Type 2 heterogeneous wireless device (e.g. wireless receiver, RX) in a venue through the channel. The channel may be impacted by an expression (e.g. motion, movement, expression, and/or change in position/pose/shape/expression) of an object in the venue. A characteristics and/or a spatial-temporal information (STI, e.g. motion information) of the object and/or of the motion of the object may be monitored based on the TSCI. A task may be performed based on the characteristics and/or STI. A presentation associated with the task may be generated in a user-interface (UI) on a device of a user. The TSCI may be a wireless signal stream. The TSCI or each CI may be preprocessed. A device may be a station (STA). The symbol "A/B" means "A and/or B" in the present teaching.

The expression may comprise placement, placement of moveable parts, location, position, orientation, identifiable place, region, spatial coordinate, presentation, state, static expression, size, length, width, height, angle, scale, shape, curve, surface, area, volume, pose, posture, manifestation, body language, dynamic expression, motion, motion sequence, gesture, extension, contraction, distortion, deformation, body expression (e.g. head, face, eye, mouth, tongue, hair, voice, neck, limbs, arm, hand, leg, foot, muscle, moveable parts), surface expression (e.g. shape, texture, material, color, electromagnetic (EM) characteristics, visual pattern, wetness, reflectance, translucency, flexibility), material property (e.g. living tissue, hair, fabric, metal, wood, leather, plastic, artificial material, solid, liquid, gas, temperature), movement, activity, behavior, change of expression, and/or some combination.

The wireless signal may comprise: transmitted/received signal, EM radiation, RF signal/transmission, signal in licensed/unlicensed/ISM band, bandlimited signal, baseband signal, wireless/mobile/cellular communication signal, wireless/mobile/cellular network signal, mesh signal, light signal/communication, downlink/uplink signal, unicast/multicast/broadcast signal, standard (e.g. WLAN, WWAN, WPAN, WBAN, international, national, industry, defacto, IEEE, IEEE 802, 802.11/15/16, WiFi, 802.11n/ac/ax/be, 3G/4G/LTE/5G/6G/7G/8G, 3GPP, Bluetooth, BLE, Zigbee, RFID, UWB, WiMax) compliant signal, protocol signal, standard frame, beacon/pilot/probe/enquiry/acknowledgement/handshake/synchronization signal, management/control/data frame, management/control/data signal, standardized wireless/cellular communication protocol, reference signal, source signal, motion probe/detection/sensing signal, and/or series of signals. The wireless signal may comprise a line-of-sight (LOS), and/or a non-LOS component (or path/link). Each CI may be extracted/generated/computed/sensed at a layer (e.g. PHY/MAC layer in OSI model) of Type 2 device and may be obtained by an application (e.g. software, firmware, driver, app, wireless monitoring software/system).

The wireless multipath channel may comprise: a communication channel, analog frequency channel (e.g. with analog carrier frequency near 700/800/900 MHz, 1.8/1.8/2.4/3/5/6/27/60 GHz), coded channel (e.g. in CDMA), and/or channel of a wireless network/system (e.g. WLAN, WiFi, mesh, LTE, 4G/5G, Bluetooth, Zigbee, UWB, RFID, microwave). It may comprise more than one channel. The channels may be consecutive (e.g. with adjacent/overlapping bands) or non-consecutive channels (e.g. non-overlapping WiFi channels, one at 2.4 GHz and one at 5 GHz).

The TSCI may be extracted from the wireless signal at a layer of the Type 2 device (e.g. a layer of OSI reference model, physical layer, data link layer, logical link control layer, media access control (MAC) layer, network layer, transport layer, session layer, presentation layer, application layer, TCP/IP layer, internet layer, link layer). The TSCI may be extracted from a derived signal (e.g. baseband signal, motion detection signal, motion sensing signal) derived from the wireless signal (e.g. RF signal). It may be (wireless) measurements sensed by the communication protocol (e.g. standardized protocol) using existing mechanism (e.g. wireless/cellular communication standard/network, 3G/LTE/4G/5G/6G/7G/8G, WiFi, IEEE 802.11/15/16). The derived signal may comprise a packet with at least one of: a preamble, a header and a payload (e.g. for data/control/management in wireless links/networks). The TSCI may be extracted from a probe signal (e.g. training sequence, STF, LTF, L-STF, L-LTF, L-SIG, HE-STF, HE-LTF, HE-SIG-A, HE-SIG-B, CEF) in the packet. A motion detection/sensing signal may be recognized/identified base on the probe signal. The packet may be a standard-compliant protocol frame, management frame, control frame, data frame, sounding frame, excitation frame, illumination frame, null data frame, beacon frame, pilot frame, probe frame, request frame, response frame, association frame, reassociation frame, disassociation frame, authentication frame, action frame, report frame, poll frame, announcement frame, extension frame, enquiry frame, acknowledgement frame, RTS frame, CTS frame, QoS frame, CF-Poll frame, CF-Ack frame, block acknowledgement frame, reference frame, training frame, and/or synchronization frame.

The packet may comprise a control data and/or a motion detection probe. A data (e.g. ID/parameters/characteristics/settings/control signal/command/instruction/notification/broadcasting-related information of the Type 1 device) may be obtained from the payload. The wireless signal may be transmitted by the Type 1 device. It may be received by the Type 2 device. A database (e.g. in local server, hub device, cloud server, storage network) may be used to store the TSCI, characteristics, STI, signatures, patterns, behaviors, trends, parameters, analytics, output responses, identification information, user information, device information, channel information, venue (e.g. map, environmental model, network, proximity devices/networks) information, task information, class/category information, presentation (e.g. UI) information, and/or other information.

The Type 1/Type 2 device may comprise at least one of: electronics, circuitry, transmitter (TX)/receiver (RX)/transceiver, RF interface, "Origin Satellite"/"Tracker Bot", unicast/multicast/broadcasting device, wireless source device, source/destination device, wireless node, hub device, target device, motion detection device, sensor device, remote/wireless sensor device, wireless communication device, wireless-enabled device, standard compliant device, and/or receiver. The Type 1 (or Type 2) device may be heterogeneous because, when there are more than one instances of Type 1 (or Type 2) device, they may have different circuitry, enclosure, structure, purpose, auxiliary functionality, chip/IC, processor, memory, software, firmware, network connectivity, antenna, brand, model, appearance, form, shape, color, material, and/or specification. The Type 1/Type 2 device may comprise: access point, router, mesh router, internet-of-things (IoT) device, wireless terminal, one or more radio/RF subsystem/wireless interface (e.g. 2.4 GHz radio, 5 GHz radio, front haul radio, backhaul radio), modem, RF front end, RF/radio chip or integrated circuit (IC).

At least one of: Type 1 device, Type 2 device, a link between them, the object, the characteristics, the STI, the monitoring of the motion, and the task may be associated with an identification (ID) such as UUID. The Type 1/Type 2/another device may obtain/store/retrieve/access/preprocess/condition/process/analyze/monitor/apply the TSCI. The Type 1 and Type 2 devices may communicate network traffic in another channel (e.g. Ethernet, HDMI, USB, Bluetooth, BLE, WiFi, LTE, other network, the wireless multipath channel) in parallel to the wireless signal. The Type 2 device may passively observe/monitor/receive the wireless signal from the Type 1 device in the wireless multipath channel without establishing connection (e.g. association/authentication) with, or requesting service from, the Type 1 device.

The transmitter (i.e. Type 1 device) may function as (play role of) receiver (i.e. Type 2 device) temporarily, sporadically, continuously, repeatedly, interchangeably, alternately, simultaneously, concurrently, and/or contemporaneously; and vice versa. A device may function as Type 1 device (transmitter) and/or Type 2 device (receiver) temporarily, sporadically, continuously, repeatedly, simultaneously, concurrently, and/or contemporaneously. There may be multiple wireless nodes each being Type 1 (TX) and/or Type 2 (RX) device. A TSCI may be obtained between every two nodes when they exchange/communicate wireless signals. The characteristics and/or STI of the object may be monitored individually based on a TSCI, or jointly based on two or more (e.g. all) TSCI. The motion of the object may be monitored actively (in that Type 1 device, Type 2 device, or both, are wearable of/associated with the object) and/or passively (in that both Type 1 and Type 2 devices are not wearable of/associated with the object). It may be passive because the object may not be associated with the Type 1 device and/or the Type 2 device. The object (e.g. user, an automated guided vehicle or AGV) may not need to carry/install any wearables/fixtures (i.e. the Type 1 device and the Type 2 device are not wearable/attached devices that the object needs to carry in order perform the task). It may be active because the object may be associated with either the Type 1 device and/or the Type 2 device. The object may carry (or installed) a wearable/a fixture (e.g. the Type 1 device, the Type 2 device, a device communicatively coupled with either the Type 1 device or the Type 2 device).

The presentation may be visual, audio, image, video, animation, graphical presentation, text, etc. A computation of the task may be performed by a processor (or logic unit) of the Type 1 device, a processor (or logic unit) of an IC of the Type 1 device, a processor (or logic unit) of the Type 2 device, a processor of an IC of the Type 2 device, a local server, a cloud server, a data analysis subsystem, a signal analysis subsystem, and/or another processor. The task may be performed with/without reference to a wireless fingerprint or a baseline (e.g. collected, processed, computed, transmitted and/or stored in a training phase/survey/current survey/previous survey/recent survey/initial wireless survey, a passive fingerprint), a training, a profile, a trained profile, a static profile, a survey, an initial wireless survey, an initial setup, an installation, a retraining, an updating and a reset.

The Type 1 device (TX device) may comprise at least one heterogeneous wireless transmitter. The Type 2 device (RX device) may comprise at least one heterogeneous wireless receiver. The Type 1 device and the Type 2 device may be collocated. The Type 1 device and the Type 2 device may be the same device. Any device may have a data processing unit/apparatus, a computing unit/system, a network unit/system, a processor (e.g. logic unit), a memory communicatively coupled with the processor, and a set of instructions stored in the memory to be executed by the processor. Some processors, memories and sets of instructions may be coordinated. There may be multiple Type 1 devices interacting (e.g. communicating, exchange signal/control/notification/other data) with the same Type 2 device (or multiple Type 2 devices), and/or there may be multiple Type 2 devices interacting with the same Type 1 device. The multiple Type 1 devices/Type 2 devices may be synchronized and/or asynchronous, with same/different window width/size and/or time shift, same/different synchronized start time, synchronized end time, etc. Wireless signals sent by the multiple Type 1 devices may be sporadic, temporary, continuous, repeated, synchronous, simultaneous, concurrent, and/or contemporaneous. The multiple Type 1 devices/Type 2 devices may operate independently and/or collaboratively. A Type 1 and/or Type 2 device may have/comprise/be heterogeneous hardware circuitry (e.g. a heterogeneous chip or a heterogeneous IC capable of generating/receiving the wireless signal, extracting CI from received signal, or making the CI available). They may be communicatively coupled to same or different servers (e.g. cloud server, edge server, local server, hub device).

Operation of one device may be based on operation, state, internal state, storage, processor, memory output, physical location, computing resources, network of another device. Difference devices may communicate directly, and/or via another device/server/hub device/cloud server. The devices may be associated with one or more users, with associated settings. The settings may be chosen once, pre-programmed, and/or changed (e.g. adjusted, varied, modified)/varied over time. There may be additional steps in the method. The steps and/or the additional steps of the method may be performed in the order shown or in another order. Any steps may be performed in parallel, iterated, or otherwise repeated or performed in another manner. A user may be human, adult, older adult, man, woman, juvenile, child, baby, pet, animal, creature, machine, computer module/software, etc.

In the case of one or multiple Type 1 devices interacting with one or multiple Type 2 devices, any processing (e.g. time domain, frequency domain) may be different for different devices. The processing may be based on locations, orientation, direction, roles, user-related characteristics, settings, configurations, available resources, available bandwidth, network connection, hardware, software, processor, co-processor, memory, battery life, available power, antennas, antenna types, directional/unidirectional characteristics of the antenna, power setting, and/or other parameters/characteristics of the devices.

The wireless receiver (e.g. Type 2 device) may receive the signal and/or another signal from the wireless transmitter (e.g. Type 1 device). The wireless receiver may receive another signal from another wireless transmitter (e.g. a second Type 1 device). The wireless transmitter may transmit the signal and/or another signal to another wireless receiver (e.g. a second Type 2 device). The wireless transmitter, wireless receiver, another wireless receiver and/or another wireless transmitter may be moving with the object and/or another object. The another object may be tracked.

The Type 1 and/or Type 2 device may be capable of wirelessly coupling with at least two Type 2 and/or Type 1 devices. The Type 1 device may be caused/controlled to switch/establish wireless coupling (e.g. association, authentication) from the Type 2 device to a second Type 2 device at another location in the venue. Similarly, the Type 2 device may be caused/controlled to switch/establish wireless coupling from the Type 1 device to a second Type 1 device at yet another location in the venue. The switching may be controlled by a server (or a hub device), the processor, the Type 1 device, the Type 2 device, and/or another device. The radio used before and after switching may be different. A second wireless signal (second signal) may be caused to be transmitted between the Type 1 device and the second Type 2 device (or between the Type 2 device and the second Type 1 device) through the channel. A second TSCI of the channel extracted from the second signal may be obtained. The second signal may be the first signal. The characteristics, STI and/or another quantity of the object may be monitored based on the second TSCI. The Type 1 device and the Type 2 device may be the same. The characteristics, STI and/or another quantity with different time stamps may form a waveform. The waveform may be displayed in the presentation.

The wireless signal and/or another signal may have data embedded. The wireless signal may be a series of probe signals (e.g. a repeated transmission of probe signals, a re-use of one or more probe signals). The probe signals may change/vary over time. A probe signal may be a standard compliant signal, protocol signal, standardized wireless protocol signal, control signal, data signal, wireless communication network signal, cellular network signal, WiFi signal, LTE/5G/6G/7G signal, reference signal, beacon signal, motion detection signal, and/or motion sensing signal. A probe signal may be formatted according to a wireless network standard (e.g. WiFi), a cellular network standard (e.g. LTE/5G/6G), or another standard. A probe signal may comprise a packet with a header and a payload. A probe signal may have data embedded. The payload may comprise data. A probe signal may be replaced by a data signal. The probe signal may be embedded in a data signal. The wireless receiver, wireless transmitter, another wireless receiver and/or another wireless transmitter may be associated with at least one processor, memory communicatively coupled with respective processor, and/or respective set of instructions stored in the memory which when executed cause the processor to perform any and/or all steps needed to determine the STI (e.g. motion information), initial STI, initial time, direction, instantaneous location, instantaneous angle, and/or speed, of the object. The processor, the memory and/or the set of instructions may be associated with the Type 1 device, one of the at least one Type 2 device, the object, a device associated with the object, another device associated with the venue, a cloud server, a hub device, and/or another server.

The Type 1 device may transmit the signal in a broadcasting manner to at least one Type 2 device(s) through the channel in the venue. The signal is transmitted without the Type 1 device establishing wireless connection (e.g. association, authentication) with any Type 2 device, and without any Type 2 device requesting services from the Type 1 device. The Type 1 device may transmit to a particular media access control (MAC) address common for more than one Type 2 devices. Each Type 2 device may adjust its MAC address to the particular MAC address. The particular MAC address may be associated with the venue. The association may be recorded in an association table of an Association Server (e.g. hub device). The venue may be identified by the Type 1 device, a Type 2 device and/or another device based on the particular MAC address, the series of probe signals, and/or the at least one TSCI extracted from the probe signals. For example, a Type 2 device may be moved to a new location in the venue (e.g. from another venue). The Type 1 device may be newly set up in the venue such that the Type 1 and Type 2 devices are not aware of each other. During set up, the Type 1 device may be instructed/guided/caused/controlled (e.g. using dummy receiver, using hardware pin setting/connection, using stored setting, using local setting, using remote setting, using downloaded setting, using hub device, or using server) to send the series of probe signals to the particular MAC address. Upon power up, the Type 2 device may scan for probe signals according to a table of MAC addresses (e.g. stored in a designated source, server, hub device, cloud server) that may be used for broadcasting at different locations (e.g. different MAC address used for different venue such as house, office, enclosure, floor, multi-storey building, store, airport, mall, stadium, hall, station, subway, lot, area, zone, region, district, city, country, continent). When the Type 2 device detects the probe signals sent to the particular MAC address, the Type 2 device can use the table to identify the venue based on the MAC address. A location of a Type 2 device in the venue may be computed based on the particular MAC address, the series of probe signals, and/or the at least one TSCI obtained by the Type 2 device from the probe signals. The computing may be performed by the Type 2 device. The particular MAC address may be changed (e.g. adjusted, varied, modified) over time. It may be changed according to a time table, rule, policy, mode, condition, situation and/or change. The particular MAC address may be selected based on availability of the MAC address, a pre-selected list, collision pattern, traffic pattern, data traffic between the Type 1 device and another device, effective bandwidth, random selection, and/or a MAC address switching plan. The particular MAC address may be the MAC address of a second wireless device (e.g. a dummy receiver, or a receiver that serves as a dummy receiver).

The Type 1 device may transmit the probe signals in a channel selected from a set of channels. At least one CI of the selected channel may be obtained by a respective Type 2 device from the probe signal transmitted in the selected channel. The selected channel may be changed (e.g. adjusted, varied, modified) over time. The change may be according to a time table, rule, policy, mode, condition, situation, and/or change. The selected channel may be selected based on availability of channels, random selection, a pre-selected list, co-channel interference, inter-channel interference, channel traffic pattern, data traffic between the Type 1 device and another device, effective bandwidth associated with channels, security criterion, channel switching plan, a criterion, a quality criterion, a signal quality condition, and/or consideration.

The particular MAC address and/or an information of the selected channel may be communicated between the Type 1 device and a server (e.g. hub device) through a network. The particular MAC address and/or the information of the selected channel may also be communicated between a Type 2 device and a server (e.g. hub device) through another network. The Type 2 device may communicate the particular MAC address and/or the information of the selected channel to another Type 2 device (e.g. via mesh network, Bluetooth, WiFi, NFC, ZigBee, etc.). The particular MAC address and/or selected channel may be chosen by a server (e.g. hub device). The particular MAC address and/or selected channel may be signaled in an announcement channel by the Type 1 device, the Type 2 device and/or a server (e.g. hub device). Before being communicated, any information may be pre-processed.

Wireless connection (e.g. association, authentication) between the Type 1 device and another wireless device may be established (e.g. using a signal handshake). The Type 1 device may send a first handshake signal (e.g. sounding frame, probe signal, request-to-send RTS) to the another device. The another device may reply by sending a second handshake signal (e.g. a command, or a clear-to-send CTS) to the Type 1 device, triggering the Type 1 device to transmit the signal (e.g. series of probe signals) in the broadcasting manner to multiple Type 2 devices without establishing connection with any Type 2 device. The second handshake signals may be a response or an acknowledge (e.g. ACK) to the first handshake signal. The second handshake signal may contain a data with information of the venue, and/or the Type 1 device. The another device may be a dummy device with a purpose (e.g. primary purpose, secondary purpose) to establish the wireless connection with the Type 1 device, to receive the first signal, and/or to send the second signal. The another device may be physically attached to the Type 1 device.

In another example, the another device may send a third handshake signal to the Type 1 device triggering the Type 1 device to broadcast the signal (e.g. series of probe signals) to multiple Type 2 devices without establishing connection (e.g. association, authentication) with any Type 2 device. The Type 1 device may reply to the third special signal by transmitting a fourth handshake signal to the another device. The another device may be used to trigger more than one Type 1 devices to broadcast. The triggering may be sequential, partially sequential, partially parallel, or fully parallel. The another device may have more than one wireless circuitries to trigger multiple transmitters in parallel. Parallel trigger may also be achieved using at least one yet another device to perform the triggering (similar to what as the another device does) in parallel to the another device. The another device may not communicate (or suspend communication) with the Type 1 device after establishing connection with the Type 1 device. Suspended communication may be resumed. The another device may enter an inactive mode, hibernation mode, sleep mode, stand-by mode, low-power mode, OFF mode and/or power-down mode, after establishing the connection with the Type 1 device. The another device may have the particular MAC address so that the Type 1 device sends the signal to the particular MAC address. The Type 1 device and/or the another device may be controlled and/or coordinated by a first processor associated with the Type 1 device, a second processor associated with the another device, a third processor associated with a designated source and/or a fourth processor associated with another device. The first and second processors may coordinate with each other.

A first series of probe signals may be transmitted by a first antenna of the Type 1 device to at least one first Type 2 device through a first channel in a first venue. A second series of probe signals may be transmitted by a second antenna of the Type 1 device to at least one second Type 2 device through a second channel in a second venue. The first series and the second series may/may not be different. The at least one first Type 2 device may/may not be different from the at least one second Type 2 device. The first and/or second series of probe signals may be broadcasted without connection (e.g. association, authentication) established between the Type 1 device and any Type 2 device. The first and second antennas may be same/different. The two venues may have different sizes, shape, multipath characteristics. The first and second venues may overlap. The respective immediate areas around the first and second antennas may overlap. The first and second channels may be same/different. For example, the first one may be WiFi while the second may be LTE. Or, both may be WiFi, but the first one may be 2.4 GHz WiFi and the second may be 5 GHz WiFi. Or, both may be 2.4 GHz WiFi, but have different channel numbers, SSID names, and/or WiFi settings.

Each Type 2 device may obtain at least one TSCI from the respective series of probe signals, the CI being of the respective channel between the Type 2 device and the Type 1 device. Some first Type 2 device(s) and some second Type 2 device(s) may be the same. The first and second series of probe signals may be synchronous/asynchronous. A probe signal may be transmitted with data or replaced by a data signal. The first and second antennas may be the same. The first series of probe signals may be transmitted at a first rate (e.g. 30 Hz). The second series of probe signals may be transmitted at a second rate (e.g. 200 Hz). The first and second rates may be same/different. The first and/or second rate may be changed (e.g. adjusted, varied, modified) over time. The change may be according to a time table, rule, policy, mode, condition, situation, and/or change. Any rate may be changed (e.g. adjusted, varied, modified) over time. The first and/or second series of probe signals may be transmitted to a first MAC address and/or second MAC address respectively. The two MAC addresses may be same/different. The first series of probe signals may be transmitted in a first channel. The second series of probe signals may be transmitted in a second channel. The two channels may be same/different. The first or second MAC address, first or second channel may be changed over time. Any change may be according to a time table, rule, policy, mode, condition, situation, and/or change.

The Type 1 device and another device may be controlled and/or coordinated, physically attached, or may be of/in/of a common device. They may be controlled by/connected to a common data processor, or may be connected to a common bus interconnect/network/LAN/Bluetooth network/NFC network/BLE network/wired network/wireless network/mesh network/mobile network/cloud. They may share a common memory, or be associated with a common user, user device, profile, account, identity (ID), identifier, household, house, physical address, location, geographic coordinate, IP subnet, SSID, home device, office device, and/or manufacturing device. Each Type 1 device may be a signal source of a set of respective Type 2 devices (i.e. it sends a respective signal (e.g. respective series of probe signals) to the set of respective Type 2 devices). Each respective Type 2 device chooses the Type 1 device from among all Type 1 devices as its signal source. Each Type 2 device may choose asynchronously. At least one TSCI may be obtained by each respective Type 2 device from the respective series of probe signals from the Type 1 device, the CI being of the channel between the Type 2 device and the Type 1 device. The respective Type 2 device chooses the Type 1 device from among all Type 1 devices as its signal source based on identity (ID) or identifier of Type 1/Type 2 device, task to be performed, past signal source, history (e.g. of past signal source, Type 1 device, another Type 1 device, respective Type 2 receiver, and/or another Type 2 receiver), threshold for switching signal source, and/or information of a user, account, access info, parameter, characteristics, and/or signal strength (e.g. associated with the Type 1 device and/or the respective Type 2 receiver). Initially, the Type 1 device may be signal source of a set of initial respective Type 2 devices (i.e. the Type 1 device sends a respective signal (series of probe signals) to the set of initial respective Type 2 devices) at an initial time. Each initial respective Type 2 device chooses the Type 1 device from among all Type 1 devices as its signal source.

The signal source (Type 1 device) of a particular Type 2 device may be changed (e.g. adjusted, varied, modified) when (1) time interval between two adjacent probe signals (e.g. between current probe signal and immediate past probe signal, or between next probe signal and current probe signal) received from current signal source of the Type 2 device exceeds a first threshold; (2) signal strength associated with current signal source of the Type 2 device is below a second threshold; (3) a processed signal strength associated with current signal source of the Type 2 device is below a third threshold, the signal strength processed with low pass filter, band pass filter, median filter, moving average filter, weighted averaging filter, linear filter and/or non-linear filter; and/or (4) signal strength (or processed signal strength) associated with current signal source of the Type 2 device is below a fourth threshold for a significant percentage of a recent time window (e.g. 70%, 80%, 90%). The percentage may exceed a fifth threshold. The first, second, third, fourth and/or fifth thresholds may be time varying.

Condition (1) may occur when the Type 1 device and the Type 2 device become progressively far away from each other, such that some probe signal from the Type 1 device becomes too weak and is not received by the Type 2 device. Conditions (2)-(4) may occur when the two devices become far from each other such that the signal strength becomes very weak.

The signal source of the Type 2 device may not change if other Type 1 devices have signal strength weaker than a factor (e.g. 1, 1.1, 1.2, or 1.5) of the current signal source. If the signal source is changed (e.g. adjusted, varied, modified), the new signal source may take effect at a near future time (e.g. the respective next time). The new signal source may be the Type 1 device with strongest signal strength, and/or processed signal strength. The current and new signal source may be same/different.

A list of available Type 1 devices may be initialized and maintained by each Type 2 device. The list may be updated by examining signal strength and/or processed signal strength associated with the respective set of Type 1 devices. A Type 2 device may choose between a first series of probe signals from a first Type 1 device and a second series of probe signals from a second Type 1 device based on: respective probe signal rate, MAC addresses, channels, characteristics/properties/states, task to be performed by the Type 2 device, signal strength of first and second series, and/or another consideration.

The series of probe signals may be transmitted at a regular rate (e.g. 100 Hz). The series of probe signals may be scheduled at a regular interval (e.g. 0.01 s for 100 Hz), but each probe signal may experience small time perturbation, perhaps due to timing requirement, timing control, network control, handshaking, message passing, collision avoidance, carrier sensing, congestion, availability of resources, and/or another consideration. The rate may be changed (e.g. adjusted, varied, modified). The change may be according to a time table (e.g. changed once every hour), rule, policy, mode, condition and/or change (e.g. changed whenever some event occur). For example, the rate may normally be 100 Hz, but changed to 1000 Hz in demanding situations, and to 1 Hz in low power/standby situation. The probe signals may be sent in burst.

The probe signal rate may change based on a task performed by the Type 1 device or Type 2 device (e.g. a task may need 100 Hz normally and 1000 Hz momentarily for 20 seconds). In one example, the transmitters (Type 1 devices), receivers (Type 2 device), and associated tasks may be associated adaptively (and/or dynamically) to classes (e.g. classes that are: low-priority, high-priority, emergency, critical, regular, privileged, non-subscription, subscription, paying, and/or non-paying). A rate (of a transmitter) may be adjusted for the sake of some class (e.g. high priority class). When the need of that class changes, the rate may be changed (e.g. adjusted, varied, modified). When a receiver has critically low power, the rate may be reduced to reduce power consumption of the receiver to respond to the probe signals. In one example, probe signals may be used to transfer power wirelessly to a receiver (Type 2 device), and the rate may be adjusted to control the amount of power transferred to the receiver.

The rate may be changed by (or based on): a server (e.g. hub device), the Type 1 device and/or the Type 2 device. Control signals may be communicated between them. The server may monitor, track, forecast and/or anticipate the needs of the Type 2 device and/or the tasks performed by the Type 2 device, and may control the Type 1 device to change the rate. The server may make scheduled changes to the rate according to a time table. The server may detect an emergency situation and change the rate immediately. The server may detect a developing condition and adjust the rate gradually. The characteristics and/or STI (e.g. motion information) may be monitored individually based on a TSCI associated with a particular Type 1 device and a particular Type 2 device, and/or monitored jointly based on any TSCI associated with the particular Type 1 device and any Type 2 device, and/or monitored jointly based on any TSCI associated with the particular Type 2 device and any Type 1 device, and/or monitored globally based on any TSCI associated with any Type 1 device and any Type 2 device. Any joint monitoring may be associated with: a user, user account, profile, household, map of venue, environmental model of the venue, and/or user history, etc.

A first channel between a Type 1 device and a Type 2 device may be different from a second channel between another Type 1 device and another Type 2 device. The two channels may be associated with different frequency bands, bandwidth, carrier frequency, modulation, wireless standards, coding, encryption, payload characteristics, networks, network ID, SSID, network characteristics, network settings, and/or network parameters, etc. The two channels may be associated with different kinds of wireless system (e.g. two of the following: WiFi, LTE, LTE-A, LTE-U, 2.5G, 3G, 3.5G, 4G, beyond 4G, 5G, 6G, 7G, a cellular network standard, UMTS, 3GPP, GSM, EDGE, TDMA, FDMA, CDMA, WCDMA, TD-SCDMA, 802.11 system, 802.15 system, 802.16 system, mesh network, Zigbee, NFC, WiMax, Bluetooth, BLE, RFID, UWB, microwave system, radar like system). For example, one is WiFi and the other is LTE.

The two channels may be associated with similar kinds of wireless system, but in different network. For example, the first channel may be associated with a WiFi network named "Pizza and Pizza" in the 2.4 GHz band with a bandwidth of 20 MHz while the second may be associated with a WiFi network with SSID of "StarBud hotspot" in the 5 GHz band with a bandwidth of 40 MHz. The two channels may be different channels in same network (e.g. the "StarBud hotspot" network).

In one embodiment, a wireless monitoring system may comprise training a classifier of multiple events in a venue based on training TSCI associated with the multiple events. A CI or TSCI associated with an event may be considered/may comprise a wireless sample/characteristics/fingerprint associated with the event (and/or the venue, the environment, the object, the motion of the object, a state/emotional state/mental state/condition/stage/gesture/gait/action/movement/activity/daily activity/history/event of the object, etc.). For each of the multiple known events happening in the venue in a respective training (e.g. surveying, wireless survey, initial wireless survey) time period associated with the known event, a respective training wireless signal (e.g. a respective series of training probe signals) may be transmitted by an antenna of a first Type 1 heterogeneous wireless device using a processor, a memory and a set of instructions of the first Type 1 device to at least one first Type 2 heterogeneous wireless device through a wireless multipath channel in the venue in the respective training time period.

At least one respective time series of training CI (training TSCI) may be obtained asynchronously by each of the at least one first Type 2 device from the (respective) training signal. The CI may be CI of the channel between the first Type 2 device and the first Type 1 device in the training time period associated with the known event. The at least one training TSCI may be preprocessed. The training may be a wireless survey (e.g. during installation of Type 1 device and/or Type 2 device).

For a current event happening in the venue in a current time period, a current wireless signal (e.g. a series of current probe signals) may be transmitted by an antenna of a second Type 1 heterogeneous wireless device using a processor, a memory and a set of instructions of the second Type 1 device to at least one second Type 2 heterogeneous wireless device through the channel in the venue in the current time period associated with the current event. At least one time series of current CI (current TSCI) may be obtained asynchronously by each of the at least one second Type 2 device from the current signal (e.g. the series of current probe signals). The CI may be CI of the channel between the second Type 2 device and the second Type 1 device in the current time period associated with the current event. The at least one current TSCI may be preprocessed.

The classifier may be applied to classify at least one current TSCI obtained from the series of current probe signals by the at least one second Type 2 device, to classify at least one portion of a particular current TSCI, and/or to classify a combination of the at least one portion of the particular current TSCI and another portion of another TSCI. The classifier may partition TSCI (or the characteristics/STI or other analytics or output responses) into clusters and associate the clusters to specific events/objects/subjects/locations/movements/activities. Labels/tags may be generated for the clusters. The clusters may be stored and retrieved. The classifier may be applied to associate the current TSCI (or characteristics/STI or the other analytics/output response, perhaps associated with a current event) with: a cluster, a known/specific event, a class/category/group/grouping/list/cluster/set of known events/subjects/locations/movements/activities, an unknown event, a class/category/group/grouping/list/cluster/set of unknown events/subjects/locations/movements/activities, and/or another event/subject/location/movement/activity/class/category/group/grouping/list/cluster/set. Each TSCI may comprise at least one CI each associated with a respective timestamp. Two TSCI associated with two Type 2 devices may be different with different: starting time, duration, stopping time, amount of CI, sampling frequency, sampling period. Their CI may have different features. The first and second Type 1 devices may be at same location in the venue. They may be the same device. The at least one second Type 2 device (or their locations) may be a permutation of the at least one first Type 2 device (or their locations). A particular second Type 2 device and a particular first Type 2 device may be the same device. A subset of the first Type 2 device and a subset of the second Type 2 device may be the same. The at least one second Type 2 device and/or a subset of the at least one second Type 2 device may be a subset of the at least one first Type 2 device. The at least one first Type 2 device and/or a subset of the at least one first Type 2 device may be a permutation of a subset of the at least one second Type 2 device. The at least one second Type 2 device and/or a subset of the at least one second Type 2 device may be a permutation of a subset of the at least one first Type 2 device. The at least one second Type 2 device and/or a subset of the at least one second Type 2 device may be at same respective location as a subset of the at least one first Type 2 device. The at least one first Type 2 device and/or a subset of the at least one first Type 2 device may be at same respective location as a subset of the at least one second Type 2 device.

The antenna of the Type 1 device and the antenna of the second Type 1 device may be at same location in the venue. Antenna(s) of the at least one second Type 2 device and/or antenna(s) of a subset of the at least one second Type 2 device may be at same respective location as respective antenna(s) of a subset of the at least one first Type 2 device. Antenna(s) of the at least one first Type 2 device and/or antenna(s) of a subset of the at least one first Type 2 device may be at same respective location(s) as respective antenna(s) of a subset of the at least one second Type 2 device.

A first section of a first time duration of the first TSCI and a second section of a second time duration of the second section of the second TSCI may be aligned. A map between items of the first section and items of the second section may be computed. The first section may comprise a first segment (e.g. subset) of the first TSCI with a first starting/ending time, and/or another segment (e.g. subset) of a processed first TSCI. The processed first TSCI may be the first TSCI processed by a first operation. The second section may comprise a second segment (e.g. subset) of the second TSCI with a second starting time and a second ending time, and another segment (e.g. subset) of a processed second TSCI. The processed second TSCI may be the second TSCI processed by a second operation. The first operation and/or the second operation may comprise: subsampling, re-sampling, interpolation, filtering, transformation, feature extraction, pre-processing, and/or another operation.

A first item of the first section may be mapped to a second item of the second section. The first item of the first section may also be mapped to another item of the second section. Another item of the first section may also be mapped to the second item of the second section. The mapping may be one-to-one, one-to-many, many-to-one, many-to-many. At least one function of at least one of: the first item of the first section of the first TSCI, another item of the first TSCI, timestamp of the first item, time difference of the first item, time differential of the first item, neighboring timestamp of the first item, another timestamp associated with the first item, the second item of the second section of the second TSCI, another item of the second TSCI, timestamp of the second item, time difference of the second item, time differential of the second item, neighboring timestamp of the second item, and another timestamp associated with the second item, may satisfy at least one constraint.

One constraint may be that a difference between the timestamp of the first item and the timestamp of the second item may be upper-bounded by an adaptive (and/or dynamically adjusted) upper threshold and lower-bounded by an adaptive lower threshold.

The first section may be the entire first TSCI. The second section may be the entire second TSCI. The first time duration may be equal to the second time duration. A section of a time duration of a TSCI may be determined adaptively (and/or dynamically). A tentative section of the TSCI may be computed. A starting time and an ending time of a section (e.g. the tentative section, the section) may be determined. The section may be determined by removing a beginning portion and an ending portion of the tentative section. A beginning portion of a tentative section may be determined as follows. Iteratively, items of the tentative section with increasing timestamp may be considered as a current item, one item at a time.

In each iteration, at least one activity measure/index may be computed and/or considered. The at least one activity measure may be associated with at least one of: the current item associated with a current timestamp, past items of the tentative section with timestamps not larger than the current timestamp, and/or future items of the tentative section with timestamps not smaller than the current timestamp. The current item may be added to the beginning portion of the tentative section if at least one criterion (e.g. quality criterion, signal quality condition) associated with the at least one activity measure is satisfied.

The at least one criterion associated with the activity measure may comprise at least one of: (a) the activity measure is smaller than an adaptive (e.g. dynamically adjusted) upper threshold, (b) the activity measure is larger than an adaptive lower threshold, (c) the activity measure is smaller than an adaptive upper threshold consecutively for at least a predetermined amount of consecutive timestamps, (d) the activity measure is larger than an adaptive lower threshold consecutively for at least another predetermined amount of consecutive timestamps, (e) the activity measure is smaller than an adaptive upper threshold consecutively for at least a predetermined percentage of the predetermined amount of consecutive timestamps, (f) the activity measure is larger than an adaptive lower threshold consecutively for at least another predetermined percentage of the another predetermined amount of consecutive timestamps, (g) another activity measure associated with another timestamp associated with the current timestamp is smaller than another adaptive upper threshold and larger than another adaptive lower threshold, (h) at least one activity measure associated with at least one respective timestamp associated with the current timestamp is smaller than respective upper threshold and larger than respective lower threshold, (i) percentage of timestamps with associated activity measure smaller than respective upper threshold and larger than respective lower threshold in a set of timestamps associated with the current timestamp exceeds a threshold, and (j) another criterion (e.g. a quality criterion, signal quality condition).

An activity measure/index associated with an item at time T1 may comprise at least one of: (1) a first function of the item at time T1 and an item at time T1−D1, wherein D1 is a pre-determined positive quantity (e.g. a constant time offset), (2) a second function of the item at time T1 and an item at time T1+D1, (3) a third function of the item at time T1 and an item at time T2, wherein T2 is a pre-determined quantity (e.g. a fixed initial reference time; T2 may be changed (e.g. adjusted, varied, modified) over time; T2 may be updated periodically; T2 may be the beginning of a time period and T1 may be a sliding time in the time period), and (4) a fourth function of the item at time T1 and another item.

At least one of: the first function, the second function, the third function, and/or the fourth function may be a function (e.g. $F(X, Y, \ldots)$) with at least two arguments: X and Y. The two arguments may be scalars. The function (e.g. F) may be a function of at least one of: X, Y, (X−Y), (Y−X), abs(X−Y), $X^a$, $Y^B$, $abs(X^a-Y^b)$, $(X-Y)^a$, (X/Y), (X+a)/(Y+b), $(X^a/Y^b)$, and $((X/Y)^a-b)$, wherein a and b are may be some predetermined quantities. For example, the function may simply be abs(X−Y), or $(X-Y)^2$, $(X-Y)^4$. The function may be a robust function. For example, the function may be $(X-Y)^2$ when abs (X−Y) is less than a threshold T, and (X−Y)+a when abs(X−Y) is larger than T. Alternatively, the function may be a constant when abs(X−Y) is larger than T. The function may also be bounded by a slowly increasing function when abs(X−y) is larger than T, so that outliers cannot severely affect the result. Another example of the function may be (abs(X/Y)−a), where a=1. In this way, if X=Y (i.e. no change or no activity), the function will give a value of 0. If X is larger than Y, (X/Y) will be larger than 1 (assuming X and Y are positive) and the function will be positive. And if X is less than Y, (X/Y) will be smaller than 1 and the function will be negative. In another example, both arguments X and Y may be n-tuples such that X=($x\_1$, $x\_2$, ..., $x\_n$) and Y=($y\_1$, $y\_2$, ..., $y\_n$). The function may be a function of at least one of: $x\_i$, $y\_i$, ($x\_i-y\_i$), ($y\_i-x\_i$), abs($x\_i-y\_i$), $x\_i^a$, $y\_i^b$, abs($x\_i^a-y\_i^b$), $(x\_i-y\_i)^a$, ($x\_i/y\_i$), ($x\_i+a$)/($y\_i+b$), ($x\_i^a/y\_i^b$), and $((x\_i/y\_i)^a-b)$, wherein i is a component index of the n-tuple X and Y, and $1<=i<=n$. E.g. component index of $x\_1$ is i=1, component index of $x\_2$ is i=2. The function may comprise a component-by-component summation of another function of at least one of the following: $x\_i$, $y\_i$, ($x\_i-y\_i$), ($y\_i-x\_i$), abs($x\_i-y\_i$), $x\_i^a$, $y\_i^b$, abs($x\_i^a-y\_i^b$), $(x\_i-y\_i)^a$, ($x\_i/y\_i$), ($x\_i+a$)/($y\_i+b$), ($x\_i^a/y\_i^b$), and $((x\_i/y\_i)^a-b)$, wherein i is the component index of the n-tuple X and Y. For example, the function may be in a form of sum_{i=1}^n (abs(x_i/y_i)−1)/n, or sum_{i=1}^n w_i*(abs(x_i/y_i)−1), where w_i is some weight for component i.

The map may be computed using dynamic time warping (DTW). The DTW may comprise a constraint on at least one of: the map, the items of the first TSCI, the items of the second TSCI, the first time duration, the second time duration, the first section, and/or the second section. Suppose in the map, the i^{th} domain item is mapped to the j^{th} range item. The constraint may be on admissible combination of i and j (constraint on relationship between i and j). Mismatch cost between a first section of a first time duration of a first TSCI and a second section of a second time duration of a second TSCI may be computed.

The first section and the second section may be aligned such that a map comprising more than one links may be established between first items of the first TSCI and second items of the second TSCI. With each link, one of the first items with a first timestamp may be associated with one of the second items with a second timestamp. A mismatch cost between the aligned first section and the aligned second section may be computed. The mismatch cost may comprise a function of: an item-wise cost between a first item and a second item associated by a particular link of the map, and a link-wise cost associated with the particular link of the map.

The aligned first section and the aligned second section may be represented respectively as a first vector and a second vector of same vector length. The mismatch cost may comprise at least one of: an inner product, inner-product-like quantity, quantity based on correlation, correlation indicator, quantity based on covariance, discriminating score, distance, Euclidean distance, absolute distance, Lk distance (e.g. L1, L2, . . . ), weighted distance, distance-like quantity and/or another similarity value, between the first vector and the second vector. The mismatch cost may be normalized by the respective vector length.

A parameter derived from the mismatch cost between the first section of the first time duration of the first TSCI and the second section of the second time duration of the second TSCI may be modeled with a statistical distribution. At least one of: a scale parameter, location parameter and/or another parameter, of the statistical distribution may be estimated. The first section of the first time duration of the first TSCI may be a sliding section of the first TSCI. The second section of the second time duration of the second TSCI may be a sliding section of the second TSCI. A first sliding window may be applied to the first TSCI and a corresponding second sliding window may be applied to the second TSCI. The first sliding window of the first TSCI and the corresponding second sliding window of the second TSCI may be aligned.

Mismatch cost between the aligned first sliding window of the first TSCI and the corresponding aligned second sliding window of the second TSCI may be computed. The current event may be associated with at least one of: the known event, the unknown event and/or the another event, based on the mismatch cost.

The classifier may be applied to at least one of: each first section of the first time duration of the first TSCI, and/or each second section of the second time duration of the second TSCI, to obtain at least one tentative classification results. Each tentative classification result may be associated with a respective first section and a respective second section.

The current event may be associated with at least one of: the known event, the unknown event, a class/category/group/grouping/list/set of unknown events, and/or the another event, based on the mismatch cost. The current event may be associated with at least one of: the known event, the unknown event and/or the another event, based on a largest number of tentative classification results in more than one sections of the first TSCI and corresponding more than sections of the second TSCI. For example, the current event may be associated with a particular known event if the mismatch cost points to the particular known event for N consecutive times (e.g. N=10). In another example, the current event may be associated with a particular known event if the percentage of mismatch cost within the immediate past N consecutive N pointing to the particular known event exceeds a certain threshold (e.g. >80%). In another example, the current event may be associated with a known event that achieves smallest mismatch cost for the most times within a time period. The current event may be associated with a known event that achieves smallest overall mismatch cost, which is a weighted average of at least one mismatch cost associated with the at least one first sections. The current event may be associated with a particular known event that achieves smallest of another overall cost. The current event may be associated with the "unknown event" if none of the known events achieve mismatch cost lower than a first threshold T1 in a sufficient percentage of the at least one first section. The current event may also be associated with the "unknown event" if none of the events achieve an overall mismatch cost lower than a second threshold T2. The current event may be associated with at least one of: the known event, the unknown event and/or the another event, based on the mismatch cost and additional mismatch cost associated with at least one additional section of the first TSCI and at least one additional section of the second TSCI. The known events may comprise at least one of: a door closed event, door open event, window closed event, window open event, multi-state event, on-state event, off-state event, intermediate state event, continuous state event, discrete state event, human-present event, human-absent event, sign-of-life-present event, and/or a sign-of-life-absent event.

A projection for each CI may be trained using a dimension reduction method based on the training TSCI. The dimension reduction method may comprise at least one of: principal component analysis (PCA), PCA with different kernel, independent component analysis (ICA), Fisher linear discriminant, vector quantization, supervised learning, unsupervised learning, self-organizing maps, auto-encoder, neural network, deep neural network, and/or another method. The projection may be applied to at least one of: the training TSCI associated with the at least one event, and/or the current TSCI, for the classifier. The classifier of the at least one event may be trained based on the projection and the training TSCI associated with the at least one event. The at least one current TSCI may be classified/categorized based on the projection and the current TSCI. The projection may be re-trained using at least one of: the dimension reduction method, and another dimension reduction method, based on at least one of: the training TSCI, at least one current TSCI before retraining the projection, and/or additional training TSCI. The another dimension reduction method may comprise at least one of: principal component analysis (PCA), PCA with different kernels, independent component analysis (ICA), Fisher linear discriminant, vector quantization, supervised learning, unsupervised learning, self-organizing maps, auto-encoder, neural network, deep neural network, and/or yet another method. The classifier of the at least one event may be re-trained based on at least one of: the re-trained projection, the training TSCI associated with the at least one events, and/or at least one current TSCI. The at least one current TSCI may be classified based on: the re-trained projection, the re-trained classifier, and/or the current TSCI.

Each CI may comprise a vector of complex values. Each complex value may be preprocessed to give the magnitude of the complex value. Each CI may be preprocessed to give a vector of non-negative real numbers comprising the magnitude of corresponding complex values. Each training TSCI may be weighted in the training of the projection. The projection may comprise more than one projected components. The projection may comprise at least one most significant projected component. The projection may comprise at least one projected component that may be beneficial for the classifier.

The channel information (CI) may be associated with/may comprise signal strength, signal amplitude, signal phase, spectral power measurement, modem parameters (e.g. used in relation to modulation/demodulation in digital communication systems such as WiFi, 4G/LTE), dynamic beamforming information, transfer function components, radio state (e.g. used in digital communication systems to decode digital data, baseband processing state, RF processing state, etc.), measurable variables, sensed data, coarse-grained/fine-grained information of a layer (e.g. physical layer, data link layer, MAC layer, etc.), digital setting, gain setting, RF filter setting, RF front end switch setting, DC offset setting, DC correction setting, IQ compensation setting, effect(s) on the wireless signal by the environment (e.g. venue) during propagation, transformation of an input signal (the wireless signal transmitted by the Type 1 device) to an output signal (the wireless signal received by the Type 2 device), a stable behavior of the environment, a state profile, wireless channel measurements, received signal strength indicator (RSSI), channel state information (CSI), channel impulse response (CIR), channel frequency response (CFR), characteristics of frequency components (e.g. subcarriers) in a bandwidth, channel characteristics, channel filter response, timestamp, auxiliary information, data, meta data, user data, account data, access data, security data, session data, status data, supervisory data, household data, identity (ID), identifier, device data, network data, neighborhood data, environment data, real-time data, sensor data, stored data, encrypted data, compressed data, protected data, and/or another channel information. Each CI may be associated with a time stamp, and/or an arrival time. A CSI can be used to equalize/undo/minimize/reduce the multipath channel effect (of the transmission channel) to demodulate a signal similar to the one transmitted by the transmitter through the multipath channel. The CI may be associated with information associated with a frequency band, frequency signature, frequency phase, frequency amplitude, frequency trend, frequency characteristics, frequency-like characteristics, time domain element, frequency domain element, time-frequency domain element, orthogonal decomposition characteristics, and/or non-orthogonal decomposition characteristics of the signal through the channel. The TSCI may be a stream of wireless signals (e.g. CI).

The CI may be preprocessed, processed, postprocessed, stored (e.g. in local memory, portable/mobile memory, removable memory, storage network, cloud memory, in a volatile manner, in a non-volatile manner), retrieved, transmitted and/or received. One or more modem parameters and/or radio state parameters may be held constant. The modem parameters may be applied to a radio subsystem. The modem parameters may represent a radio state. A motion detection signal (e.g. baseband signal, and/or packet decoded/demodulated from the baseband signal, etc.) may be obtained by processing (e.g. down-converting) the first wireless signal (e.g. RF/WiFi/LTE/5G signal) by the radio subsystem using the radio state represented by the stored modem parameters. The modem parameters/radio state may be updated (e.g. using previous modem parameters or previous radio state). Both the previous and updated modem parameters/radio states may be applied in the radio subsystem in the digital communication system. Both the previous and updated modem parameters/radio states may be compared/analyzed/processed/monitored in the task.

The channel information may also be modem parameters (e.g. stored or freshly computed) used to process the wireless signal. The wireless signal may comprise a plurality of probe signals. The same modem parameters may be used to process more than one probe signals. The same modem parameters may also be used to process more than one wireless signals. The modem parameters may comprise parameters that indicate settings or an overall configuration for the operation of a radio subsystem or a baseband subsystem of a wireless sensor device (or both). The modem parameters may include one or more of: a gain setting, an RF filter setting, an RF front end switch setting, a DC offset setting, or an IQ compensation setting for a radio subsystem, or a digital DC correction setting, a digital gain setting, and/or a digital filtering setting (e.g. for a baseband subsystem). The CI may also be associated with information associated with a time period, time signature, timestamp, time amplitude, time phase, time trend, and/or time characteristics of the signal. The CI may be associated with information associated with a time-frequency partition, signature, amplitude, phase, trend, and/or characteristics of the signal. The CI may be associated with a decomposition of the signal. The CI may be associated with information associated with a direction, angle of arrival (AoA), angle of a directional antenna, and/or a phase of the signal through the channel. The CI may be associated with attenuation patterns of the signal through the channel. Each CI may be associated with a Type 1 device and a Type 2 device. Each CI may be associated with an antenna of the Type 1 device and an antenna of the Type 2 device.

The CI may be obtained from a communication hardware (e.g. of Type 2 device, or Type 1 device) that is capable of providing the CI. The communication hardware may be a WiFi-capable chip/IC (integrated circuit), chip compliant with a 802.11 or 802.16 or another wireless/radio standard, next generation WiFi-capable chip, LTE-capable chip, 5G-capable chip, 6G/7G/8G-capable chip, Bluetooth-enabled chip, NFC (near field communication)-enabled chip, BLE (Bluetooth low power)-enabled chip, UWB chip, another communication chip (e.g. Zigbee, WiMax, mesh network), etc. The communication hardware computes the CI and stores the CI in a buffer memory and make the CI available for extraction. The CI may comprise data and/or at least one matrices related to channel state information (CSI). The at least one matrices may be used for channel equalization, and/or beam forming, etc. The channel may be associated with a venue. The attenuation may be due to signal propagation in the venue, signal propagating/reflection/refraction/diffraction through/at/around air (e.g. air of venue), refraction medium/reflection surface such as wall, doors, furniture, obstacles and/or barriers, etc. The attenuation may be due to reflection at surfaces and obstacles (e.g. reflection surface, obstacle) such as floor, ceiling, furniture, fixtures, objects, people, pets, etc. Each CI may be associated with a timestamp. Each CI may comprise N1 components (e.g. N1 frequency domain components in CFR, N1 time domain components in CIR, or N1 decomposition components). Each component may be associated with a component index. Each component may be a real, imaginary, or complex quantity, magnitude, phase, flag, and/or set. Each CI may comprise a vector or matrix of complex numbers, a set of mixed quantities, and/or a multi-dimensional collection of at least one complex numbers.

Components of a TSCI associated with a particular component index may form a respective component time series associated with the respective index. A TSCI may be divided into N1 component time series. Each respective component time series is associated with a respective component index. The characteristics/STI of the motion of the object may be monitored based on the component time series. In one example, one or more ranges of CI components (e.g. one range being from component 11 to component 23, a second range being from component 44 to component 50, and a third range having only one component) may be selected based on some criteria/cost function/signal quality metric (e.g. based on signal-to-noise ratio, and/or interference level) for further processing.

A component-wise characteristic of a component-feature time series of a TSCI may be computed. The component-wise characteristics may be a scalar (e.g. energy) or a function with a domain and a range (e.g. an autocorrelation function, transform, inverse transform). The characteristics/STI of the motion of the object may be monitored based on the component-wise characteristics. A total characteristics (e.g. aggregate characteristics) of the TSCI may be computed based on the component-wise characteristics of each component time series of the TSCI. The total characteristics may be a weighted average of the component-wise characteristics. The characteristics/STI of the motion of the object may be monitored based on the total characteristics. An aggregate quantity may be a weighted average of individual quantities.

The Type 1 device and Type 2 device may support WiFi, WiMax, 3G/beyond 3G, 4G/beyond 4G, LTE, LTE-A, 5G, 6G, 7G, Bluetooth, NFC, BLE, Zigbee, UWB, UMTS, 3GPP, GSM, EDGE, TDMA, FDMA, CDMA, WCDMA, TD-SCDMA, mesh network, proprietary wireless system, IEEE 802.11 standard, 802.15 standard, 802.16 standard, 3GPP standard, and/or another wireless system.

A common wireless system and/or a common wireless channel may be shared by the Type 1 transceiver and/or the at least one Type 2 transceiver. The at least one Type 2 transceiver may transmit respective signal contemporaneously (or: asynchronously, synchronously, sporadically, continuously, repeatedly, concurrently, simultaneously and/or temporarily) using the common wireless system and/or the common wireless channel. The Type 1 transceiver may transmit a signal to the at least one Type 2 transceiver using the common wireless system and/or the common wireless channel.

Each Type 1 device and Type 2 device may have at least one transmitting/receiving antenna. Each CI may be associated with one of the transmitting antenna of the Type 1 device and one of the receiving antenna of the Type 2 device. Each pair of a transmitting antenna and a receiving antenna may be associated with a link, a path, a communication path, signal hardware path, etc. For example, if the Type 1 device has M (e.g. 3) transmitting antennas, and the Type 2 device has N (e.g. 2) receiving antennas, there may be M×N (e.g. 3×2=6) links or paths. Each link or path may be associated with a TSCI.

The at least one TSCI may correspond to various antenna pairs between the Type 1 device and the Type 2 device. The Type 1 device may have at least one antenna. The Type 2 device may also have at least one antenna. Each TSCI may be associated with an antenna of the Type 1 device and an antenna of the Type 2 device. Averaging or weighted averaging over antenna links may be performed. The averaging or weighted averaging may be over the at least one TSCI. The averaging may optionally be performed on a subset of the at least one TSCI corresponding to a subset of the antenna pairs.

Timestamps of CI of a portion of a TSCI may be irregular and may be corrected so that corrected timestamps of time-corrected CI may be uniformly spaced in time. In the case of multiple Type 1 devices and/or multiple Type 2 devices, the corrected timestamp may be with respect to the same or different clock. An original timestamp associated with each of the CI may be determined. The original timestamp may not be uniformly spaced in time. Original timestamps of all CI of the particular portion of the particular TSCI in the current sliding time window may be corrected so that corrected timestamps of time-corrected CI may be uniformly spaced in time.

The characteristics and/or STI (e.g. motion information) may comprise: location, location coordinate, change in location, position (e.g. initial position, new position), position on map, height, horizontal location, vertical location, distance, displacement, speed, acceleration, rotational speed, rotational acceleration, direction, angle of motion, azimuth, direction of motion, rotation, path, deformation, transformation, shrinking, expanding, gait, gait cycle, head motion, repeated motion, periodic motion, pseudo-periodic motion, impulsive motion, sudden motion, fall-down motion, transient motion, behavior, transient behavior, period of motion, frequency of motion, time trend, temporal profile, temporal characteristics, occurrence, change, temporal change, change of CI, change in frequency, change in timing, change of gait cycle, timing, starting time, initiating time, ending time, duration, history of motion, motion type, motion classification, frequency, frequency spectrum, frequency characteristics, presence, absence, proximity, approaching, receding, identity/identifier of the object, composition of the object, head motion rate, head motion direction, mouth-related rate, eye-related rate, breathing rate, heart rate, tidal volume, depth of breath, inhale time, exhale time, inhale time to exhale time ratio, airflow rate, heart heat-to-beat interval, heart rate variability, hand motion rate, hand motion direction, leg motion, body motion, walking rate, hand motion rate, positional characteristics, characteristics associated with movement (e.g. change in position/location) of the object, tool motion, machine motion, complex motion, and/or combination of multiple motions, event, signal statistics, signal dynamics, anomaly, motion statistics, motion parameter, indication of motion detection, motion magnitude, motion phase, similarity score, distance score, Euclidean distance, weighted distance, L_1 norm, L_2 norm, L_k norm for k>2, statistical distance, correlation, correlation indicator, auto-correlation, covariance, auto-covariance, cross-covariance, inner product, outer product, motion signal transformation, motion feature, presence of motion, absence of motion, motion localization, motion identification, motion recognition, presence of object, absence of object, entrance of object, exit of object, a change of object, motion cycle, motion count, gait cycle, motion rhythm, deformation motion, gesture, handwriting, head motion, mouth motion, heart motion, internal organ motion, motion trend, size, length, area, volume, capacity, shape, form, tag, starting/initiating location, ending location, starting/initiating quantity, ending quantity, event, fall-down event, security event, accident event, home event, office event, factory event, warehouse event, manufacturing event, assembly line event, maintenance event, car-related event, navigation event, tracking event, door event, door-open event, door-close event, window event, window-open event, window-close event, repeatable event, one-time event, consumed quantity, unconsumed quantity, state, physical state, health state, well-being state, emotional state, mental state, another event, analytics, output responses, and/or another information. The characteristics and/or STI may be computed/monitored based on a feature computed from a CI or a TSCI (e.g. feature computation/extraction). A static segment or profile (and/or a dynamic segment/profile) may be identified/computed/analyzed/monitored/extracted/obtained/marked/presented/indicated/highlighted/stored/communicated based on an analysis of the feature. The analysis may comprise a motion detection/movement assessment/presence detection. Computational workload may be shared among the Type 1 device, the Type 2 device and another processor.

The Type 1 device and/or Type 2 device may be a local device. The local device may be: a smart phone, smart device, TV, sound bar, set-top box, access point, router, repeater, wireless signal repeater/extender, remote control, speaker, fan, refrigerator, microwave, oven, coffee machine, hot water pot, utensil, table, chair, light, lamp, door lock, camera, microphone, motion sensor, security device, fire hydrant, garage door, switch, power adapter, computer, dongle, computer peripheral, electronic pad, sofa, tile, accessory, home device, vehicle device, office device, building device, manufacturing device, watch, glasses, clock, television, oven, air-conditioner, accessory, utility, appliance, smart machine, smart vehicle, internet-of-thing (IoT) device, internet-enabled device, computer, portable computer, tablet, smart house, smart office, smart building, smart parking lot, smart system, and/or another device.

Each Type 1 device may be associated with a respective identifier (e.g. ID). Each Type 2 device may also be associated with a respective identify (ID). The ID may comprise: numeral, combination of text and numbers, name, password, account, account ID, web link, web address, index to some information, and/or another ID. The ID may be assigned. The ID may be assigned by hardware (e.g. hardwired, via dongle and/or other hardware), software and/or firmware. The ID may be stored (e.g. in database, in memory, in server (e.g. hub device), in the cloud, stored locally, stored remotely, stored permanently, stored temporarily) and may be retrieved. The ID may be associated with at least one record, account, user, household, address, phone number, social security number, customer number, another ID, another identifier, timestamp, and/or collection of data. The ID and/or part of the ID of a Type 1 device may be made available to a Type 2 device. The ID may be used for registration, initialization, communication, identification, verification, detection, recognition, authentication, access control, cloud access, networking, social networking, logging, recording, cataloging, classification, tagging, association, pairing, transaction, electronic transaction, and/or intellectual property control, by the Type 1 device and/or the Type 2 device.

The object may be person, user, subject, passenger, child, older person, baby, sleeping baby, baby in vehicle, patient, worker, high-value worker, expert, specialist, waiter, customer in mall, traveler in airport/train station/bus terminal/shipping terminals, staff/worker/customer service personnel in factory/mall/supermarket/office/workplace, serviceman in sewage/air ventilation system/lift well, lifts in lift wells, elevator, inmate, people to be tracked/monitored, animal, plant, living object, pet, dog, cat, smart phone, phone accessory, computer, tablet, portable computer, dongle, computing accessory, networked devices, WiFi devices, IoT devices, smart watch, smart glasses, smart devices, speaker, keys, smart key, wallet, purse, handbag, backpack, goods, cargo, luggage, equipment, motor, machine, air conditioner, fan, air conditioning equipment, light fixture, moveable light, television, camera, audio and/or video equipment, stationary, surveillance equipment, parts, signage, tool, cart, ticket, parking ticket, toll ticket, airplane ticket, credit card, plastic card, access card, food packaging, utensil, table, chair, cleaning equipment/tool, vehicle, car, cars in parking facilities, merchandise in warehouse/store/supermarket/distribution center, boat, bicycle, airplane, drone, remote control car/plane/boat, robot, manufacturing device, assembly line, material/unfinished part/robot/wagon/transports on factory floor, object to be tracked in airport/shopping mart/supermarket, non-object, absence of an object, presence of an object, object with form, object with changing form, object with no form, mass of fluid, mass of liquid, mass of gas/smoke, fire, flame, electromagnetic (EM) source, EM medium, and/or another object. The object itself may be communicatively coupled with some network, such as WiFi, MiFi, 3G/4G/LTE/5G/6G/7G, Bluetooth, NFC, BLE, WiMax, Zigbee, UMTS, 3GPP, GSM, EDGE, TDMA, FDMA, CDMA, WCDMA, TD-SCDMA, mesh network, adhoc network, and/or other network. The object itself may be bulky with AC power supply, but is moved during installation, cleaning, maintenance, renovation, etc. It may also be installed in moveable platform such as lift, pad, movable, platform, elevator, conveyor belt, robot, drone, forklift, car, boat, vehicle, etc. The object may have multiple parts, each part with different movement (e.g. change in position/location). For example, the object may be a person walking forward. While walking, his left hand and right hand may move in different direction, with different instantaneous speed, acceleration, motion, etc.

The wireless transmitter (e.g. Type 1 device), the wireless receiver (e.g. Type 2 device), another wireless transmitter and/or another wireless receiver may move with the object and/or another object (e.g. in prior movement, current movement and/or future movement. They may be communicatively coupled to one or more nearby device. They may transmit TSCI and/or information associated with the TSCI to the nearby device, and/or each other. They may be with the nearby device. The wireless transmitter and/or the wireless receiver may be part of a small (e.g. coin-size, cigarette box size, or even smaller), light-weight portable device. The portable device may be wirelessly coupled with a nearby device.

The nearby device may be smart phone, iPhone, Android phone, smart device, smart appliance, smart vehicle, smart gadget, smart TV, smart refrigerator, smart speaker, smart watch, smart glasses, smart pad, iPad, computer, wearable computer, notebook computer, gateway. The nearby device may be connected to a cloud server, local server (e.g. hub device) and/or other server via internet, wired internet connection and/or wireless internet connection. The nearby device may be portable. The portable device, the nearby device, a local server (e.g. hub device) and/or a cloud server may share the computation and/or storage for a task (e.g.

obtain TSCI, determine characteristics/STI of the object associated with the movement (e.g. change in position/location) of the object, computation of time series of power (e.g. signal strength) information, determining/computing the particular function, searching for local extremum, classification, identifying particular value of time offset, denoising, processing, simplification, cleaning, wireless smart sensing task, extract CI from signal, switching, segmentation, estimate trajectory/path/track, process the map, processing trajectory/path/track based on environment models/constraints/limitations, correction, corrective adjustment, adjustment, map-based (or model-based) correction, detecting error, checking for boundary hitting, thresholding) and information (e.g. TSCI). The nearby device may/may not move with the object. The nearby device may be portable/not portable/moveable/non-moveable. The nearby device may use battery power, solar power, AC power and/or other power source. The nearby device may have replaceable/non-replaceable battery, and/or rechargeable/non-rechargeable battery. The nearby device may be similar to the object. The nearby device may have identical (and/or similar) hardware and/or software to the object. The nearby device may be a smart device, network enabled device, device with connection to WiFi/3G/4G/5G/6G/Zigbee/Bluetooth/NFC/UMTS/3GPP/GSM/EDGE/TDMA/FDMA/CDMA/WCDMA/TD-SCDMA/adhoc network/other network, smart speaker, smart watch, smart clock, smart appliance, smart machine, smart equipment, smart tool, smart vehicle, internet-of-thing (IoT) device, internet-enabled device, computer, portable computer, tablet, and another device. The nearby device and/or at least one processor associated with the wireless receiver, the wireless transmitter, the another wireless receiver, the another wireless transmitter and/or a cloud server (in the cloud) may determine the initial STI of the object. Two or more of them may determine the initial spatial-temporal info jointly. Two or more of them may share intermediate information in the determination of the initial STI (e.g. initial position).

In one example, the wireless transmitter (e.g. Type 1 device, or Tracker Bot) may move with the object. The wireless transmitter may send the signal to the wireless receiver (e.g. Type 2 device, or Origin Register) or determining the initial STI (e.g. initial position) of the object. The wireless transmitter may also send the signal and/or another signal to another wireless receiver (e.g. another Type 2 device, or another Origin Register) for the monitoring of the motion (spatial-temporal info) of the object. The wireless receiver may also receive the signal and/or another signal from the wireless transmitter and/or the another wireless transmitter for monitoring the motion of the object. The location of the wireless receiver and/or the another wireless receiver may be known. In another example, the wireless receiver (e.g. Type 2 device, or Tracker Bot) may move with the object. The wireless receiver may receive the signal transmitted from the wireless transmitter (e.g. Type 1 device, or Origin Register) for determining the initial spatial-temporal info (e.g. initial position) of the object. The wireless receiver may also receive the signal and/or another signal from another wireless transmitter (e.g. another Type 1 device, or another Origin Register) for the monitoring of the current motion (e.g. spatial-temporal info) of the object. The wireless transmitter may also transmit the signal and/or another signal to the wireless receiver and/or the another wireless receiver (e.g. another Type 2 device, or another Tracker Bot) for monitoring the motion of the object. The location of the wireless transmitter and/or the another wireless transmitter may be known.

The venue may be a space such as a sensing area, room, house, office, property, workplace, hallway, walkway, lift, lift well, escalator, elevator, sewage system, air ventilations system, staircase, gathering area, duct, air duct, pipe, tube, enclosed space, enclosed structure, semi-enclosed structure, enclosed area, area with at least one wall, plant, machine, engine, structure with wood, structure with glass, structure with metal, structure with walls, structure with doors, structure with gaps, structure with reflection surface, structure with fluid, building, rooftop, store, factory, assembly line, hotel room, museum, classroom, school, university, government building, warehouse, garage, mall, airport, train station, bus terminal, hub, transportation hub, shipping terminal, government facility, public facility, school, university, entertainment facility, recreational facility, hospital, pediatric/neonatal wards, seniors home, elderly care facility, geriatric facility, community center, stadium, playground, park, field, sports facility, swimming facility, track and/or field, basketball court, tennis court, soccer stadium, baseball stadium, gymnasium, hall, garage, shopping mart, mall, supermarket, manufacturing facility, parking facility, construction site, mining facility, transportation facility, highway, road, valley, forest, wood, terrain, landscape, den, patio, land, path, amusement park, urban area, rural area, suburban area, metropolitan area, garden, square, plaza, music hall, downtown facility, over-air facility, semi-open facility, closed area, train platform, train station, distribution center, warehouse, store, distribution center, storage facility, underground facility, space (e.g. above ground, outer-space) facility, floating facility, cavern, tunnel facility, indoor facility, open-air facility, outdoor facility with some walls/doors/reflective barriers, open facility, semi-open facility, car, truck, bus, van, container, ship/boat, submersible, train, tram, airplane, vehicle, mobile home, cave, tunnel, pipe, channel, metropolitan area, downtown area with relatively tall buildings, valley, well, duct, pathway, gas line, oil line, water pipe, network of interconnecting pathways/alleys/roads/tubes/cavities/caves/pipe-like structure/air space/fluid space, human body, animal body, body cavity, organ, bone, teeth, soft tissue, hard tissue, rigid tissue, non-rigid tissue, blood/body fluid vessel, windpipe, air duct, den, etc. The venue may be indoor space, outdoor space, The venue may include both the inside and outside of the space. For example, the venue may include both the inside of a building and the outside of the building. For example, the venue can be a building that has one floor or multiple floors, and a portion of the building can be underground. The shape of the building can be, e.g., round, square, rectangular, triangle, or irregular-shaped. These are merely examples. The disclosure can be used to detect events in other types of venue or spaces.

The wireless transmitter (e.g. Type 1 device) and/or the wireless receiver (e.g. Type 2 device) may be embedded in a portable device (e.g. a module, or a device with the module) that may move with the object (e.g. in prior movement and/or current movement). The portable device may be communicatively coupled with the object using a wired connection (e.g. through USB, microUSB, Firewire, HDMI, serial port, parallel port, and other connectors) and/or a connection (e.g. Bluetooth, Bluetooth Low Energy (BLE), WiFi, LTE, NFC, ZigBee). The portable device may be a lightweight device. The portable may be powered by battery, rechargeable battery and/or AC power. The portable device may be very small (e.g. at sub-millimeter scale and/or sub-centimeter scale), and/or small (e.g. coin-size, card-size, pocket-size, or larger). The portable device may be large, sizable, and/or bulky (e.g. heavy machinery to be installed).

The portable device may be a WiFi hotspot, access point, mobile WiFi (MiFi), dongle with USB/micro USB/Firewire/other connector, smartphone, portable computer, computer, tablet, smart device, internet-of-thing (IoT) device, WiFi-enabled device, LTE-enabled device, a smart watch, smart glass, smart mirror, smart antenna, smart battery, smart light, smart pen, smart ring, smart door, smart window, smart clock, small battery, smart wallet, smart belt, smart handbag, smart clothing/garment, smart ornament, smart packaging, smart paper/book/magazine/poster/printed matter/signage/display/lighted system/lighting system, smart key/tool, smart bracelet/chain/necklace/wearable/accessory, smart pad/cushion, smart tile/block/brick/building material/other material, smart garbage can/waste container, smart food carriage/storage, smart ball/racket, smart chair/sofa/bed, smart shoe/footwear/carpet/mat/shoe rack, smart glove/hand wear/ring/hand ware, smart hat/headwear/makeup/sticker/tattoo, smart mirror, smart toy, smart pill, smart utensil, smart bottle/food container, smart tool, smart device, IoT device, WiFi enabled device, network enabled device, 3G/4G/5G/6G enabled device, UMTS devices, 3GPP devices, GSM devices, EDGE devices, TDMA devices, FDMA devices, CDMA devices, WCDMA devices, TD-SCDMA devices, embeddable device, implantable device, air conditioner, refrigerator, heater, furnace, furniture, oven, cooking device, television/set-top box (STB)/DVD player/audio player/video player/remote control, hi-fi, audio device, speaker, lamp/light, wall, door, window, roof, roof tile/shingle/structure/attic structure/device/feature/installation/fixtures, lawn mower/garden tools/yard tools/mechanics tools/garage tools/, garbage can/container, 20-ft/40-ft container, storage container, factory/manufacturing/production device, repair tools, fluid container, machine, machinery to be installed, vehicle, cart, wagon, warehouse vehicle, car, bicycle, motorcycle, boat, vessel, airplane, basket/box/bag/bucket/container, smart plate/cup/bowl/pot/mat/utensils/kitchen tools/kitchen devices/kitchen accessories/cabinets/tables/chairs/tiles/lights/water pipes/taps/gas range/oven/dishwashing machine/etc. The portable device may have a battery that may be replaceable, irreplaceable, rechargeable, and/or non-rechargeable. The portable device may be wirelessly charged. The portable device may be a smart payment card. The portable device may be a payment card used in parking lots, highways, entertainment parks, or other venues/facilities that need payment. The portable device may have an identity (ID)/identifier as described above.

An event may be monitored based on the TSCI. The event may be an object related event, such as fall-down of the object (e.g. an person and/or a sick person), rotation, hesitation, pause, impact (e.g. a person hitting a sandbag, door, window, bed, chair, table, desk, cabinet, box, another person, animal, bird, fly, table, chair, ball, bowling ball, tennis ball, football, soccer ball, baseball, basketball, volley ball), two-body action (e.g. a person letting go a balloon, catching a fish, molding a clay, writing a paper, person typing on a computer), car moving in a garage, person carrying a smart phone and walking around an airport/mall/government building/office/etc., autonomous moveable object/machine moving around (e.g. vacuum cleaner, utility vehicle, car, drone, self-driving car). The task or the wireless smart sensing task may comprise: object detection, presence detection, proximity detection, object recognition, activity recognition, object verification, object counting, daily activity monitoring, well-being monitoring, vital sign monitoring, health condition monitoring, baby monitoring, elderly monitoring, sleep monitoring, sleep stage monitoring, walking monitoring, exercise monitoring, tool detection, tool recognition, tool verification, patient detection, patient monitoring, patient verification, machine detection, machine recognition, machine verification, human detection, human recognition, human verification, baby detection, baby recognition, baby verification, human breathing detection, human breathing recognition, human breathing estimation, human breathing verification, human heart beat detection, human heart beat recognition, human heart beat estimation, human heart beat verification, fall-down detection, fall-down recognition, fall-down estimation, fall-down verification, emotion detection, emotion recognition, emotion estimation, emotion verification, motion detection, motion degree estimation, motion recognition, motion estimation, motion verification, periodic motion detection, periodic motion recognition, periodic motion estimation, periodic motion verification, repeated motion detection, repeated motion recognition, repeated motion estimation, repeated motion verification, stationary motion detection, stationary motion recognition, stationary motion estimation, stationary motion verification, cyclo-stationary motion detection, cyclo-stationary motion recognition, cyclo-stationary motion estimation, cyclo-stationary motion verification, transient motion detection, transient motion recognition, transient motion estimation, transient motion verification, trend detection, trend recognition, trend estimation, trend verification, breathing detection, breathing recognition, breathing estimation, breathing estimation, human biometrics detection, human biometric recognition, human biometrics estimation, human biometrics verification, environment informatics detection, environment informatics recognition, environment informatics estimation, environment informatics verification, gait detection, gait recognition, gait estimation, gait verification, gesture detection, gesture recognition, gesture estimation, gesture verification, machine learning, supervised learning, unsupervised learning, semi-supervised learning, clustering, feature extraction, featuring training, principal component analysis, eigen-decomposition, frequency decomposition, time decomposition, time-frequency decomposition, functional decomposition, other decomposition, training, discriminative training, supervised training, unsupervised training, semi-supervised training, neural network, sudden motion detection, fall-down detection, danger detection, life-threat detection, regular motion detection, stationary motion detection, cyclo-stationary motion detection, intrusion detection, suspicious motion detection, security, safety monitoring, navigation, guidance, map-based processing, map-based correction, model-based processing/correction, irregularity detection, locationing, room sensing, tracking, multiple object tracking, indoor tracking, indoor position, indoor navigation, energy management, power transfer, wireless power transfer, object counting, car tracking in parking garage, activating a device/system (e.g. security system, access system, alarm, siren, speaker, television, entertaining system, camera, heater/air-conditioning (HVAC) system, ventilation system, lighting system, gaming system, coffee machine, cooking device, cleaning device, housekeeping device), geometry estimation, augmented reality, wireless communication, data communication, signal broadcasting, networking, coordination, administration, encryption, protection, cloud computing, other processing and/or other task. The task may be performed by the Type 1 device, the Type 2 device, another Type 1 device, another Type 2 device, a nearby device, a local server (e.g. hub device), edge server, a cloud server, and/or another device. The task may be based on TSCI between any pair of Type 1 device and Type 2 device. A Type 2 device may be a Type 1 device, and vice versa. A Type 2 device may play/perform the role (e.g. functionality) of Type 1 device temporarily, continuously, sporadically, simultaneously, and/or contemporaneously, and vice versa. A first part of the task may comprise at least one of: preprocessing, processing, signal conditioning, signal processing, post-processing, processing sporadically/continuously/simultaneously/contemporaneously/dynamically/adaptive/on-demand/as-needed, calibrating, denoising, feature extraction, coding, encryption, transformation, mapping, motion detection, motion estimation, motion change detection, motion pattern detection, motion pattern estimation, motion pattern recognition, vital sign detection, vital sign estimation, vital sign recognition, periodic motion detection, periodic motion estimation, repeated motion detection/estimation, breathing rate detection, breathing rate estimation, breathing pattern detection, breathing pattern estimation, breathing pattern recognition, heart beat detection, heart beat estimation, heart pattern detection, heart pattern estimation, heart pattern recognition, gesture detection, gesture estimation, gesture recognition, speed detection, speed estimation, object locationing, object tracking, navigation, acceleration estimation, acceleration detection, fall-down detection, change detection, intruder (and/or illegal action) detection, baby detection, baby monitoring, patient monitoring, object recognition, wireless power transfer, and/or wireless charging.

A second part of the task may comprise at least one of: a smart home task, smart office task, smart building task, smart factory task (e.g. manufacturing using a machine or an assembly line), smart internet-of-thing (IoT) task, smart system task, smart home operation, smart office operation, smart building operation, smart manufacturing operation (e.g. moving supplies/parts/raw material to a machine/an assembly line), IoT operation, smart system operation, turning on a light, turning off the light, controlling the light in at least one of: a room, region, and/or the venue, playing a sound clip, playing the sound clip in at least one of: the room, the region, and/or the venue, playing the sound clip of at least one of: a welcome, greeting, farewell, first message, and/or a second message associated with the first part of the task, turning on an appliance, turning off the appliance, controlling the appliance in at least one of: the room, the region, and/or the venue, turning on an electrical system, turning off the electrical system, controlling the electrical system in at least one of: the room, the region, and/or the venue, turning on a security system, turning off the security system, controlling the security system in at least one of: the room, the region, and/or the venue, turning on a mechanical system, turning off a mechanical system, controlling the mechanical system in at least one of: the room, the region, and/or the venue, and/or controlling at least one of: an air conditioning system, heating system, ventilation system, lighting system, heating device, stove, entertainment system, door, fence, window, garage, computer system, networked device, networked system, home appliance, office equipment, lighting device, robot (e.g. robotic arm), smart vehicle, smart machine, assembly line, smart device, internet-of-thing (IoT) device, smart home device, and/or a smart office device.

The task may include: detect a user returning home, detect a user leaving home, detect a user moving from one room to another, detect/control/lock/unlock/open/close/partially open a window/door/garage door/blind/curtain/panel/solar panel/sun shade, detect a pet, detect/monitor a user doing something (e.g. sleeping on sofa, sleeping in bedroom, running on treadmill, cooking, sitting on sofa, watching TV, eating in kitchen, eating in dining room, going upstairs/downstairs, going outside/coming back, in the rest room), monitor/detect location of a user/pet, do something (e.g. send a message, notify/report to someone) automatically upon detection, do something for the user automatically upon detecting the user, turn on/off/dim a light, turn on/off music/radio/home entertainment system, turn on/off/adjust/control TV/HiFi/set-top-box (STB)/home entertainment system/smart speaker/smart device, turn on/off/adjust air conditioning system, turn on/off/adjust ventilation system, turn on/off/adjust heating system, adjust/control curtains/light shades, turn on/off/wake a computer, turn on/off/pre-heat/control coffee machine/hot water pot, turn on/off/control/preheat cooker/oven/microwave oven/another cooking device, check/adjust temperature, check weather forecast, check telephone message box, check mail, do a system check, control/adjust a system, check/control/arm/disarm security system/baby monitor, check/control refrigerator, give a report (e.g. through a speaker such as Google home, Amazon Echo, on a display/screen, via a webpage/email/messaging system/notification system).

For example, when a user arrives home in his car, the task may be to, automatically, detect the user or his car approaching, open the garage door upon detection, turn on the driveway/garage light as the user approaches the garage, turn on air conditioner/heater/fan, etc. As the user enters the house, the task may be to, automatically, turn on the entrance light, turn off driveway/garage light, play a greeting message to welcome the user, turn on the music, turn on the radio and tuning to the user's favorite radio news channel, open the curtain/blind, monitor the user's mood, adjust the lighting and sound environment according to the user's mood or the current/imminent event (e.g. do romantic lighting and music because the user is scheduled to eat dinner with girlfriend in 1 hour) on the user's daily calendar, warm the food in microwave that the user prepared in the morning, do a diagnostic check of all systems in the house, check weather forecast for tomorrow's work, check news of interest to the user, check user's calendar and to-do list and play reminder, check telephone answer system/messaging system/email and give a verbal report using dialog system/speech synthesis, remind (e.g. using audible tool such as speakers/HiFi/speech synthesis/sound/voice/music/song/sound field/background sound field/dialog system, using visual tool such as TV/entertainment system/computer/notebook/smart pad/display/light/color/brightness/patterns/symbols, using haptic tool/virtual reality tool/gesture/tool, using a smart device/appliance/material/furniture/fixture, using web tool/server/hub device/cloud server/fog server/edge server/home network/mesh network, using messaging tool/notification tool/communication tool/scheduling tool/email, using user interface/GUI, using scent/smell/fragrance/taste, using neural tool/nervous system tool, using a combination) the user of his mother's birthday and to call her, prepare a report, and give the report (e.g. using a tool for reminding as discussed above). The task may turn on the air conditioner/heater/ventilation system in advance, or adjust temperature setting of smart thermostat in advance, etc. As the user moves from the entrance to the living room, the task may be to turn on the living room light, open the living room curtain, open the window, turn off the entrance light behind the user, turn on the TV and set-top box, set TV to the user's favorite channel, adjust an appliance according to the user's preference and conditions/states (e.g. adjust lighting and choose/play music to build a romantic atmosphere), etc.

Another example may be: When the user wakes up in the morning, the task may be to detect the user moving around in the bedroom, open the blind/curtain, open the window, turn off the alarm clock, adjust indoor temperature from night-time temperature profile to day-time temperature profile, turn on the bedroom light, turn on the restroom light as the user approaches the restroom, check radio or streaming channel and play morning news, turn on the coffee machine and preheat the water, turn off security system, etc. When the user walks from bedroom to kitchen, the task may be to turn on the kitchen and hallway lights, turn off the bedroom and restroom lights, move the music/message/reminder from the bedroom to the kitchen, turn on the kitchen TV, change TV to morning news channel, lower the kitchen blind and open the kitchen window to bring in fresh air, unlock backdoor for the user to check the backyard, adjust temperature setting for the kitchen, etc. Another example may be: When the user leaves home for work, the task may be to detect the user leaving, play a farewell and/or have-a-good-day message, open/close garage door, turn on/off garage light and driveway light, turn off/dim lights to save energy (just in case the user forgets), close/lock all windows/doors (just in case the user forgets), turn off appliance (especially stove, oven, microwave oven), turn on/arm the home security system to guard the home against any intruder, adjust air conditioning/heating/ventilation systems to "away-from-home" profile to save energy, send alerts/reports/updates to the user's smart phone, etc.

A motion may comprise at least one of: a no-motion, resting motion, non-moving motion, movement, change in position/location, deterministic motion, transient motion, fall-down motion, repeating motion, periodic motion, pseudo-periodic motion, periodic/repeated motion associated with breathing, periodic/repeated motion associated with heartbeat, periodic/repeated motion associated with living object, periodic/repeated motion associated with machine, periodic/repeated motion associated with man-made object, periodic/repeated motion associated with nature, complex motion with transient element and periodic element, repetitive motion, non-deterministic motion, probabilistic motion, chaotic motion, random motion, complex motion with non-deterministic element and deterministic element, stationary random motion, pseudo-stationary random motion, cyclo-stationary random motion, non-stationary random motion, stationary random motion with periodic autocorrelation function (ACF), random motion with periodic ACF for period of time, random motion that is pseudo-stationary for a period of time, random motion of which an instantaneous ACF has a pseudo-periodic/repeating element for a period of time, machine motion, mechanical motion, vehicle motion, drone motion, air-related motion, wind-related motion, weather-related motion, water-related motion, fluid-related motion, ground-related motion, change in electro-magnetic characteristics, sub-surface motion, seismic motion, plant motion, animal motion, human motion, normal motion, abnormal motion, dangerous motion, warning motion, suspicious motion, rain, fire, flood, tsunami, explosion, collision, imminent collision, human body motion, head motion, facial motion, eye motion, mouth motion, tongue motion, neck motion, finger motion, hand motion, arm motion, shoulder motion, body motion, chest motion, abdominal motion, hip motion, leg motion, foot motion, body joint motion, knee motion, elbow motion, upper body motion, lower body motion, skin motion, below-skin motion, subcutaneous tissue motion, blood vessel motion, intravenous motion, organ motion, heart motion, lung motion, stomach motion, intestine motion, bowel motion, eating motion, breathing motion, facial expression, eye expression, mouth expression, talking motion, singing motion, eating motion, gesture, hand gesture, arm gesture, keystroke, typing stroke, user-interface gesture, man-machine interaction, gait, dancing movement, coordinated movement, and/or coordinated body movement.

The heterogeneous IC of the Type 1 device and/or any Type 2 receiver may comprise low-noise amplifier (LNA), power amplifier, transmit-receive switch, media access controller, baseband radio, 2.4 GHz radio, 3.65 GHz radio, 4.9 GHz radio, 5 GHz radio, 5.9 GHz radio, below 6 GHz radio, below 60 GHz radio and/or another radio. The heterogeneous IC may comprise a processor, a memory communicatively coupled with the processor, and a set of instructions stored in the memory to be executed by the processor. The IC and/or any processor may comprise at least one of: general purpose processor, special purpose processor, microprocessor, multi-processor, multi-core processor, parallel processor, CISC processor, RISC processor, microcontroller, central processing unit (CPU), graphical processor unit (GPU), digital signal processor (DSP), application specific integrated circuit (ASIC), field programmable gate array (FPGA), embedded processor (e.g. ARM), logic circuit, other programmable logic device, discrete logic, and/or a combination. The heterogeneous IC may support broadband network, wireless network, mobile network, mesh network, cellular network, wireless local area network (WLAN), wide area network (WAN), and metropolitan area network (MAN), WLAN standard, WiFi, LTE, LTE-A, LTE-U, 802.11 standard, 802.11a, 802.11b, 802.11g, 802.11n, 802.11ac, 802.11ad, 802.11af, 802.11ah, 802.11ax, 802.11ay, mesh network standard, 802.15 standard, 802.16 standard, cellular network standard, 3G, 3.5G, 4G, beyond 4G, 4.5G, 5G, 6G, 7G, 8G, 9G, UMTS, 3GPP, GSM, EDGE, TDMA, FDMA, CDMA, WCDMA, TD-SCDMA, Bluetooth, Bluetooth Low-Energy (BLE), NFC, Zigbee, WiMax, and/or another wireless network protocol.

The processor may comprise general purpose processor, special purpose processor, microprocessor, microcontroller, embedded processor, digital signal processor, central processing unit (CPU), graphical processing unit (GPU), multi-processor, multi-core processor, and/or processor with graphics capability, and/or a combination. The memory may be volatile, non-volatile, random access memory (RAM), Read Only Memory (ROM), Electrically Programmable ROM (EPROM), Electrically Erasable Programmable ROM (EEPROM), hard disk, flash memory, CD-ROM, DVD-ROM, magnetic storage, optical storage, organic storage, storage system, storage network, network storage, cloud storage, edge storage, local storage, external storage, internal storage, or other form of non-transitory storage medium known in the art. The set of instructions (machine executable code) corresponding to the method steps may be embodied directly in hardware, in software, in firmware, or in combinations thereof. The set of instructions may be embedded, pre-loaded, loaded upon boot up, loaded on the fly, loaded on demand, pre-installed, installed, and/or downloaded.

The presentation may be a presentation in an audio-visual way (e.g. using combination of visual, graphics, text, symbols, color, shades, video, animation, sound, speech, audio, etc.), graphical way (e.g. using GUI, animation, video), textual way (e.g. webpage with text, message, animated text), symbolic way (e.g. emoticon, signs, hand gesture), or mechanical way (e.g. vibration, actuator movement, haptics, etc.).

Computational workload associated with the method is shared among the processor, the Type 1 heterogeneous wireless device, the Type 2 heterogeneous wireless device, a local server (e.g. hub device), a cloud server, and another processor.

An operation, pre-processing, processing and/or postprocessing may be applied to data (e.g. TSCI, autocorrelation, features of TSCI). An operation may be preprocessing, processing and/or postprocessing. The preprocessing, processing and/or postprocessing may be an operation. An operation may comprise preprocessing, processing, postprocessing, scaling, computing a confidence factor, computing a line-of-sight (LOS) quantity, computing a non-LOS (NLOS) quantity, a quantity comprising LOS and NLOS, computing a single link (e.g. path, communication path, link between a transmitting antenna and a receiving antenna) quantity, computing a quantity comprising multiple links, computing a function of the operands, filtering, linear filtering, nonlinear filtering, folding, grouping, energy computation, lowpass filtering, bandpass filtering, highpass filtering, median filtering, rank filtering, quartile filtering, percentile filtering, mode filtering, finite impulse response (FIR) filtering, infinite impulse response (IIR) filtering, moving average (MA) filtering, autoregressive (AR) filtering, autoregressive moving averaging (ARMA) filtering, selective filtering, adaptive filtering, interpolation, decimation, subsampling, upsampling, resampling, time correction, time base correction, phase correction, magnitude correction, phase cleaning, magnitude cleaning, matched filtering, enhancement, restoration, denoising, smoothing, signal conditioning, enhancement, restoration, spectral analysis, linear transform, nonlinear transform, inverse transform, frequency transform, inverse frequency transform, Fourier transform (FT), discrete time FT (DTFT), discrete FT (DFT), fast FT (FFT), wavelet transform, Laplace transform, Hilbert transform, Hadamard transform, trigonometric transform, sine transform, cosine transform, DCT, power-of-2 transform, sparse transform, graph-based transform, graph signal processing, fast transform, a transform combined with zero padding, cyclic padding, padding, zero padding, feature extraction, decomposition, projection, orthogonal projection, non-orthogonal projection, over-complete projection, eigen-decomposition, singular value decomposition (SVD), principle component analysis (PCA), independent component analysis (ICA), grouping, sorting, thresholding, soft thresholding, hard thresholding, clipping, soft clipping, first derivative, second order derivative, high order derivative, convolution, multiplication, division, addition, subtraction, integration, maximization, minimization, least mean square error, recursive least square, constrained least square, batch least square, least absolute error, least mean square deviation, least absolute deviation, local maximization, local minimization, optimization of a cost function, neural network, recognition, labeling, training, clustering, machine learning, supervised learning, unsupervised learning, semi-supervised learning, comparison with another TSCI, similarity score computation, quantization, vector quantization, matching pursuit, compression, encryption, coding, storing, transmitting, normalization, temporal normalization, frequency domain normalization, classification, clustering, labeling, tagging, learning, detection, estimation, learning network, mapping, remapping, expansion, storing, retrieving, transmitting, receiving, representing, merging, combining, splitting, tracking, monitoring, matched filtering, Kalman filtering, particle filter, intrapolation, extrapolation, histogram estimation, importance sampling, Monte Carlo sampling, compressive sensing, representing, merging, combining, splitting, scrambling, error protection, forward error correction, doing nothing, time varying processing, conditioning averaging, weighted averaging, arithmetic mean, geometric mean, harmonic mean, averaging over selected frequency, averaging over antenna links, logical operation, permutation, combination, sorting, AND, OR, XOR, union, intersection, vector addition, vector subtraction, vector multiplication, vector division, inverse, norm, distance, and/or another operation. The operation may be the preprocessing, processing, and/or post-processing. Operations may be applied jointly on multiple time series or functions.

The function (e.g. function of operands) may comprise: scalar function, vector function, discrete function, continuous function, polynomial function, characteristics, feature, magnitude, phase, exponential function, logarithmic function, trigonometric function, transcendental function, logical function, linear function, algebraic function, nonlinear function, piecewise linear function, real function, complex function, vector-valued function, inverse function, derivative of function, integration of function, circular function, function of another function, one-to-one function, one-to-many function, many-to-one function, many-to-many function, zero crossing, absolute function, indicator function, mean, mode, median, range, statistics, histogram, variance, standard deviation, measure of variation, spread, dispersion, deviation, divergence, range, interquartile range, total variation, absolute deviation, total deviation, arithmetic mean, geometric mean, harmonic mean, trimmed mean, percentile, square, cube, root, power, sine, cosine, tangent, cotangent, secant, cosecant, elliptical function, parabolic function, hyperbolic function, game function, zeta function, absolute value, thresholding, limiting function, floor function, rounding function, sign function, quantization, piecewise constant function, composite function, function of function, time function processed with an operation (e.g. filtering), probabilistic function, stochastic function, random function, ergodic function, stationary function, deterministic function, periodic function, repeated function, transformation, frequency transform, inverse frequency transform, discrete time transform, Laplace transform, Hilbert transform, sine transform, cosine transform, triangular transform, wavelet transform, integer transform, power-of-2 transform, sparse transform, projection, decomposition, principle component analysis (PCA), independent component analysis (ICA), neural network, feature extraction, moving function, function of moving window of neighboring items of time series, filtering function, convolution, mean function, histogram, variance/standard deviation function, statistical function, short-time transform, discrete transform, discrete Fourier transform, discrete cosine transform, discrete sine transform, Hadamard transform, eigen-decomposition, eigenvalue, singular value decomposition (SVD), singular value, orthogonal decomposition, matching pursuit, sparse transform, sparse approximation, any decomposition, graph-based processing, graph-based transform, graph signal processing, classification, identifying a class/group/category, labeling, learning, machine learning, detection, estimation, feature extraction, learning network, feature extraction, denoising, signal enhancement, coding, encryption, mapping, remapping, vector quantization, lowpass filtering, highpass filtering, bandpass filtering, matched filtering, Kalman filtering, preprocessing, postprocessing, particle filter, FIR filtering, IIR filtering, autoregressive (AR) filtering, adaptive filtering, first order derivative, high order derivative, integration, zero crossing, smoothing, median filtering, mode filtering, sampling, random sampling, resampling function, downsampling, down-converting, upsampling, up-converting, interpolation, extrapolation, importance sampling, Monte Carlo sampling, compressive sensing, statistics, short term statistics, long term statistics, autocorrelation function, cross correlation, moment generating function, time averaging, weighted averaging, special function, Bessel function, error function, complementary error function, Beta function, Gamma function, integral function, Gaussian function, Poisson function, etc. Machine learning, training, discriminative training, deep learning, neural network, continuous time processing, distributed computing, distributed storage, acceleration using GPU/DSP/coprocessor/multicore/multi-processing may be applied to a step (or each step) of this disclosure.

A frequency transform may include Fourier transform, Laplace transform, Hadamard transform, Hilbert transform, sine transform, cosine transform, triangular transform, wavelet transform, integer transform, power-of-2 transform, combined zero padding and transform, Fourier transform with zero padding, and/or another transform. Fast versions and/or approximated versions of the transform may be performed. The transform may be performed using floating point, and/or fixed point arithmetic.

An inverse frequency transform may include inverse Fourier transform, inverse Laplace transform, inverse Hadamard transform, inverse Hilbert transform, inverse sine transform, inverse cosine transform, inverse triangular transform, inverse wavelet transform, inverse integer transform, inverse power-of-2 transform, combined zero padding and transform, inverse Fourier transform with zero padding, and/or another transform. Fast versions and/or approximated versions of the transform may be performed. The transform may be performed using floating point, and/or fixed point arithmetic.

A quantity/feature from a TSCI may be computed. The quantity may comprise statistic of at least one of: motion, location, map coordinate, height, speed, acceleration, movement angle, rotation, size, volume, time trend, pattern, one-time pattern, repeating pattern, evolving pattern, time pattern, mutually excluding patterns, related/correlated patterns, cause-and-effect, correlation, short-term/long-term correlation, tendency, inclination, statistics, typical behavior, atypical behavior, time trend, time profile, periodic motion, repeated motion, repetition, tendency, change, abrupt change, gradual change, frequency, transient, breathing, gait, action, event, suspicious event, dangerous event, alarming event, warning, belief, proximity, collision, power, signal, signal power, signal strength, signal intensity, received signal strength indicator (RSSI), signal amplitude, signal phase, signal frequency component, signal frequency band component, channel state information (CSI), map, time, frequency, time-frequency, decomposition, orthogonal decomposition, non-orthogonal decomposition, tracking, breathing, heart beat, statistical parameters, cardiopulmonary statistics/analytics (e.g. output responses), daily activity statistics/analytics, chronic disease statistics/analytics, medical statistics/analytics, an early (or instantaneous or contemporaneous or delayed) indication/suggestion/sign/indicator/verifier/detection/symptom of a disease/condition/situation, biometric, baby, patient, machine, device, temperature, vehicle, parking lot, venue, lift, elevator, spatial, road, fluid flow, home, room, office, house, building, warehouse, storage, system, ventilation, fan, pipe, duct, people, human, car, boat, truck, airplane, drone, downtown, crowd, impulsive event, cyclo-stationary, environment, vibration, material, surface, 3-dimensional, 2-dimensional, local, global, presence, and/or another measurable quantity/variable.

Sliding time window may have time varying window width. It may be smaller at the beginning to enable fast acquisition and may increase over time to a steady-state size. The steady-state size may be related to the frequency, repeated motion, transient motion, and/or STI to be monitored. Even in steady state, the window size may be adaptively (and/or dynamically) changed (e.g. adjusted, varied, modified) based on battery life, power consumption, available computing power, change in amount of targets, the nature of motion to be monitored, etc.

The time shift between two sliding time windows at adjacent time instance may be constant/variable/locally adaptive/dynamically adjusted over time. When shorter time shift is used, the update of any monitoring may be more frequent which may be used for fast changing situations, object motions, and/or objects. Longer time shift may be used for slower situations, object motions, and/or objects. The window width/size and/or time shift may be changed (e.g. adjusted, varied, modified) upon a user request/choice. The time shift may be changed automatically (e.g. as controlled by processor/computer/server/hub device/cloud server) and/or adaptively (and/or dynamically).

At least one characteristics (e.g. characteristic value, or characteristic point) of a function (e.g. auto-correlation function, auto-covariance function, cross-correlation function, cross-covariance function, power spectral density, time function, frequency domain function, frequency transform) may be determined (e.g. by an object tracking server, the processor, the Type 1 heterogeneous device, the Type 2 heterogeneous device, and/or another device). The at least one characteristics of the function may include: a maximum, minimum, extremum, local maximum, local minimum, local extremum, local extremum with positive time offset, first local extremum with positive time offset, n^th local extremum with positive time offset, local extremum with negative time offset, first local extremum with negative time offset, n^th local extremum with negative time offset, constrained maximum, constrained minimum, constrained extremum, significant maximum, significant minimum, significant extremum, slope, derivative, higher order derivative, maximum slope, minimum slope, local maximum slope, local maximum slope with positive time offset, local minimum slope, constrained maximum slope, constrained minimum slope, maximum higher order derivative, minimum higher order derivative, constrained higher order derivative, zero-crossing, zero crossing with positive time offset, n^th zero crossing with positive time offset, zero crossing with negative time offset, n^th zero crossing with negative time offset, constrained zero-crossing, zero-crossing of slope, zero-crossing of higher order derivative, and/or another characteristics. At least one argument of the function associated with the at least one characteristics of the function may be identified. Some quantity (e.g. spatial-temporal information of the object) may be determined based on the at least one argument of the function.

A characteristics (e.g. characteristics of motion of an object in the venue) may comprise at least one of: an instantaneous characteristics, short-term characteristics, repetitive characteristics, recurring characteristics, history, incremental characteristics, changing characteristics, deviational characteristics, phase, magnitude, degree, time characteristics, frequency characteristics, time-frequency characteristics, decomposition characteristics, orthogonal decomposition characteristics, non-orthogonal decomposition characteristics, deterministic characteristics, probabilistic characteristics, stochastic characteristics, autocorrelation function (ACF), mean, variance, standard deviation, measure of variation, spread, dispersion, deviation, divergence, range, interquartile range, total variation, absolute deviation, total deviation, statistics, duration, timing, trend, periodic characteristics, repetition characteristics, long-term characteristics, historical characteristics, average characteristics, current characteristics, past characteristics, future characteristics, predicted characteristics, location, distance, height, speed, direction, velocity, acceleration, change of the acceleration, angle, angular speed, angular velocity, angular acceleration of the object, change of the angular acceleration, orientation of the object, angular of rotation, deformation of the object, shape of the object, change of shape of the object, change of size of the object, change of structure of the object, and/or change of characteristics of the object.

At least one local maximum and at least one local minimum of the function may be identified. At least one local signal-to-noise-ratio-like (SNR-like) parameter may be computed for each pair of adjacent local maximum and local minimum. The SNR-like parameter may be a function (e.g. linear, log, exponential function, monotonic function) of a fraction of a quantity (e.g. power, magnitude) of the local maximum over the same quantity of the local minimum. It may also be the function of a difference between the quantity of the local maximum and the same quantity of the local minimum. Significant local peaks may be identified or selected. Each significant local peak may be a local maximum with SNR-like parameter greater than a threshold T1 and/or a local maximum with amplitude greater than a threshold T2. The at least one local minimum and the at least one local minimum in the frequency domain may be identified/computed using a persistence-based approach.

A set of selected significant local peaks may be selected from the set of identified significant local peaks based on a selection criterion (e.g. a quality criterion, a signal quality condition). The characteristics/STI of the object may be computed based on the set of selected significant local peaks and frequency values associated with the set of selected significant local peaks. In one example, the selection criterion may always correspond to select the strongest peaks in a range. While the strongest peaks may be selected, the unselected peaks may still be significant (rather strong).

Unselected significant peaks may be stored and/or monitored as "reserved" peaks for use in future selection in future sliding time windows. As an example, there may be a particular peak (at a particular frequency) appearing consistently over time. Initially, it may be significant but not selected (as other peaks may be stronger). But in later time, the peak may become stronger and more dominant and may be selected. When it became "selected", it may be back-traced in time and made "selected" in the earlier time when it was significant but not selected. In such case, the back-traced peak may replace a previously selected peak in an early time. The replaced peak may be the relatively weakest, or a peak that appear in isolation in time (i.e. appearing only briefly in time).

In another example, the selection criterion may not correspond to select the strongest peaks in the range. Instead, it may consider not only the "strength" of the peak, but the "trace" of the peak—peaks that may have happened in the past, especially those peaks that have been identified for a long time. For example, if a finite state machine (FSM) is used, it may select the peak(s) based on the state of the FSM. Decision thresholds may be computed adaptively (and/or dynamically) based on the state of the FSM.

A similarity score and/or component similarity score may be computed (e.g. by a server (e.g. hub device), the processor, the Type 1 device, the Type 2 device, a local server, a cloud server, and/or another device) based on a pair of temporally adjacent CI of a TSCI. The pair may come from the same sliding window or two different sliding windows. The similarity score may also be based on a pair of, temporally adjacent or not so adjacent, CI from two different TSCI. The similarity score and/or component similar score may be/comprise: time reversal resonating strength (TRRS), correlation, cross-correlation, auto-correlation, correlation indicator, covariance, cross-covariance, auto-covariance, inner product of two vectors, distance score, norm, metric, quality metric, signal quality condition, statistical characteristics, discrimination score, neural network, deep learning network, machine learning, training, discrimination, weighted averaging, preprocessing, denoising, signal conditioning, filtering, time correction, timing compensation, phase offset compensation, transformation, component-wise operation, feature extraction, finite state machine, and/or another score. The characteristics and/or STI may be determined/computed based on the similarity score.

Any threshold may be pre-determined, adaptively (and/or dynamically) determined and/or determined by a finite state machine. The adaptive determination may be based on time, space, location, antenna, path, link, state, battery life, remaining battery life, available power, available computational resources, available network bandwidth, etc.

A threshold to be applied to a test statistics to differentiate two events (or two conditions, or two situations, or two states), A and B, may be determined. Data (e.g. CI, channel state information (CSI), power parameter) may be collected under A and/or under B in a training situation. The test statistics may be computed based on the data. Distributions of the test statistics under A may be compared with distributions of the test statistics under B (reference distribution), and the threshold may be chosen according to some criteria. The criteria may comprise: maximum likelihood (ML), maximum aposterior probability (MAP), discriminative training, minimum Type 1 error for a given Type 2 error, minimum Type 2 error for a given Type 1 error, and/or other criteria (e.g. a quality criterion, signal quality condition). The threshold may be adjusted to achieve different sensitivity to the A, B and/or another event/condition/situation/state.

The threshold adjustment may be automatic, semi-automatic and/or manual. The threshold adjustment may be applied once, sometimes, often, periodically, repeatedly, occasionally, sporadically, and/or on demand. The threshold adjustment may be adaptive (and/or dynamically adjusted). The threshold adjustment may depend on the object, object movement/location/direction/action, object characteristics/STI/size/property/trait/habit/behavior, the venue, feature/fixture/furniture/barrier/material/machine/living thing/thing/object/boundary/surface/medium that is in/at/of the venue, map, constraint of the map (or environmental model), the event/state/situation/condition, time, timing, duration, current state, past history, user, and/or a personal preference, etc.

A stopping criterion (or skipping or bypassing or blocking or pausing or passing or rejecting criterion) of an iterative algorithm may be that change of a current parameter (e.g. offset value) in the updating in an iteration is less than a threshold. The threshold may be 0.5, 1, 1.5, 2, or another number. The threshold may be adaptive (and/or dynamically adjusted). It may change as the iteration progresses. For the offset value, the adaptive threshold may be determined based on the task, particular value of the first time, the current time offset value, the regression window, the regression analysis, the regression function, the regression error, the convexity of the regression function, and/or an iteration number.

The local extremum may be determined as the corresponding extremum of the regression function in the regression window. The local extremum may be determined based on a set of time offset values in the regression window and a set of associated regression function values. Each of the set of associated regression function values associated with the set of time offset values may be within a range from the corresponding extremum of the regression function in the regression window.

The searching for a local extremum may comprise robust search, minimization, maximization, optimization, statistical optimization, dual optimization, constraint optimization, convex optimization, global optimization, local optimization an energy minimization, linear regression, quadratic regression, higher order regression, linear programming, nonlinear programming, stochastic programming, combinatorial optimization, constraint programming, constraint satisfaction, calculus of variations, optimal control, dynamic programming, mathematical programming, multi-objective optimization, multi-modal optimization, disjunctive programming, space mapping, infinite-dimensional optimization, heuristics, metaheuristics, convex programming, semidefinite programming, conic programming, cone programming, integer programming, quadratic programming, fractional programming, numerical analysis, simplex algorithm, iterative method, gradient descent, subgradient method, coordinate descent, conjugate gradient method, Newton's algorithm, sequential quadratic programming, interior point method, ellipsoid method, reduced gradient method, quasi-Newton method, simultaneous perturbation stochastic approximation, interpolation method, pattern search method, line search, non-differentiable optimization, genetic algorithm, evolutionary algorithm, dynamic relaxation, hill climbing, particle swarm optimization, gravitation search algorithm, simulated annealing, memetic algorithm, differential evolution, dynamic relaxation, stochastic tunneling, Tabu search, reactive search optimization, curve fitting, least square, simulation based optimization, variational calculus, and/or variant. The search for local extremum may be associated with an objective function, loss function, cost function, utility function, fitness function, energy function, and/or an energy function.

Regression may be performed using regression function to fit sampled data (e.g. CI, feature of CI, component of CI) or another function (e.g. autocorrelation function) in a regression window. In at least one iteration, a length of the regression window and/or a location of the regression window may change. The regression function may be linear function, quadratic function, cubic function, polynomial function, and/or another function. The regression analysis may minimize at least one of: error, aggregate error, component error, error in projection domain, error in selected axes, error in selected orthogonal axes, absolute error, square error, absolute deviation, square deviation, higher order error (e.g. third order, fourth order), robust error (e.g. square error for smaller error magnitude and absolute error for larger error magnitude, or first kind of error for smaller error magnitude and second kind of error for larger error magnitude), another error, weighted sum (or weighted mean) of absolute/square error (e.g. for wireless transmitter with multiple antennas and wireless receiver with multiple antennas, each pair of transmitter antenna and receiver antenna form a link), mean absolute error, mean square error, mean absolute deviation, and/or mean square deviation. Error associated with different links may have different weights. One possibility is that some links and/or some components with larger noise or lower signal quality metric may have smaller or bigger weight.), weighted sum of square error, weighted sum of higher order error, weighted sum of robust error, weighted sum of the another error, absolute cost, square cost, higher order cost, robust cost, another cost, weighted sum of absolute cost, weighted sum of square cost, weighted sum of higher order cost, weighted sum of robust cost, and/or weighted sum of another cost. The regression error determined may be an absolute error, square error, higher order error, robust error, yet another error, weighted sum of absolute error, weighted sum of square error, weighted sum of higher order error, weighted sum of robust error, and/or weighted sum of the yet another error.

The time offset associated with maximum regression error (or minimum regression error) of the regression function with respect to the particular function in the regression window may become the updated current time offset in the iteration.

A local extremum may be searched based on a quantity comprising a difference of two different errors (e.g. a difference between absolute error and square error). Each of the two different errors may comprise an absolute error, square error, higher order error, robust error, another error, weighted sum of absolute error, weighted sum of square error, weighted sum of higher order error, weighted sum of robust error, and/or weighted sum of the another error.

The quantity may be compared with a reference data or a reference distribution, such as an F-distribution, central F-distribution, another statistical distribution, threshold, threshold associated with probability/histogram, threshold associated with probability/histogram of finding false peak, threshold associated with the F-distribution, threshold associated the central F-distribution, and/or threshold associated with the another statistical distribution.

The regression window may be determined based on at least one of: the movement (e.g. change in position/location) of the object, quantity associated with the object, the at least one characteristics and/or STI of the object associated with the movement of the object, estimated location of the local extremum, noise characteristics, estimated noise characteristics, signal quality metric, F-distribution, central F-distribution, another statistical distribution, threshold, preset threshold, threshold associated with probability/histogram, threshold associated with desired probability, threshold associated with probability of finding false peak, threshold associated with the F-distribution, threshold associated the central F-distribution, threshold associated with the another statistical distribution, condition that quantity at the window center is largest within the regression window, condition that the quantity at the window center is largest within the regression window, condition that there is only one of the local extremum of the particular function for the particular value of the first time in the regression window, another regression window, and/or another condition.

The width of the regression window may be determined based on the particular local extremum to be searched. The local extremum may comprise first local maximum, second local maximum, higher order local maximum, first local maximum with positive time offset value, second local maximum with positive time offset value, higher local maximum with positive time offset value, first local maximum with negative time offset value, second local maximum with negative time offset value, higher local maximum with negative time offset value, first local minimum, second local minimum, higher local minimum, first local minimum with positive time offset value, second local minimum with positive time offset value, higher local minimum with positive time offset value, first local minimum with negative time offset value, second local minimum with negative time offset value, higher local minimum with negative time offset value, first local extremum, second local extremum, higher local extremum, first local extremum with positive time offset value, second local extremum with positive time offset value, higher local extremum with positive time offset value, first local extremum with negative time offset value, second local extremum with negative time offset value, and/or higher local extremum with negative time offset value.

A current parameter (e.g. time offset value) may be initialized based on a target value, target profile, trend, past trend, current trend, target speed, speed profile, target speed profile, past speed trend, the motion or movement (e.g. change in position/location) of the object, at least one characteristics and/or STI of the object associated with the movement of object, positional quantity of the object, initial speed of the object associated with the movement of the object, predefined value, initial width of the regression window, time duration, value based on carrier frequency of the signal, value based on subcarrier frequency of the signal, bandwidth of the signal, amount of antennas associated with the channel, noise characteristics, signal h metric, and/or an adaptive (and/or dynamically adjusted) value. The current time offset may be at the center, on the left side, on the right side, and/or at another fixed relative location, of the regression window.

In the presentation, information may be displayed with a map (or environmental model) of the venue. The information may comprise: location, zone, region, area, coverage area, corrected location, approximate location, location with respect to (w.r.t.) a map of the venue, location w.r.t. a segmentation of the venue, direction, path, path w.r.t. the map and/or the segmentation, trace (e.g. location within a time window such as the past 5 seconds, or past 10 seconds; the time window duration may be adjusted adaptively (and/or dynamically); the time window duration may be adaptively (and/or dynamically) adjusted w.r.t. speed, acceleration, etc.), history of a path, approximate regions/zones along a path, history/summary of past locations, history of past locations of interest, frequently-visited areas, customer traffic, crowd distribution, crowd behavior, crowd control information, speed, acceleration, motion statistics, breathing rate, heart rate, presence/absence of motion, presence/absence of people or pets or object, presence/absence of vital sign, gesture, gesture control (control of devices using gesture), location-based gesture control, information of a location-based operation, identity (ID) or identifier of the respect object (e.g. pet, person, self-guided machine/device, vehicle, drone, car, boat, bicycle, self-guided vehicle, machine with fan, air-conditioner, TV, machine with movable part), identification of a user (e.g. person), information of the user, location/speed/acceleration/direction/motion/gesture/gesture control/motion trace of the user, ID or identifier of the user, activity of the user, state of the user, sleeping/resting characteristics of the user, emotional state of the user, vital sign of the user, environment information of the venue, weather information of the venue, earthquake, explosion, storm, rain, fire, temperature, collision, impact, vibration, event, door-open event, door-close event, window-open event, window-close event, fall-down event, burning event, freezing event, water-related event, wind-related event, air-movement event, accident event, pseudo-periodic event (e.g. running on treadmill, jumping up and down, skipping rope, somersault, etc.), repeated event, crowd event, vehicle event, gesture of the user (e.g. hand gesture, arm gesture, foot gesture, leg gesture, body gesture, head gesture, face gesture, mouth gesture, eye gesture, etc.). The location may be 2-dimensional (e.g. with 2D coordinates), 3-dimensional (e.g. with 3D coordinates). The location may be relative (e.g. w.r.t. a map or environmental model) or relational (e.g. halfway between point A and point B, around a corner, up the stairs, on top of table, at the ceiling, on the floor, on a sofa, close to point A, a distance R from point A, within a radius of R from point A, etc.). The location may be expressed in rectangular coordinate, polar coordinate, and/or another representation.

The information (e.g. location) may be marked with at least one symbol. The symbol may be time varying. The symbol may be flashing and/or pulsating with or without changing color/intensity. The size may change over time. The orientation of the symbol may change over time. The symbol may be a number that reflects an instantaneous quantity (e.g. vital sign/breathing rate/heart rate/gesture/state/status/action/motion of a user, temperature, network traffic, network connectivity, status of a device/machine, remaining power of a device, status of the device, etc.). The rate of change, the size, the orientation, the color, the intensity and/or the symbol may reflect the respective motion. The information may be presented visually and/or described verbally (e.g. using pre-recorded voice, or voice synthesis). The information may be described in text. The information may also be presented in a mechanical way (e.g. an animated gadget, a movement of a movable part).

The user-interface (UI) device may be a smart phone (e.g. iPhone, Android phone), tablet (e.g. iPad), laptop (e.g. notebook computer), personal computer (PC), device with graphical user interface (GUI), smart speaker, device with voice/audio/speaker capability, virtual reality (VR) device, augmented reality (AR) device, smart car, display in the car, voice assistant, voice assistant in a car, etc. The map (or environmental model) may be 2-dimensional, 3-dimensional and/or higher-dimensional. (e.g. a time varying 2D/3D map/environmental model) Walls, windows, doors, entrances, exits, forbidden areas may be marked on the map or the model. The map may comprise floor plan of a facility. The map or model may have one or more layers (overlays). The map/model may be a maintenance map/model comprising water pipes, gas pipes, wiring, cabling, air ducts, crawl-space, ceiling layout, and/or underground layout. The venue may be segmented/subdivided/zoned/grouped into multiple zones/regions/geographic regions/sectors/sections/territories/districts/precincts/localities/neighborhoods/areas/stretches/expanse such as bedroom, living room, storage room, walkway, kitchen, dining room, foyer, garage, first floor, second floor, rest room, offices, conference room, reception area, various office areas, various warehouse regions, various facility areas, etc. The segments/regions/areas may be presented in a map/model. Different regions may be color-coded. Different regions may be presented with a characteristic (e.g. color, brightness, color intensity, texture, animation, flashing, flashing rate, etc.). Logical segmentation of the venue may be done using the at least one heterogeneous Type 2 device, or a server (e.g. hub device), or a cloud server, etc.

Here is an example of the disclosed system, apparatus, and method. Stephen and his family want to install the disclosed wireless motion detection system to detect motion in their 2000 sqft two-storey town house in Seattle, Wash. Because his house has two storeys, Stephen decided to use one Type 2 device (named A) and two Type 1 devices (named B and C) in the ground floor. His ground floor has predominantly three rooms: kitchen, dining room and living room arranged in a straight line, with the dining room in the middle. The kitchen and the living rooms are on opposite end of the house. He put the Type 2 device (A) in the dining room, and put one Type 1 device (B) in the kitchen and the other Type 1 device (C) in the living room. With this placement of the devices, he is practically partitioning the ground floor into 3 zones (dining room, living room and kitchen) using the motion detection system. When motion is detected by the AB pair and the AC pair, the system would analyze the motion information and associate the motion with one of the 3 zones.

When Stephen and his family go out on weekends (e.g. to go for a camp during a long weekend), Stephen would use a mobile phone app (e.g. Android phone app or iPhone app) to turn on the motion detection system. When the system detects motion, a warning signal is sent to Stephen (e.g. an SMS text message, an email, a push message to the mobile phone app, etc.). If Stephen pays a monthly fee (e.g. $10/month), a service company (e.g. security company) will receive the warning signal through wired network (e.g. broadband) or wireless network (e.g. home WiFi, LTE, 3G, 2.5G, etc.) and perform a security procedure for Stephen (e.g. call him to verify any problem, send someone to check on the house, contact the police on behalf of Stephen, etc.). Stephen loves his aging mother and cares about her well-being when she is alone in the house. When the mother is alone in the house while the rest of the family is out (e.g. go to work, or shopping, or go on vacation), Stephen would turn on the motion detection system using his mobile app to ensure the mother is ok. He then uses the mobile app to monitor his mother's movement in the house. When Stephen uses the mobile app to see that the mother is moving around the house among the 3 regions, according to her daily routine, Stephen knows that his mother is doing ok. Stephen is thankful that the motion detection system can help him monitor his mother's well-being while he is away from the house.

On a typical day, the mother would wake up at around 7 AM. She would cook her breakfast in the kitchen for about 20 minutes. Then she would eat the breakfast in the dining room for about 30 minutes. Then she would do her daily exercise in the living room, before sitting down on the sofa in the living room to watch her favorite TV show. The motion detection system enables Stephen to see the timing of the movement in each of the 3 regions of the house. When the motion agrees with the daily routine, Stephen knows roughly that the mother should be doing fine. But when the motion pattern appears abnormal (e.g. there is no motion until 10 AM, or she stayed in the kitchen for too long, or she remains motionless for too long, etc.), Stephen suspects something is wrong and would call the mother to check on her. Stephen may even get someone (e.g. a family member, a neighbor, a paid personnel, a friend, a social worker, a service provider) to check on his mother.

At some time, Stephen feels like repositioning the Type 2 device. He simply unplugs the device from the original AC power plug and plug it into another AC power plug. He is happy that the wireless motion detection system is plug-and-play and the repositioning does not affect the operation of the system. Upon powering up, it works right away. Sometime later, Stephen is convinced that our wireless motion detection system can really detect motion with very high accuracy and very low alarm, and he really can use the mobile app to monitor the motion in the ground floor. He decides to install a similar setup (i.e. one Type 2 device and two Type 1 devices) in the second floor to monitor the bedrooms in the second floor. Once again, he finds that the system set up is extremely easy as he simply needs to plug the Type 2 device and the Type 1 devices into the AC power plug in the second floor. No special installation is needed. And he can use the same mobile app to monitor motion in the ground floor and the second floor. Each Type 2 device in the ground floor/second floor can interact with all the Type 1 devices in both the ground floor and the second floor. Stephen is happy to see that, as he doubles his investment in the Type 1 and Type 2 devices, he has more than double the capability of the combined systems.

According to various embodiments, each CI (CI) may comprise at least one of: channel state information (CSI), frequency domain CSI, frequency representation of CSI, frequency domain CSI associated with at least one sub-band, time domain CSI, CSI in domain, channel response, estimated channel response, channel impulse response (CIR), channel frequency response (CFR), channel characteristics, channel filter response, CSI of the wireless multipath channel, information of the wireless multipath channel, timestamp, auxiliary information, data, meta data, user data, account data, access data, security data, session data, status data, supervisory data, household data, identity (ID), identifier, device data, network data, neighborhood data, environment data, real-time data, sensor data, stored data, encrypted data, compressed data, protected data, and/or another CI. In one embodiment, the disclosed system has hardware components (e.g. wireless transmitter/receiver with antenna, analog circuitry, power supply, processor, memory) and corresponding software components. According to various embodiments of the present teaching, the disclosed system includes Bot (referred to as a Type 1 device) and Origin (referred to as a Type 2 device) for vital sign detection and monitoring. Each device comprises a transceiver, a processor and a memory.

The disclosed system can be applied in many cases. In one example, the Type 1 device (transmitter) may be a small WiFi-enabled device resting on the table. It may also be a WiFi-enabled television (TV), set-top box (STB), a smart speaker (e.g. Amazon echo), a smart refrigerator, a smart microwave oven, a mesh network router, a mesh network satellite, a smart phone, a computer, a tablet, a smart plug, etc. In one example, the Type 2 (receiver) may be a WiFi-enabled device resting on the table. It may also be a WiFi-enabled television (TV), set-top box (STB), a smart speaker (e.g. Amazon echo), a smart refrigerator, a smart microwave oven, a mesh network router, a mesh network satellite, a smart phone, a computer, a tablet, a smart plug, etc. The Type 1 device and Type 2 devices may be placed in/near a conference room to count people. The Type 1 device and Type 2 devices may be in a well-being monitoring system for older adults to monitor their daily activities and any sign of symptoms (e.g. dementia, Alzheimer's disease). The Type 1 device and Type 2 device may be used in baby monitors to monitor the vital signs (breathing) of a living baby. The Type 1 device and Type 2 devices may be placed in bedrooms to monitor quality of sleep and any sleep apnea. The Type 1 device and Type 2 devices may be placed in cars to monitor well-being of passengers and driver, detect any sleeping of driver and detect any babies left in a car. The Type 1 device and Type 2 devices may be used in logistics to prevent human trafficking by monitoring any human hidden in trucks and containers. The Type 1 device and Type 2 devices may be deployed by emergency service at disaster area to search for trapped victims in debris. The Type 1 device and Type 2 devices may be deployed in an area to detect breathing of any intruders. There are numerous applications of wireless breathing monitoring without wearables.

Hardware modules may be constructed to contain the Type 1 transceiver and/or the Type 2 transceiver. The hardware modules may be sold to/used by variable brands to design, build and sell final commercial products. Products using the disclosed system and/or method may be home/office security products, sleep monitoring products, WiFi products, mesh products, TV, STB, entertainment system, HiFi, speaker, home appliance, lamps, stoves, oven, microwave oven, table, chair, bed, shelves, tools, utensils, torches, vacuum cleaner, smoke detector, sofa, piano, fan, door, window, door/window handle, locks, smoke detectors, car accessories, computing devices, office devices, air conditioner, heater, pipes, connectors, surveillance camera, access point, computing devices, mobile devices, LTE devices, 3G/4G/5G/6G devices, UMTS devices, 3GPP devices, GSM devices, EDGE devices, TDMA devices, FDMA devices, CDMA devices, WCDMA devices, TD-SCDMA devices, gaming devices, eyeglasses, glass panels, VR goggles, necklace, watch, waist band, belt, wallet, pen, hat, wearables, implantable device, tags, parking tickets, smart phones, etc.

The summary may comprise: analytics, output response, selected time window, subsampling, transform, and/or projection. The presenting may comprise presenting at least one of: monthly/weekly/daily view, simplified/detailed view, cross-sectional view, small/large form-factor view, color-coded view, comparative view, summary view, animation, web view, voice announcement, and another presentation related to the periodic/repetition characteristics of the repeating motion.

A Type 1/Type 2 device may be an antenna, a device with antenna, a device with a housing (e.g. for radio, antenna, data/signal processing unit, wireless IC, circuits), device that has interface to attach/connect to/link antenna, device that is interfaced to/attached to/connected to/linked to another device/system/computer/phone/network/data aggregator, device with a user interface (UI)/graphical UI/display, device with wireless transceiver, device with wireless transmitter, device with wireless receiver, internet-of-thing (IoT) device, device with wireless network, device with both wired networking and wireless networking capability, device with wireless integrated circuit (IC), Wi-Fi device, device with Wi-Fi chip (e.g. 802.11a/b/g/n/ac/ax standard compliant), Wi-Fi access point (AP), Wi-Fi client, Wi-Fi router, Wi-Fi repeater, Wi-Fi hub, Wi-Fi mesh network router/hub/AP, wireless mesh network router, adhoc network device, wireless mesh network device, mobile device (e.g. 2G/2.5G/3G/3.5G/4G/LTE/5G/6G/7G, UMTS, 3GPP, GSM, EDGE, TDMA, FDMA, CDMA, WCDMA, TD-SCDMA), cellular device, base station, mobile network base station, mobile network hub, mobile network compatible device, LTE device, device with LTE module, mobile module (e.g. circuit board with mobile-enabling chip (IC) such as Wi-Fi chip, LTE chip, BLE chip), Wi-Fi chip (IC), LTE chip, BLE chip, device with mobile module, smart phone, companion device (e.g. dongle, attachment, plugin) for smart phones, dedicated device, plug-in device, AC-powered device, battery-powered device, device with processor/memory/set of instructions, smart device/gadget/items: clock, stationary, pen, user-interface, paper, mat, camera, television (TV), set-top-box, microphone, speaker, refrigerator, oven, machine, phone, wallet, furniture, door, window, ceiling, floor, wall, table, chair, bed, night-stand, air-conditioner, heater, pipe, duct, cable, carpet, decoration, gadget, USB device, plug, dongle, lamp/light, tile, ornament, bottle, vehicle, car, AGV, drone, robot, laptop, tablet, computer, harddisk, network card, instrument, racket, ball, shoe, wearable, clothing, glasses, hat, necklace, food, pill, small device that moves in the body of creature (e.g. in blood vessels, in lymph fluid, digestive system), and/or another device. The Type 1 device and/or Type 2 device may be communicatively coupled with: the internet, another device with access to internet (e.g. smart phone), cloud server (e.g. hub device), edge server, local server, and/or storage. The Type 1 device and/or the Type 2 device may operate with local control, can be controlled by another device via a wired/wireless connection, can operate automatically, or can be controlled by a central system that is remote (e.g. away from home).

In one embodiment, a Type B device may be a transceiver that may perform as both Origin (a Type 2 device, a Rx device) and Bot (a Type 1 device, a Tx device), i.e., a Type B device may be both Type 1 (Tx) and Type 2 (Rx) devices (e.g. simultaneously or alternately), for example, mesh devices, a mesh router, etc. In one embodiment, a Type A device may be a transceiver that may only function as Bot (a Tx device), i.e., Type 1 device only or Tx only, e.g., simple IoT devices. It may have the capability of Origin (Type 2 device, Rx device), but somehow it is functioning only as Bot in the embodiment. All the Type A and Type B devices form a tree structure. The root may be a Type B device with network (e.g. internet) access. For example, it may be connected to broadband service through a wired connection (e.g. Ethernet, cable modem, ADSL/HDSL modem) connection or a wireless connection (e.g. LTE, 3G/4G/5G, WiFi, Bluetooth, microwave link, satellite link, etc.). In one embodiment, all the Type A devices are leaf node. Each Type B device may be the root node, non-leaf node, or leaf node.

RF imaging is a dream that has been pursued for years yet not achieved in the evolving wireless sensing. The existing solutions on WiFi bands, however, either require specialized hardware with large antenna arrays or suffer from poor resolution due to fundamental limits in bandwidth, the number of antennas, and the carrier frequency of 2.4 GHz/5 GHz WiFi. The present teaching provides a new opportunity in the increasingly popular 60 GHz WiFi, which overcomes such limits. In one embodiment, a super-resolution imaging system, called "mmEye", is presented as a millimeter-wave camera by reusing a single commodity 60 GHz WiFi radios. The key challenge arises from the extremely small aperture (antenna size), e.g., <2 cm, which physically limits the spatial resolution. The present teaching also provides a super-resolution imaging algorithm that breaks the resolution limits by leveraging all available information at both Tx/Rx sides. Based on the MUSIC algorithm, a novel technique of joint transmitter smoothing is proposed to jointly use the transmit and receive arrays to boost the spatial resolution, while not sacrificing the aperture of the antenna array. Based on this algorithm, a functional system is built on commodity 60 GHz WiFi chipsets. The mmEye system has been evaluated on different persons and objects under various settings. Results show that it achieves a median silhouette (shape) difference of 27.2% and a median boundary keypoint precision of 7.6 cm, and it can image a person even through a thin drywall. The visual results show comparable quality to that of commercial products like Kinect, making for the first-time super-resolution imaging available on the commodity 60 GHz WiFi devices.

While some existing system needs dedicated hardware (e.g., RFID reader and UWB radios) and needs to deploy devices on both sides of the target, a disclosed system in the present teaching reuses the commodity 60 GHz WiFi. Some existing camera-based solutions require RGB-depth cameras like Kinect sensors and camera arrays, and depend on lighting conditions and are privacy-sensitive. In contrast, a disclosed system in the present teaching aims to enable a depth "camera" by reusing a commodity available networking device, which works without any light and preserves privacy.

In the present teaching, the disclosed super-resolution RF imaging system (mmEye) serves as a millimeter-wave "camera" using a single commodity 60 GHz WiFi device, by leveraging the 60 GHz networking radio with its unexplored radar sensing capability. It can image both humans, either moving or stationary with different poses, and objects of various shapes, sizes, and materials. It can even image through a thin drywall, despite the high attenuation of 60 GHz signals.

Even with the radar operations, however, enabling imaging on commodity 60 GHz WiFi radio entails great challenges. For example, due to networking, the device is not calibrated as well as and thus not as stable as conventional radar, resulting in fluctuating signal responses. Additionally, reflection signals may be frequently missed due to the inherent high attenuation and directionality of 60 GHz signals. The biggest challenge, however, is to achieve high imaging accuracy with the compact 60 GHz array with a small aperture, a key factor that determines the imaging resolution. In general, the imaging resolution of a radar system is defined by resolution $\propto$ wavelength$\times$distance/aperture, which is about 28 cm at 1 m distance for an experimental device with an antenna array size of 1.8 cm$\times$1.8 cm. Prior works attempt to extend the effective aperture by synthetic array radar (SAR), which, however, requires receiver movements and is highly sensitive to the moving trajectory tracking error. The impact of the trajectory error becomes particularly noticeable when the error is greater than the wavelength, which is likely to occur for 60 GHz signals with a wavelength of 5 mm.

Differently, the disclosed system mmEye devises a super-resolution algorithm to break through the resolution limited by the physical aperture and enable precise imaging on commodity 60 GHz radio. The proposed algorithm achieves a super resolution through a novel joint transmitter smoothing technique.

In one embodiment, instead of using the on-chip analog beamforming, the disclosed system performs digital beamforming on the received signals, which yields a much higher spatial resolution. The analog beamforming built-in the radio usually only provides coarse beam resolution (e.g., 3 dB beamwidth of 15° for an exemplary device). The disclosed system can boost the spatial resolution by using the MUSIC algorithm. The disclosed system can perform MUSIC over each spherical surface of different azimuths and elevations at every specific range, estimating the spatial spectrum of the signals reflected off the target at that range. The spatial spectrum, along with the accurate range information offered by the 60 GHz radio, will together reconstruct an image of the target. MUSIC can be used for imaging since the signals are sparse on each spherical surface. However, it is not directly applicable since it suffers from the rank deficiency issue, i.e., the rank of the correlation matrix of the signal space is smaller than the number of actual incoming signals.

To overcome the rank deficiency problem, one can employ spatial smoothing in 2D space, a technique to split the receive array into several overlapped subarrays that reuse the same steering vectors. By adding one more subarray, the rank of the correlation matrix of signals increases by 1 with probability 1. In addition to the spatial subarrays, the disclosed system mmEye utilizes the time diversity of consecutive measurements to estimate the correlation matrix. The synthesized spatial and temporal smoothing effectively solves the rank deficiency issue and significantly reduces the variance of the spatial spectrum estimation by MUSIC.

Spatial smoothing on the receive array further reduces the small antenna array size, i.e., the effective aperture, thereby degrading the imaging precision. To increase the rank without loss in aperture, a novel 2D spatial smoothing is proposed to jointly reuse the transmit array and the receive array, termed as joint transmitter smoothing. Specifically, rather than dividing the receive array into subarrays, one can reuse the entire receive array for each individual transmit antenna as a subarray. Given a case of 32 Tx elements, one can immediately obtain 32 subarrays, offering a guaranteed rank of 32, which is adequate for the sparse reflection signals, while retaining the scarce aperture unimpaired. Since the subarray size is as big as the whole receive array, the imaging resolution is maximized. Besides the improvement on the spatial resolution, the joint transmitter smoothing scheme also alleviates the specularity problem for RF imaging, where the signals reflected off the target may not be captured due to the inherent high attenuation and directionality of the mmWave signals, by utilizing the transmit diversity.

Based on the super-resolution algorithm, one can design and implement a functional system of mmEye with additional components on the background and noise cancellation and adaptive target detection, etc. In one embodiment, one can prototype the mmEye on commodity 60 GHz networking chipset attached with an additional array and perform experiments with different subjects, locations, and postures. The results demonstrate that mmEye achieves accurate imaging results comparable to a Kinect depth sensor, with a median silhouette (shape) difference of 27.2% and a median boundary keypoint precision of 7.6 cm at the range of 1 meter. With the encouraging performance on a single networking device, one can believe mmEye takes an important step towards a ubiquitous millimeter-wave "camera" and the first step towards dual roles of networking and radar sensing for commodity 60 GHz WiFi radios.

The disclosed system mmEye leverages sparsity of the reflection signals and applies MUSIC with a novel joint transmitter smoothing technique, which will also benefit and inspire future sensing research on millimeter-wave radios. The present teaching also provides a fully functional imaging system with multiple components including background and noise cancellation, target detection, etc. The system achieves comparable imaging with commercial products like Kinect using a single 60 GHz networking device in a much smaller size, underlying pervasive imaging for various applications such as VR gaming, pose estimation, etc.

The 60 GHz WiFi technology, a.k.a. WiGig, with the established IEEE 802.11ad/ay standards and low-cost commercial chipsets, is becoming the mainstream in wireless devices to enable high rate networking and rich user experience. Different from the 2.4 GHz/5 GHz WiFi that faces fundamental limitations in imaging, 60 GHz WiFi offers unique advantages for RF imaging. While the common 2.4 GHz and 5 GHz WiFi devices have only 2 to 3 antennas and 20 MHz/40 MHz bandwidths, 60 GHz WiFi radios offer many-antenna phased arrays in compact forms and large bandwidths centered at high-frequency band of 60 GHz. These properties translate into several superior features for sensing. For example, the large phased array enables highly directional beamforming with good spatial resolution; the large bandwidth offers high ranging accuracy; the high carrier frequency leads to more predictable signal propagation that is immune to the multipath effects, a huge challenge for 2.4 GHz/5 GHz WiFi. In addition, the carrier wavelength is 5 mm, over 10× shorter than 5 GHz WiFi, which means the required antenna aperture can be 10× smaller to achieve the same imaging resolution.

Additionally, one can observe two trends that further promote 60 GHz WiFi as an attractive solution for ubiquitous sensing and imaging. First, 60 GHz networking chipsets is going to support an additional role of radar-like processing, without hardware changes except for merely one extra antenna array for full-duplex radios, allowing rapid and precise phase measurement with synchronized, co-located Tx and Rx. Second, the commercial 60 GHz WiFi, already used in consumer-grade routers, is becoming relatively inexpensive with increasing market adoption and will soon be available on mobile devices. Pioneer works on 60 GHz radios mainly utilize amplitude information and employ mechanical horn antennas to emulate beam steering. Great potentials in the steerable phased arrays and the dual radar mode of 60 GHz WiFi remains largely underexploited.

In one embodiment, one can use commodity Qualcomm 802.1 lad chipsets. To enable full-duplex radar operation, an extra array is attached to the chipset to form co-located and synchronized Tx and Rx. In practice, the dual networking and radar role can be achieved by rapid switching in time, since the radar sensing only requires minimal time. Under the networking mode, the extra array simply provides additional spatial diversity. The Tx transmits pulses of a known sequence, which, after reflection on surrounding targets, are received and correlated on the Rx side to estimate Channel Impulse Response (CIR) with precise amplitude and phase information.

Suppose N elements in the Tx array and M elements in the Rx array. The CIR between the n-th transmit antenna and the m-th receive antenna $h_{m,n}(\tau)$ at time slot t can be expressed as $$h_{m,n}(\tau,t) = \sum_{l=0}^{L-1} a_{m,n}^l(t)\delta(\tau-\tau_l(t)) \quad (1)$$

where $\delta(\cdot)$ is the Delta function, L is the number of the total CIR taps, and $a_{m,n}^l$ and $\tau_l$ denote the complex amplitude and the propagation delay of the l-th tap, respectively. To simplify the notations in the following, one can omit the dependence on the measurement time t if not mentioned. The time resolution $\Delta\tau$ of the measured CIR is determined by the bandwidth B of the transmitted signal, i.e., $\Delta T=1/B$. Then, $\tau_l$ can be expressed as $\tau_l=\tau_0+(l-1)\Delta\tau$, where $\tau_0$ denotes the time of arrival of the first tap. At each time slot, mmEye captures M×N×L complex values, i.e., $h_{m,n}(\tau_l)$, where m=1, . . . , M, n=1, . . . , N, and l=0, . . . , L−1. The 3D information of the target being imaged can be thus inferred from these measurements.

FIG. 1 illustrates an exemplary device setup and coordinate system 100 for wireless object scanning, according to some embodiments of the present teaching. In FIG. 1, θ and φ denote the elevation and azimuth respectively, and r denotes the range from the device to the reflector. As shown in FIG. 1, an experimental device has 32 elements assembled in a 6×6 layout for both Tx and Rx (i.e., N=M=32) and operates at 60 GHz center frequency with a 3.52 GHz bandwidth. Antennas are missing at four locations that are preserved for other purposes like power port, as shown in FIG. 1. The measured CIR thus offers a propagation delay resolution of $\Delta\tau=0.28$ ns, corresponding to a range resolution of 4.26 cm. When the device is set to radar mode, each CIR $h_{m,n}(\tau)$ is measured in a sequential way as follows: the n-th transmit antenna transmits an impulse while other transmit antennas keep silent, and only the m-th receive antenna records the corresponding CIR at the same time. This is because all the transmit/receive antennas share a single RF chain. The above channel sounding process would repeat 32×32=1024 times in total for a complete CIR recording.

RF imaging in the present teaching leverages the observation that the energy distribution of the reflected RF signals over the space would sketch the silhouette of a target. The disclosed system mmEye tries to reconstruct the contour of the target based on the estimation of the Angle of Arrival (AoA) and Time of Arrival (ToA) of each signal reflected off the surface of the target. As mentioned above, however, the spatial resolution is greatly limited due to the small effective aperture of the receive antenna array. For example, the on-chip analog conventional beamforming (CBF) only provides a 3 dB beamwidth of 15°, which is inadequate to image a target, especially when the target is far away to the device.

To boost the spatial resolution, the disclosed system mmEye performs digital beamforming on the received CIR as opposed to the on-chip analog beamforming, which achieves higher resolution in distinguishing the signals radiated by nearby parts of the target. Noticing that the CBF and the minimum variance distortionless response (MVDR) beamforming (a.k.a. Capon beamformer) both produce poor precision, one can devise a super-resolution algorithm based on MUltiple Signal Classification (MUSIC), an algorithm for AoA estimation.

The basic idea of the MUSIC algorithm is to perform an eigen-decomposition for the covariance matrix of CIR, resulting in a signal subspace orthogonal to a noise subspace corresponding to the signals reflected off the target. MUSIC is typically used for reconstructing the spatial spectrum of sparse signals. The reason why it is also applicable for imaging is that for each propagation delay $\tau_l$, the signals reflected off a target are sparsely distributed in the space. More specifically, although the number of the reflected signals is large, these reflections occur over a large span of the propagation delays (i.e., ranges) and thus the number of signals with a certain propagation delay (i.e., reflected at a certain range) is small. Typically, there are only four to six significant reflected signals for each Tr. Therefore, for each $\tau_l$, the signal structure for target imaging is in line with the assumptions of the MUSIC algorithm, making the MUSIC algorithm feasible for solving the imaging problem. This is a result of utilizing the large bandwidth of the 60 GHz WiFi, which offers fine-grained range resolution.

Define a vector $h_n(\tau_l)=[h_{1,n}^t(\tau_l), \ldots, h_{M,n}^t(\tau_l)]^T$, given a fixed transmit antenna n, to record the calibrated complex channel gains of all the receive antennas at a propagation delay $\tau_l$. To simplify the notations, one can omit the dependence on the propagation delay $\tau_l$ and the transmit antenna index n if not mentioned. Then, assuming that there are D reflected signals impinging on the receive antenna array at the propagation delay $\tau_l$, the CIR h can be formulated as $$h = [s(\theta_1, \phi_1), \ldots, s(\theta_D, \phi_D)]\begin{bmatrix} x_1 \\ \vdots \\ x_D \end{bmatrix} + \begin{bmatrix} \varepsilon_1 \\ \vdots \\ \varepsilon_D \end{bmatrix}, \quad (2)$$

where $s(\theta_i, \phi_i)$ denotes the steering vector pointing to the direction $(\theta_i, \phi_i)$ corresponding to the incoming direction of the i-th reflected signal, $x_i$ denotes the complex amplitude of that signal and $\varepsilon_i$ stands for additive noise, which is assumed to be Gaussian random variable with zero mean and independent and identically distributed (I.I.D.) for different receive antennas.

More specifically, the steering vector $s(\theta,\phi)$ records the phase response of the antenna array for a signal coming from the direction $(\theta,\phi)$ with its power normalized to 1, which can be expressed as $$s(\theta, \phi) = \frac{1}{\sqrt{M}} \begin{bmatrix} \Psi_\theta^0 \Omega_{\theta,\phi}^0 \\ \vdots \\ \Psi_\theta^{p-1} \Omega_{\theta,\phi}^{q-1} \\ \vdots \\ \Psi_\theta^{P-1} \Omega_{\theta,\phi}^{Q-1} \end{bmatrix}, \quad (3)$$

where $\Psi_\theta$ and $\Omega_{\theta,\phi}$ are two basis functions defined as $\Psi_\theta \triangleq \exp(jkd \sin \theta)$ and $\omega_{\theta,\phi} \triangleq \exp(jkd \cos \theta \sin \phi)$, p and q denote the row and column index of the antenna element on the array as shown in FIG. 1, k is the wave number, and d is the distance between two adjacent antennas along y or z-axis.

The indices without an antenna element (marked as crosses in FIG. 1 and FIG. 2) are skipped in the steering vectors. A more concise matrix representation of Eqn. (2) is written accordingly as $$h = Sx + \varepsilon, \quad (4)$$

where S is defined as the steering matrix. Note that for a static target, the complex amplitude vector x is deterministic (fully coherent sources), and thus the covariance matrix of h would only contain the information of the noise.

Therefore, the correlation matrix is used instead, which can be expressed accordingly as $$R = \mathbb{E} E[hh^H] = Sxx^H S^H + \mathbb{E}[\varepsilon\varepsilon^H] \triangleq R_s + R_\varepsilon, \quad (5)$$

where $R_s$ and $R_\varepsilon$ denote the correlation matrix for the signal components and noise, respectively. The eigenvalues $\lambda_1, \ldots, \lambda_M$ of R are sorted in a non-descending order, associated with M eigenvectors $e_1, \ldots, e_M$. Note that in the present teaching, h is treated as a random vector and each experiment is just one realization of it. Under the assumption that the ensemble mean of h is equal to zero, i.e., $\mathbb{E}[h]=0$, the correlation matrix is equivalent to the covariance matrix.

Then, the noise subspace can be constructed as $E_\varepsilon = [e_{D+1}, \ldots, e_M]$, where D stands for the rank of $R_s$, or namely the dimension of the signal subspace. The (pseudo) spatial spectrum for any direction $(\theta,\phi)$ can be obtained as $$P(\theta, \phi) = \frac{1}{s^H(\theta, \phi) E_\varepsilon E_\varepsilon^H s(\theta, \phi)}. \quad (6)$$

Large values of the spatial spectrum $P(\theta,\phi)$ in a specific part of the space would most likely indicate the presence of one or more reflected signals; low values of $P(\theta,\phi)$ would indicate the absence of such reflections.

Another critical problem to apply MUSIC is to determine the number of signals D that impinge on the array. In the disclosed system mmEye, Akaike information criterion (AIC), an information-theoretic approach for model order selection, is used. AIC is composed of two terms: a data term, measuring the likelihood of the data given a certain D, and a penalty term, measuring the complexity of the model.

Specifically, D is calculated as $$D^* = \arg\max_D \log \left( \frac{\prod_{i=D+1}^M \lambda_i^{1/(M-D)}}{1/(M-D) \sum_{j=D+1}^M \lambda_j} \right)^{(M-D)} - D(2M - D), \quad (7)$$

where $\lambda_i$ denotes the i-th largest eigenvalue of the correlation matrix R. Since the AIC criterion tends to overestimate the number of impinging signals, AIC can retain the weak reflected signals to the greatest extent possible, which is desirable in the imaging application.

The MUSIC algorithm requires the rank of $R_s$ to be the same as the number of incoming signals D. However, since the rank of $R_s$ is only 1 which is likely much smaller than D, the performance of the MUSIC algorithm would deteriorate greatly or even completely fail to produce an effective spatial spectrum. To solve the problem, spatial smoothing, a commonly used technique for the rank deficiency issue, is applied as follows.

Figure 2:
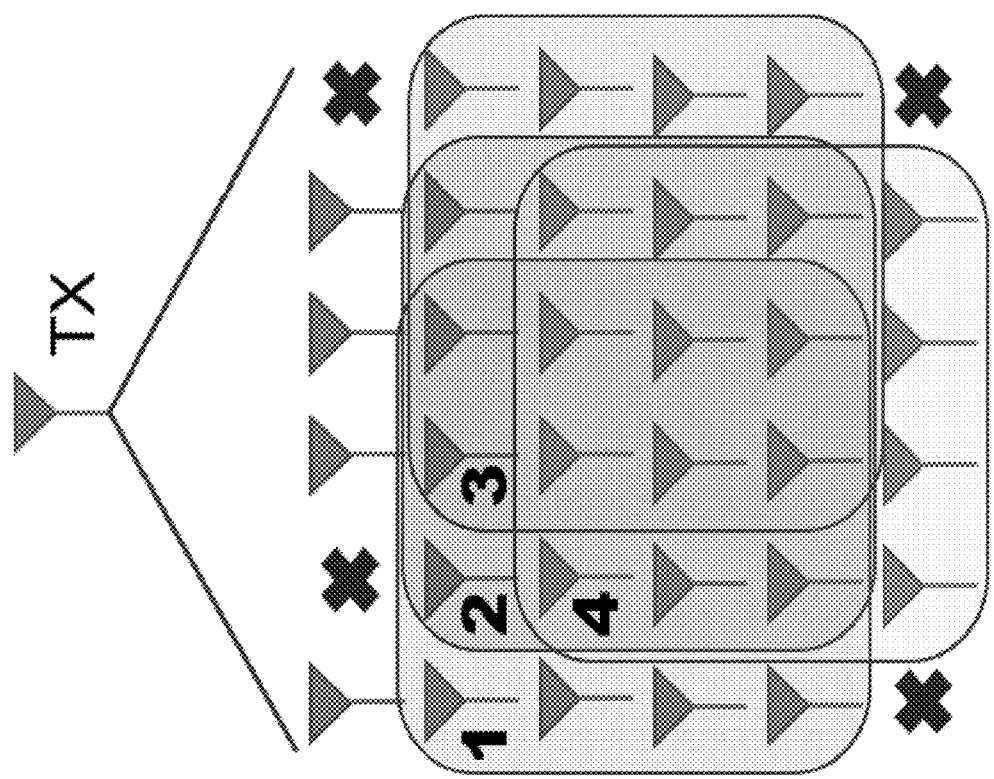
FIG. 2 illustrates an example of spatial smoothing, according to some embodiments of the present teaching.

FIG. 2 illustrates an example of spatial smoothing 200, according to some embodiments of the present teaching. The idea of the spatial smoothing is to split the receive array into several overlapping subarrays that share the same steering vectors except for certain angular rotations due to the differences in the time of arrival of the reflected signals impinging on different subarrays. FIG. 2 shows an example of the selected subarrays from the original 6×6 receive antenna array. As seen, due to the issue of missing antennas at certain locations of the array, no subarray with dimension 5×5 can be found and only four 4×4 antenna subarrays can be established. A square subarray is just one example of the subarray, which has the merit that the spatial resolution for both azimuth and elevation are the same. Let $s_{[k]}(\theta,\phi)$ denote the steering vector for the k-th subarray, then one can have $s_{[2]}(\theta,\phi) = \Omega_{\theta,\phi} s_{[1]}(\theta,\phi)$, $s_{[3]}(\theta,\phi) = \Omega_{\theta,\phi}^2 s_{[1]}(\theta,\phi)$, and $s_{[4]}(\theta,\phi) = \Psi_\theta \Omega_{\theta,\phi} s_{[1]}(\theta,\phi)$. The correlation matrix of each subarray can be averaged to form the "spatially smoothed" correlation matrix $\tilde{R}$ with a higher rank, i.e., $$\tilde{R} = \frac{1}{K} \sum_{k=1}^K R_{[k]}, \quad (8)$$

where $R_{[k]}$ denotes the correlation matrix of the k-th subarray. The rank of $\tilde{R}$ increases by 1 with probability 1 for each additional subarray in the averaging until it reaches its maximum value.

Therefore, the rank of $\tilde{R}$ can be restored to 4 after the spatial smoothing, which, however, is still under rank deficiency. To further solve the rank deficiency issue and reduce the variance of the spatial spectrum estimation, an exponential smoothing filter, which utilizes the time diversity of consecutive measurements, is applied to the estimation of the correlation matrix:

$$\tilde{R}_t = \beta \tilde{R}_{t-1} + (1-\beta)\tilde{R}, \quad (9)$$

where $\beta$ is the smoothing factor. The value of $\beta$ is chosen based on the tradeoff between the responsiveness and accuracy of the system. The spatial spectrum for each $\tau_l$ can be thus produced by Eqn. (6). Different from previous works, the disclosed system mmEye performs 2D spatial smoothing and targeting at imaging, which needs to identify all reflection signals.

Although spatial smoothing can improve the performance of the MUSIC algorithm under highly correlated sources, it reduces the effective aperture of the array (changed from 6×6 to 4×4), which equivalently increases the beamwidth of the array and decreases the spatial resolution. To solve the rank deficiency problem of the correlation matrix without the loss of the antenna aperture at the same time, the disclosed system mmEye exploits the Tx diversity and accordingly utilizes a novel joint transmitter smoothing technique.

Figure 3:
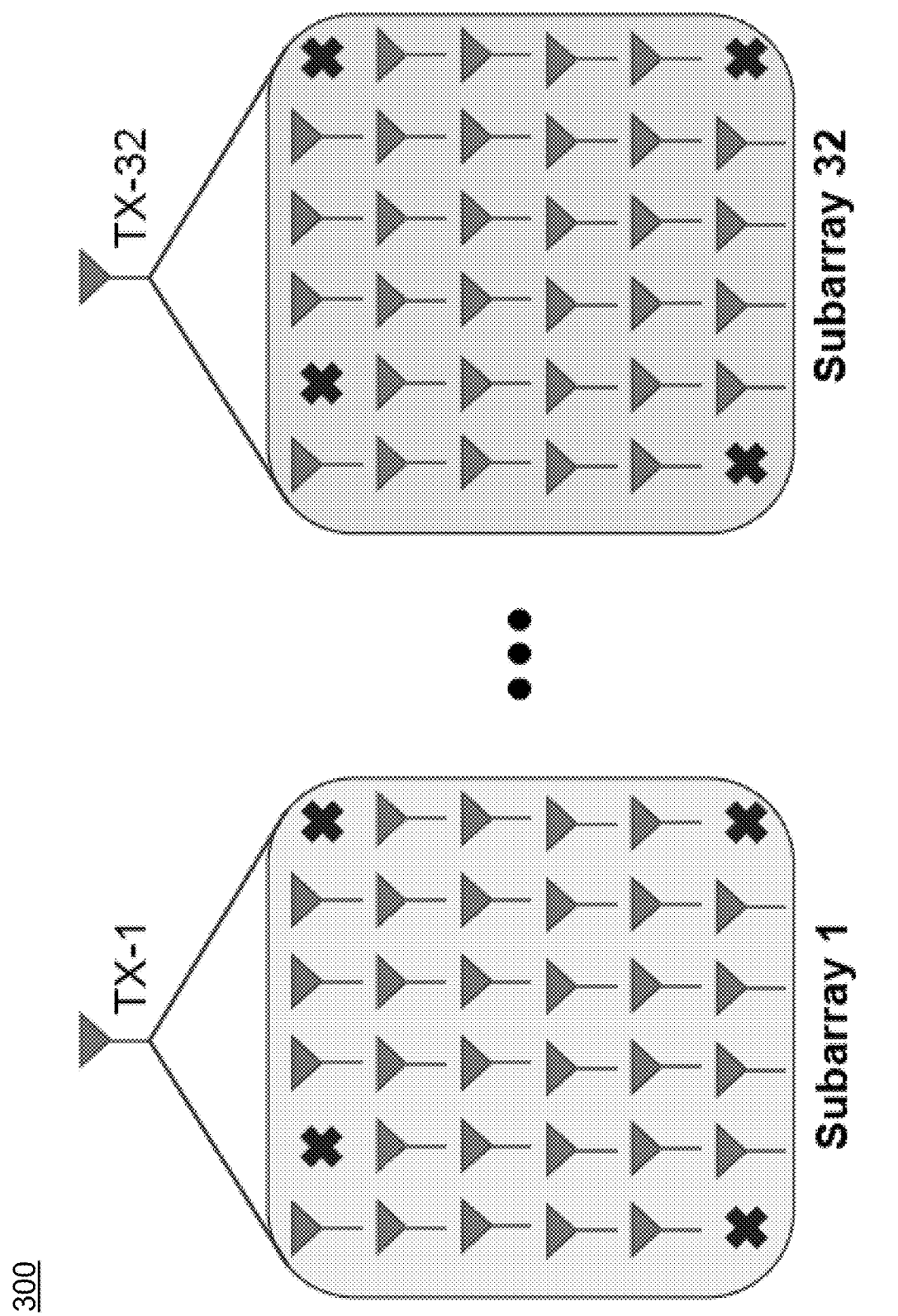
FIG. 3 illustrates an example of joint transmitter smoothing, according to some embodiments of the present teaching.

FIG. 3 illustrates an example of joint transmitter smoothing 300, according to some embodiments of the present teaching. As the AoA of each reflected signal is only relative to the receive array, each receive array corresponding to each Tx antenna should share the same set of the steering vectors except for the angular rotations, similar to the discussions in the above section for classical spatial smoothing. However, the angular rotation is not due to the shifting of the subarrays at the Rx array, but instead is caused by the tiny differences in the locations of the Tx antennas. Considering the small wavelength, these tiny differences can generate significant enough phase deviations to the signals received by the receive array coming from different TX antenna, which enables spatial smoothing across the receive arrays associated with different TX antennas. Thus, it is feasible to treat the whole receive antenna array, for each specific TX antenna, as a subarray. Thus in total, N subarrays can be formulated, where N=32 as shown in FIG. 3.

Recall that $h_n(\tau_l)$ denotes the received CIR at $\tau_l$ for the n-th transmit antenna. Define the channel matrix for each $\tau_l$ as $H(\tau_l)=[h_1(\tau_l), \ldots, h_N(\tau_l)]$. Then, the corresponding correlation matrix at $\tau_l$ after spatial smoothing can be obtained as $$\tilde{R}_{Tx}(\tau_l) = \frac{1}{N}\sum_{n=1}^{N} h_n(\tau_l)h_n^H(\tau_l) = \frac{1}{N}H(\tau_l)H^H(\tau_l) \quad (10)$$

$\tilde{R}_{Tx}(x_l)$ is now a full-rank matrix and multiple measurements are not required unlike the case for spatial smoothing based on a single transmit antenna, which increases the responsiveness of the disclosed system mmEye greatly. Nevertheless, the exponential filter can still improve the robustness of the spatial spectrum estimation, which can be produced by Eqn. (6). Interestingly, the matrix $H(\tau_l)H^H(\tau_l)$ is also known as the time-reversal matrix. If the Tx and Rx could share the same array, the proposed imaging algorithm is related to the time-reversal MUSIC (TR-MUSIC) imaging algorithm with minor modifications on the formation of the steering vectors.

Thanks to the channel reciprocity, the imaging can also be performed at the transmitter side as well. By simply transposing the channel matrix $H(\tau_l)$, one can obtain another set of channel measurements $H^T(\tau_l)$ between the Tx and Rx antennas if the receive antennas were transmitting and the transmit antennas were receiving. Similarly, the corresponding correlation matrix after the joint receiver smoothing (JRS) at $\tau_l$ is obtained as $$\tilde{R}_{Rx}(\tau_l) = \frac{1}{N}H^T(\tau_l)H^*(\tau_l),$$

where $(\cdot)^*$ denotes the conjugate operation. However, the quality of imaging on the Tx side is a little worse than that on the Rx side. This is because, during the channel sounding, the device first uses a fixed Tx antenna and scans through all the Rx antennas before switching to the next Tx antenna, which makes the phase measurements of different Tx antennas less coherent. In on embodiment, the disclosed system mmEye only utilizes the joint transmitter smoothing technique.

The workflow of the disclosed system mmEye includes: putting the device at a fixed location and performing a background calibration by collecting seconds of measurements, then the system is ready to image humans and objects present in the field of view. A design of a functional system is presented here based on the proposed super-resolution imaging algorithm. One can mainly incorporate two additional components of background and noise cancellation and target detection before the ultimate imaging.

Figure 4:
FIG. 4 illustrates exemplary channel impulse response (CIR) performances, according to some embodiments of the present teaching.

Besides the target of interest, the transmitted signals may also be reflected by the background objects, e.g., furniture, ceiling, grounds, walls, etc. In addition, there are internal signal reflections on the intermediate frequency (IF) cable connectors, as shown in FIG. 4. These undesired reflections from the background together with the internal noise interfere with the signals reflected off the target and thus degrade the imaging the quality. To combat these problems, in the following, a background and noise cancellation (BANC) algorithm is proposed to filter out the background reflections and the internal noise.

Mathematically, the CIR $h_{m,n}$ can be modeled as the sum of the target-related component $h_{m,n}^t$ and the background/internal reflection-related component $h_{m,n}^b$. In one embodiment, to obtain $h_{m,n}^t$, the disclosed system mmEye first collects a bunch of CIRs for the background without the presence of the target to estimate $h_{m,n}^b$, and then obtains $h_{m,n}^t$ by subtracting $h_{m,n}^b$ from the newly measured CIR $h_{m,n}$ with the presence of the target.

Assume that there are Q samples of the CIRs measured without the target. Then, $h_{m,n}^b$ can thus be estimated by the sample mean of the measured background CIRs, i.e., $$h_{m,n}^b(\tau_l) \approx \frac{1}{Q}\sum_{q=1}^{Q} h_{m,n}(\tau_l, t_q).$$

Due to the automatic gain control (AGC) module on the chip, the amplitude of the CIRs changes from frame to frame. Therefore, it is not feasible to subtract the background CIR directly from the CIR with the target. A scaling factor $\alpha$ is thus applied to scale the obtained background CIR before the cancellation. The clean CIR $h_{m,n}^t$ after the background and noise cancellation can be obtained accordingly as $$h_{m,n}^t(\tau_l,t) = h_{m,n}(\tau_l,t) - \alpha h_{m,n}^b(\tau_l). \quad (11)$$

Regarding to the choice of $\alpha$, a minimum mean square error (MMSE) estimator is applied which selects the value of $\alpha$ that minimizes the energy of $h_{m,n}^t(\tau_l,t)$ over the first $L_0$ CIR taps, i.e., $$\alpha^* = \underset{\alpha}{\operatorname{argmin}} \sum_{l=0}^{L_0-1} |h_{m,n}(\tau_l, t) - \alpha h_{m,n}^b(\tau_l)|^2. \quad (12)$$

The analytical form of optimal solution $\alpha^*$ can be derived correspondingly as $$\alpha^* = \frac{\sum_{l=0}^{L_0-1} [h_{m,n}^b(\tau_l)]^H h_{m,n}(\tau_l, t)}{\sum_{l=0}^{L_0-1} [h_{m,n}^b(\tau_l)]^H h_{m,n}^b(\tau_l, t)}, \quad (13)$$

where $x^H$ denotes the Hermitian of x. The intuition for only using the first $L_0$ taps to estimate a is that the target being imaged is usually at a certain distance from the device to be observed completely in the specific field of view.

Figure 5:
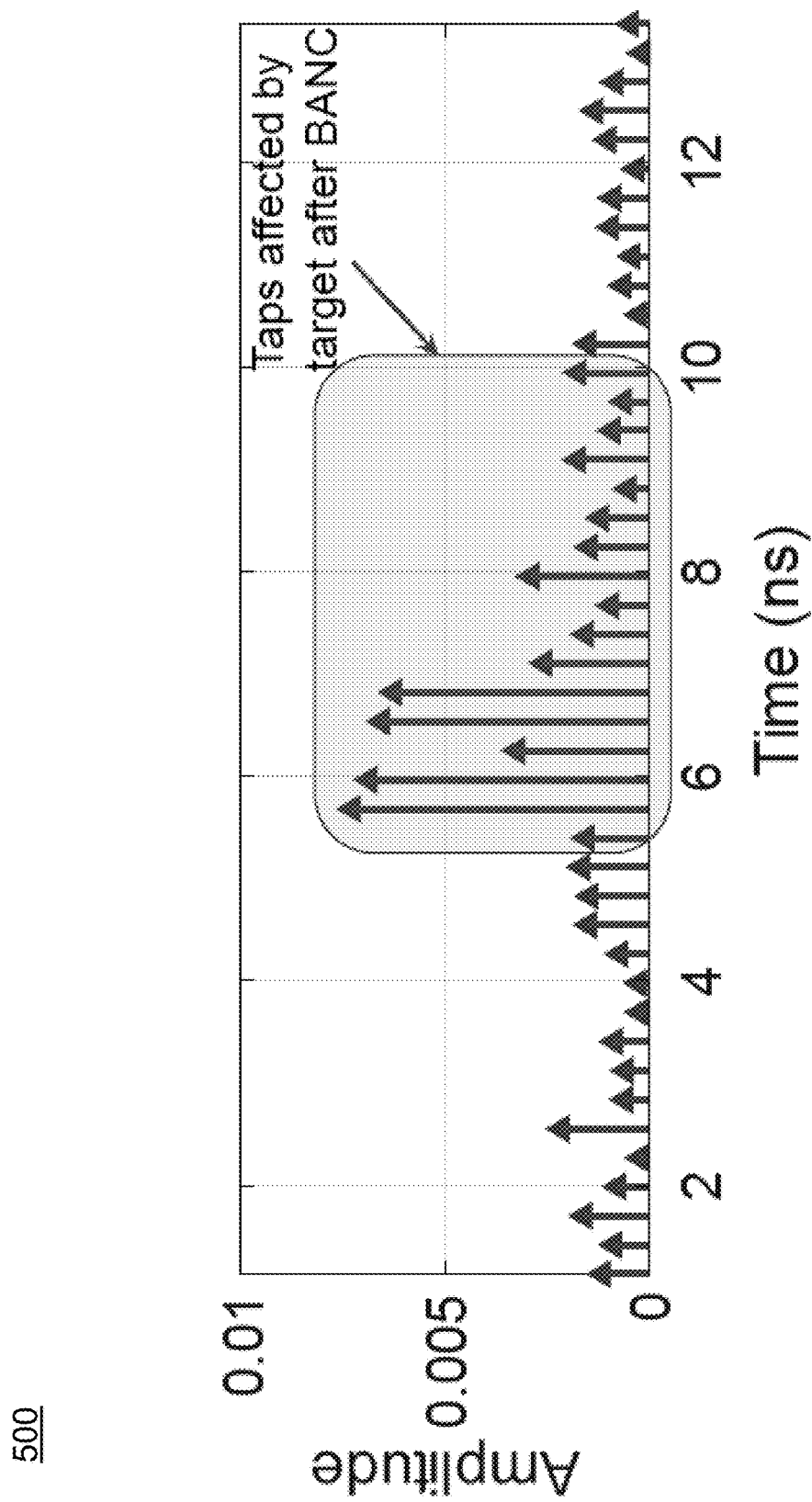
FIG. 5 illustrates an exemplary CIR obtained after background and noise cancellation, according to some embodiments of the present teaching.

Therefore, the first few taps are not affected by the presence of the target and are only affected by the AGC, leading to a more accurate estimation of the scaling factor. FIG. 5 shows an example of the CIR 500 after the background and noise cancellation. It can be observed that the impact of the target on the CIR taps has been greatly magnified in terms of amplitude.

Figure 6:
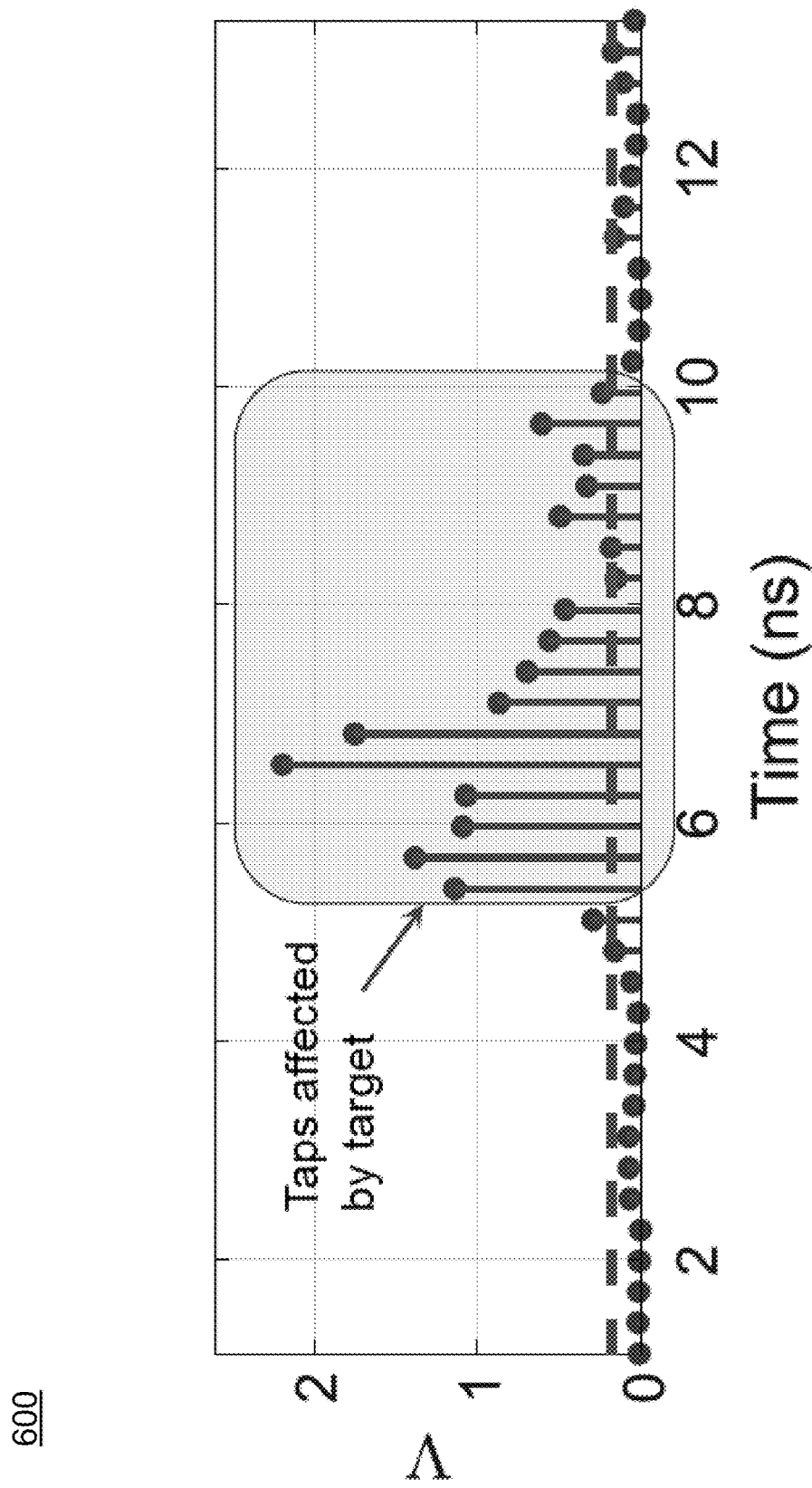
FIG. 6 illustrates an exemplary detection of range of interest (RoI), according to some embodiments of the present teaching.

One purpose of object detection is to robustly detect all the CIR taps that are affected by the target(s) of interest. Because not all the RF signals reflected off human body parts can be captured by the receive antenna array, the energy of the signals reflected off some parts of the target can be very weak. To increase the "visibility" of the weak reflections, for each propagation delay, one can calculate the variation of the energy distribution of the spatial spectrum $V_t(\tau)$, defined as $V_t(\tau)=\text{Var}_\theta[\text{Var}_\phi[P_t(\theta,\phi,\tau)]]$, where $\text{Var}_\theta[\cdot]$ denotes the variance over parameter $\theta$, $P_t(\theta,\phi,\tau)$ denotes the spatial spectrum for the direction $(\theta,\phi)$ and the propagation delay r measured at time slot t. A large $V_t(\tau)$ implies that the energy distribution of the reflected signals for that range is highly non-uniform, indicating the presence of a target in that specific range, while for the range where no target presents, the energy of the reflected signals is usually small and uniformly distributed. Then, the set of the range of interest (RoI) at time slot t are formed as $\text{RoI}(t)=\{(\tau|V_t(\tau)>\theta, \forall\tau\}$, where $\eta(t)$ is a preset threshold. FIG. 6 illustrates an exemplary detection of RoI 600, according to some embodiments of the present teaching. To accommodate the time-varying interference and noise, as illustrated in FIG. 6, one can use a multiple of the median value of $V_t(\tau)$ as the threshold for each time slot t, i.e., $\eta(t)=\kappa\text{Med}_\tau[V_t(\tau)]$, where $\kappa$ denotes a constant coefficient, and $\text{Med}_\tau[\cdot]$ denotes the median value over T. The reason one can use the median to determine the threshold is that the median of $V_t(\tau)$ can adaptively capture the variations of the noise level of the board especially when the total number of the taps L is large.

Then, one can search for the points of interest over the spatial spectrum $P(\theta,\phi,\tau)$ within the RoI set. Due to the fact that the millimeter wave cannot penetrate the general object well, e.g., millimeter waves are mostly absorbed within the human skin, only the first significant point of $P(\theta,\phi,\tau)$ w.r.t. r contains the information of the target. In one embodiment, the disclosed system mmEye locates the points of interest based on the following rule: given the spatial spectrum for each direction $(\theta,\phi)$, try to find the first local maximum point of $P(\theta,\phi,\tau)$ along r within the RoI set that exceeds a preset threshold $\gamma$; if failed, then no point of interest is found for this direction. For each point of interest $(\theta_i^*,\phi_i^*,\tau_i^*)$, the associated weight is the value of the corresponding spatial spectrum, i.e., $P(\theta^*,\phi^*,\tau^*)$.

Figure 7:
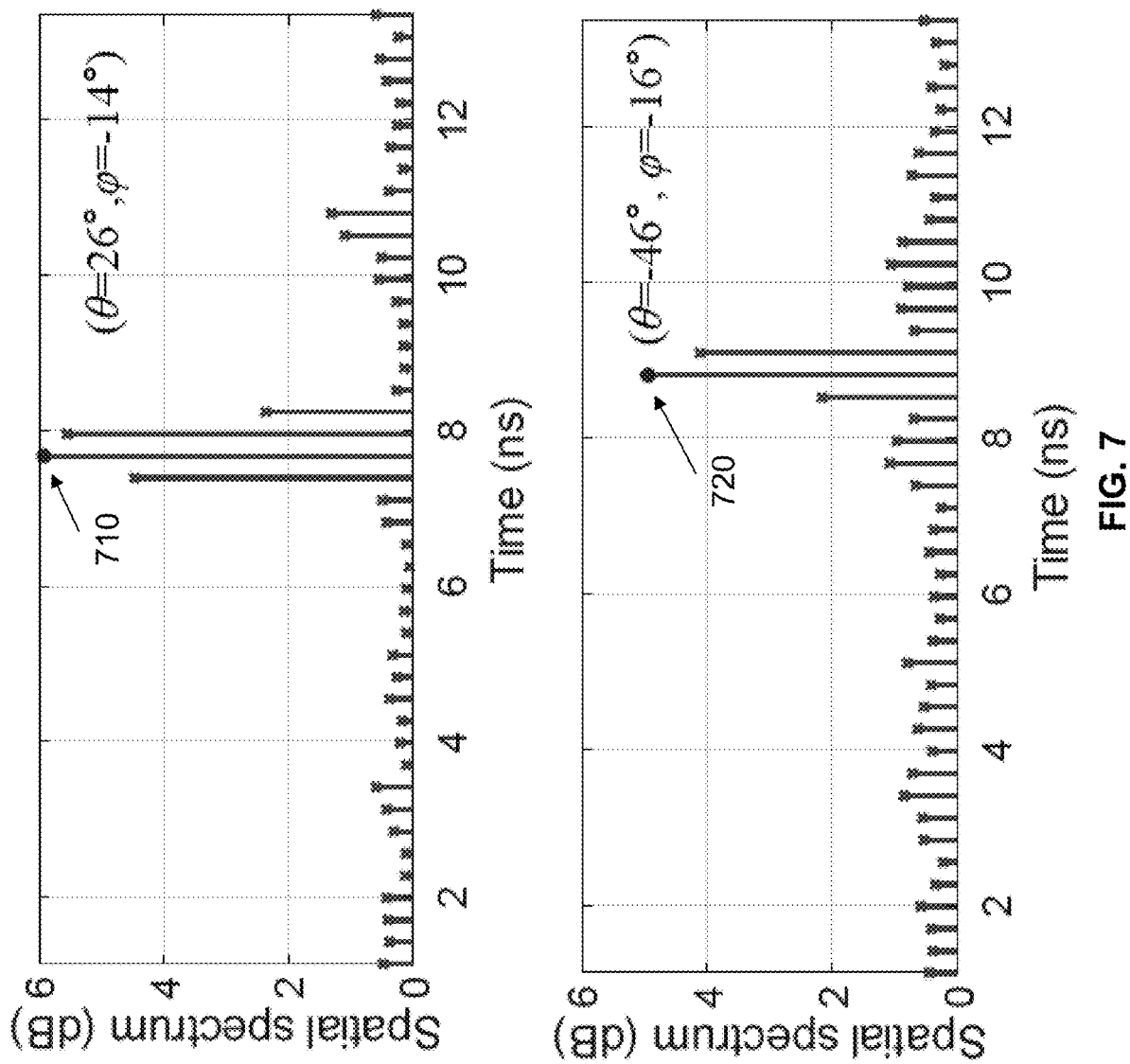
FIG. 7 illustrates examples of spatial spectrums for different directions, according to some embodiments of the present teaching.

FIG. 7 shows two examples of the obtained spatial spectrum for different spatial directions. The marked dots, 710, 720, in both examples indicate the points of interest (PoI) with weights 5.92 dB and 4.94 dB, respectively. The set of the PoI at time slot t is denoted as $\text{PoI}=\{(\theta_i^*,\phi_i^*,\tau_i^*,P_i), i=1,\ldots,S\}$, where S is the total number of PoI and $P_i^*$ denotes the value of the spatial spectrum corresponding to that point, i.e., $P_i \triangleq P(\theta_i^*,\phi_i^*,\tau_i^*)$.

In one embodiment, one can transform the PoI into plain images with depth and weighting information. The disclosed system mmEye may first convert the PoI from the polar coordinates $(\theta_i^*,\phi_i^*,\tau_i^*)$ to Cartesian coordinates $(x_i,y_i,z_i)$ by applying simple geometric transformations. Then, all the PoI are projected to a 2D-plane that is parallel to the y-z plane, as shown in FIG. 1, with a certain depth $x_d$, which is defined as the distance between these two planes.

The depth $x_d$ is determined automatically by solving a weighted least absolute deviation problem, $$x_d^* = \underset{x_d}{\text{argmin}} \sum_{i=1}^{S} (P_i^* - \gamma)(x_d - x_i^*)^2, \quad (14)$$

which minimizes the $\ell_2$-norm of the distances between the PoI and the selected plane, weighted by their importance $(P_i^*-\gamma)$, where $\gamma$ is the same threshold used in the target detection and thus the weights are always positive. The system is designed to preserve the most of information of the PoI round the projected plane. To further remove the outliers within the set of PoI, the disclosed system mmEye only selects the points that are close enough to the projected plane, e.g., $|x_i^* - x_d^*| \le w$, where w is a preset threshold. Some obtained images of a person showed that the proposed super-resolution algorithm significantly outperforms prior approaches CBF and MVDR and achieves comparable results with Kinect.

One can evaluate the disclosed system mmEye in practical settings using a commodity 802.1 lad chipset, and can study the imaging quality for both humans and objects and both LOS and NLOS. One can also compare the disclosed system mmEye with existing beamforming techniques CBF and MVDR.

In one embodiment, one can prototype the disclosed system mmEye and conduct real-world experiments using a Qualcomm 802.11ad chipset. The chipset is equipped with two antenna arrays, both having 32 antennas arranged in a 6×6 topology. During experiments, the device is operating in a radar mode, i.e., the Tx antennas constantly transmit pulses and the Rx antennas receive the reflected signals and estimate the CIR accordingly. In this embodiment, the experiments take place on one floor of a typical office building of size 28 m×36 m, which is furnished with desks, chairs, computers, and TVs. A typical setup of the system is shown in FIG. 1. Both humans and everyday objects are tested in the experiment. For human imaging, one can recruit 4 volunteers (two males and two females) and test out at different locations and distances with different postures. The experiment can mainly focus on quasi-static scenarios but also test for moving targets. The evaluation includes both single-person case and multiple person case. For static cases, each subject performs 10 to 15 different postures as he/she will and the system can collect about 30 s of data for each posture. For object imaging, the system can test with everyday objects, such as fans, heaters, monitors, suitcases, etc., that have various shapes, sizes, and materials.

To evaluate human imaging, one could not obtain ground truth from manual measurements of the target dimensions and shapes. Instead, one can extract images from a Kinect depth sensor by the library provided to serve as ground truth. To detect the target of interest from a Kinect frame, one can simply search for a certain depth and extract all points in that depth. One could perform advanced segmentation by combining the RGB sensor for this purpose. Note that the measurements and target detection on Kinect both contain noises, which do not favor our evaluation. The results by the disclosed system mmEye and Kinect are shifted and interpolated so that their coordinates are aligned with identical point density.

It is not easy to define proper metrics to evaluate the imaging quality, although it is intuitive for a human to tell from the visual results. In addition to qualitative visual comparisons, the present teaching proposes two quantitative metrics. The first metric is Silhouette difference (SD), which is the percentage of XOR difference between the mmEye images (after thresholding) and the Kinect frames, ranging from 0 (no errors) to 1 (completely different). The second metric is boundary key-point precision (BKP), which is the absolute location error for several key points on the target boundary. In one embodiment, one can mainly account for the topmost, leftmost, and rightmost points in the evaluation, which can be automatically detected.

One can first evaluate imaging performance for human targets. One can quantitatively evaluate the precision over all the testing data using the SD and BKP metrics.

Figure 8:
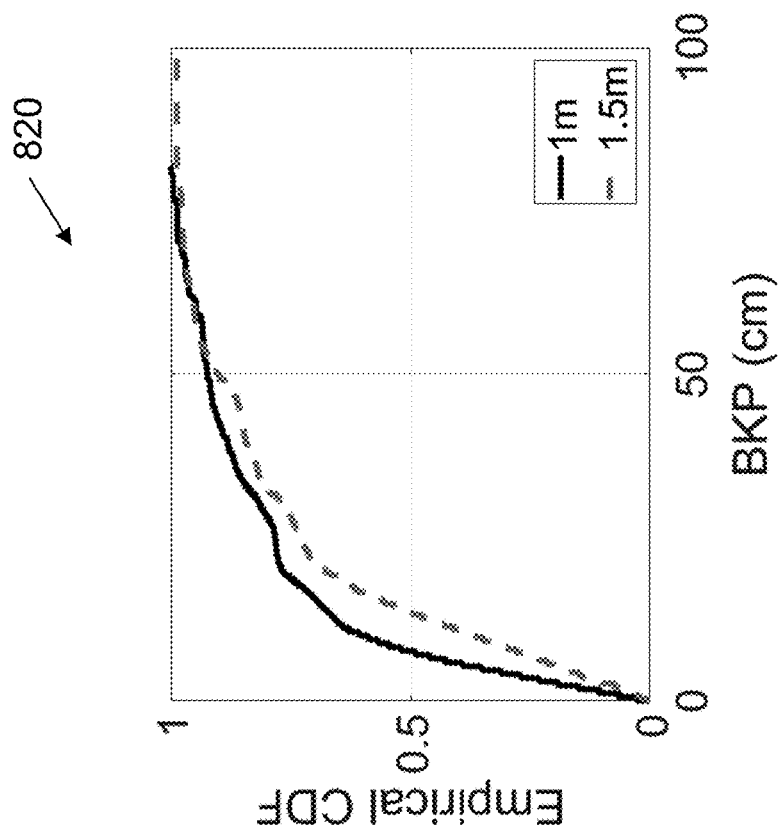
FIG. 8 illustrates exemplary system performances of human imaging, according to some embodiments of the present teaching.
Figure 8:
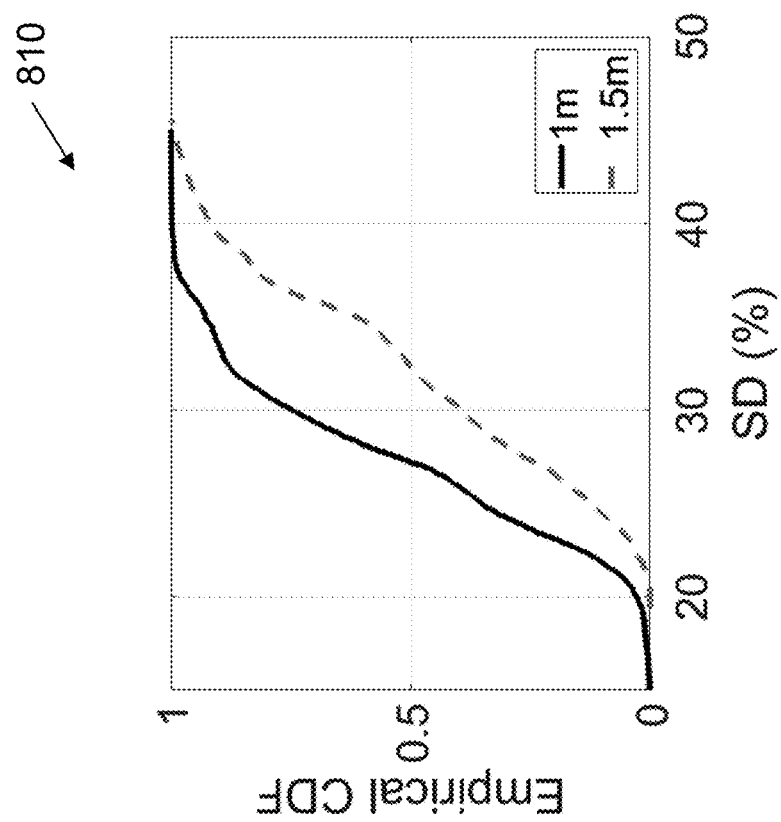

FIG. 8 illustrates exemplary system performances 810, 820 of human imaging, according to some embodiments of the present teaching. As shown in FIG. 8, the disclosed system mmEye achieves the median of 27.2% for SD 810 and 7.6 cm for BKP 820 when subjects are about 1 m away from the device; while it degrades to the median of 32.3% for SD and 13.5 cm for BKP when subjects are about 1.5 m away. This is mainly because a larger distance between the target and device leads to a wider beam and a weaker reflected signal, both affecting imaging quality.

Figure 9:
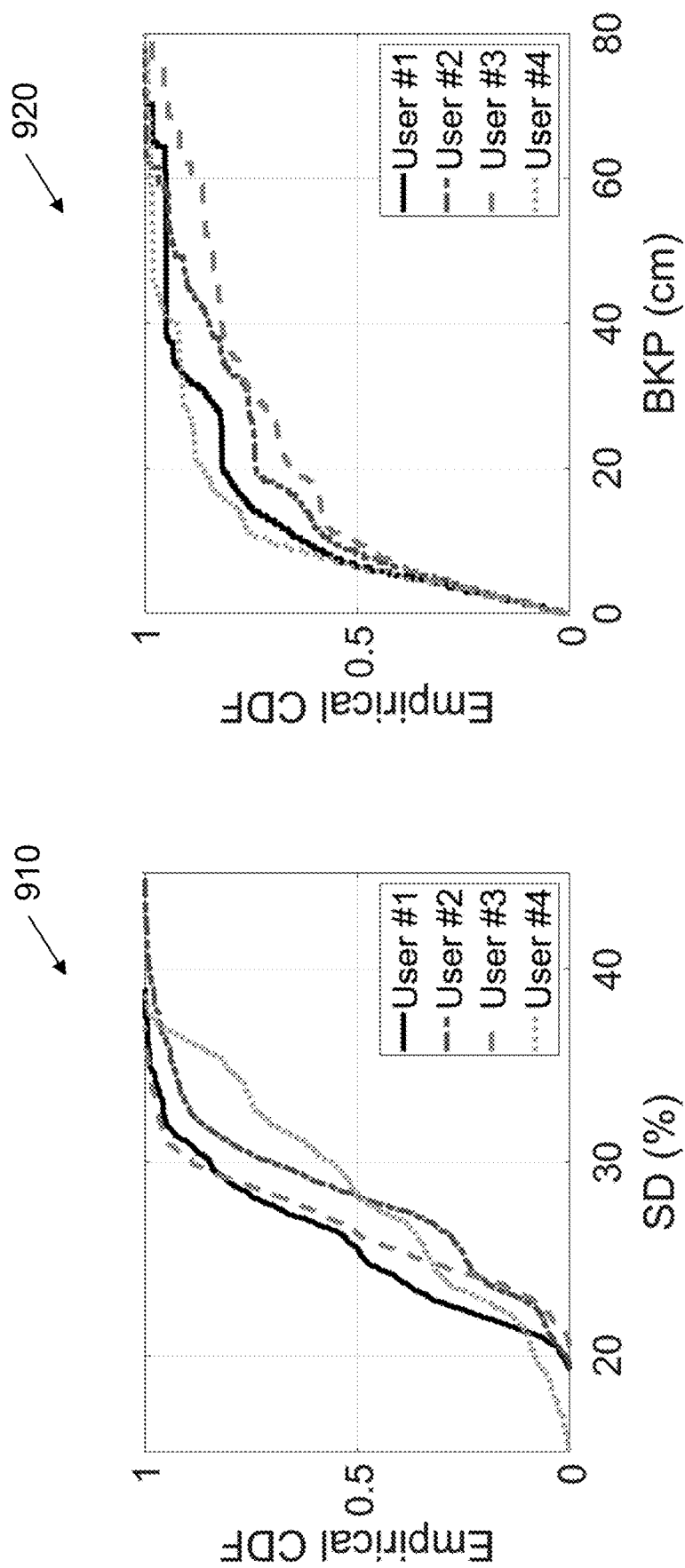
FIG. 9 illustrates exemplary system performances for different users, according to some embodiments of the present teaching.

FIG. 9 shows the imaging quality of the disclosed system mmEye for different persons w.r.t. SD 910 and BKP 920, respectively. The results show consistently accurate imaging for different subjects. The slight variations in performance are due to that the body type and clothing are varying among the subjects, which can affect the strength of the RF signals reflected off the human body.

One can show the super-resolution performance of the disclosed system mmEye by comparing it with existing beamforming techniques, including CBF and MVDR. One can also implement and compare two variations of the disclosed system mmEye, i.e., the disclosed system mmEye with spatial smoothing (SS) and the disclosed system mmEye with joint transmitter smoothing (JTS) to show the considerable benefits of the proposed JTS algorithm. Some visual results of two subjects using different methods showed that the disclosed system mmEye using JTS achieves the best imaging results, while the disclosed system mmEye using SS stands the second-best yet is already much worse than the disclosed system mmEye using JTS. MVDR can see parts of the human body but misses many others, while CBF does not capture body parts but only detects the human body as a whole.

Figure 10:
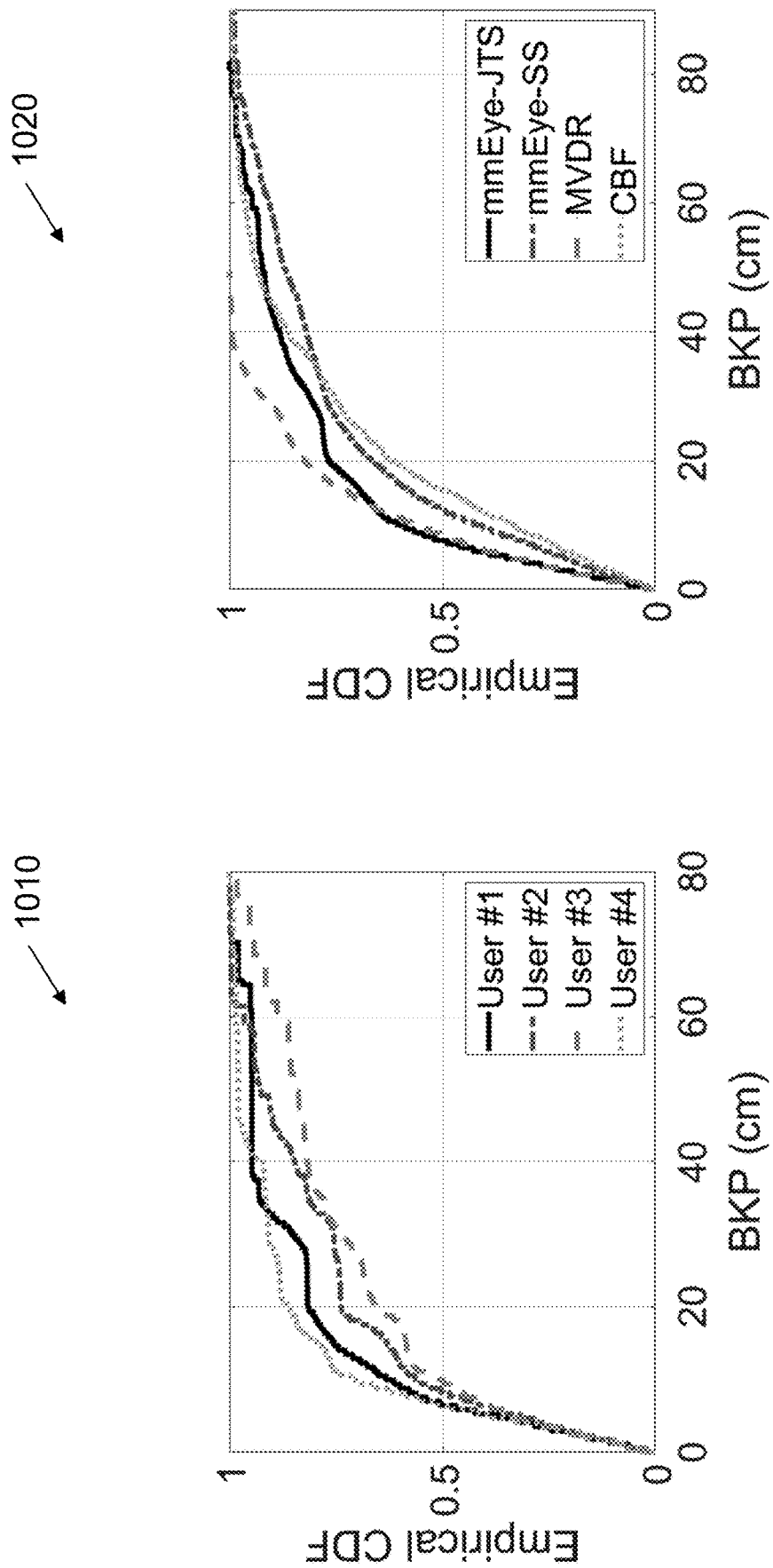
FIG. 10 illustrates exemplary system performance comparison among different spatial spectrum estimators, according to some embodiments of the present teaching.

FIG. 10 shows the quantitative results of different approaches, SD 1010 and BKP 1020, according to some embodiments of the present teaching. As for the SD metric 1010, the disclosed system mmEye-JTS achieves the best performance and the disclosed system mmEye-SS comes in the second place. Note that MVDR performs better than other techniques w.r.t. BKP metric, however, it performs poorly when regarding to SD metric. This is because the spatial spectrum estimation of MVDR is more conservative and thus it misses some of the major parts of the human body, which does not necessarily increase errors in BKP (e.g., the topmost point does not change too much). In principle, only good results in both metrics indicate good quality of imaging. In addition, a comparison between the JTS and JRS shows that the quality of the image obtained on Rx array is better than that obtained on the Tx array.

The disclosed system mmEye can also image objects. One can test real objects of different shape, size, curvature, surface, and material. In one embodiment, the objects selected reveal different shapes (cylinder, square, and circle), materials (plastic, wood, and metal), size (from about 20 cm to 100 cm in length). The disclosed system mmEye can accurately image various objects. Specifically, an experiment shows that the disclosed system mmEye achieves a median accuracy of 8.0 cm in shape estimation of the objects. The results show that the disclosed system mmEye achieves consistent performance for both human targets and objects.

The disclosed system mmEye can perform under different scenarios. In one embodiment for multiple person imaging, two imaging examples of two subjects with Kinect overlay as ground truths. Both human figures are well captured, with the heads, feet, arms, and hands confidently recognized in the experiment. The results underpin various applications of the disclosed system mmEye like multi-user gaming and user activity analysis.

Thanks to the joint transmitter smoothing, the disclosed system mmEye can achieve imaging with one single snapshot but does not need successive measurements. Thus it can effectively image targets in motion. One can test both walking and in-place motion and show some visual imaging results where a user is moving arms. Not only does the disclosed system mmEye image the stationary body parts (e.g., the torso, and legs), it also tracks the moving parts (e.g., arms) successfully.

While 60 GHz signals typically do not penetrate most obstacles, it is of great interest to examine if the disclosed system mmEye can image a target behind a thin drywall. One can set up a large wood panel supported by a wood stand to emulate a drywall and test the disclosed system mmEye's performance under this setting. To better validate the performance, one can ask the subject to expose partial of the body to the devices (the disclosed system mmEye and Kinect). The results showed that the disclosed system mmEye still captures a human figure behind the "drywall", while the Kinect depth sensor, as a vision-based sensor, is completely occluded by the big wood panel and only sees the exposed parts (i.e., hands in both images). The reason that the disclosed system mmEye can see through the wood panel is that the 60 GHz signals can penetrate the panel and reflect off the human body behind it. Albeit the reflected signals are much weaker, the disclosed system mmEye is still able to capture them by the effective BANC algorithm. In one embodiment, one can observe that the performance does degenerate in NLOS case.

The combination of the JTS and JRS techniques could alleviate the specularity problem and improve the responsiveness of the system. Extension to SAR to increase the antenna aperture would further improve the resolution upon the super-resolution algorithm of the disclosed system mmEye.

Figure 11:
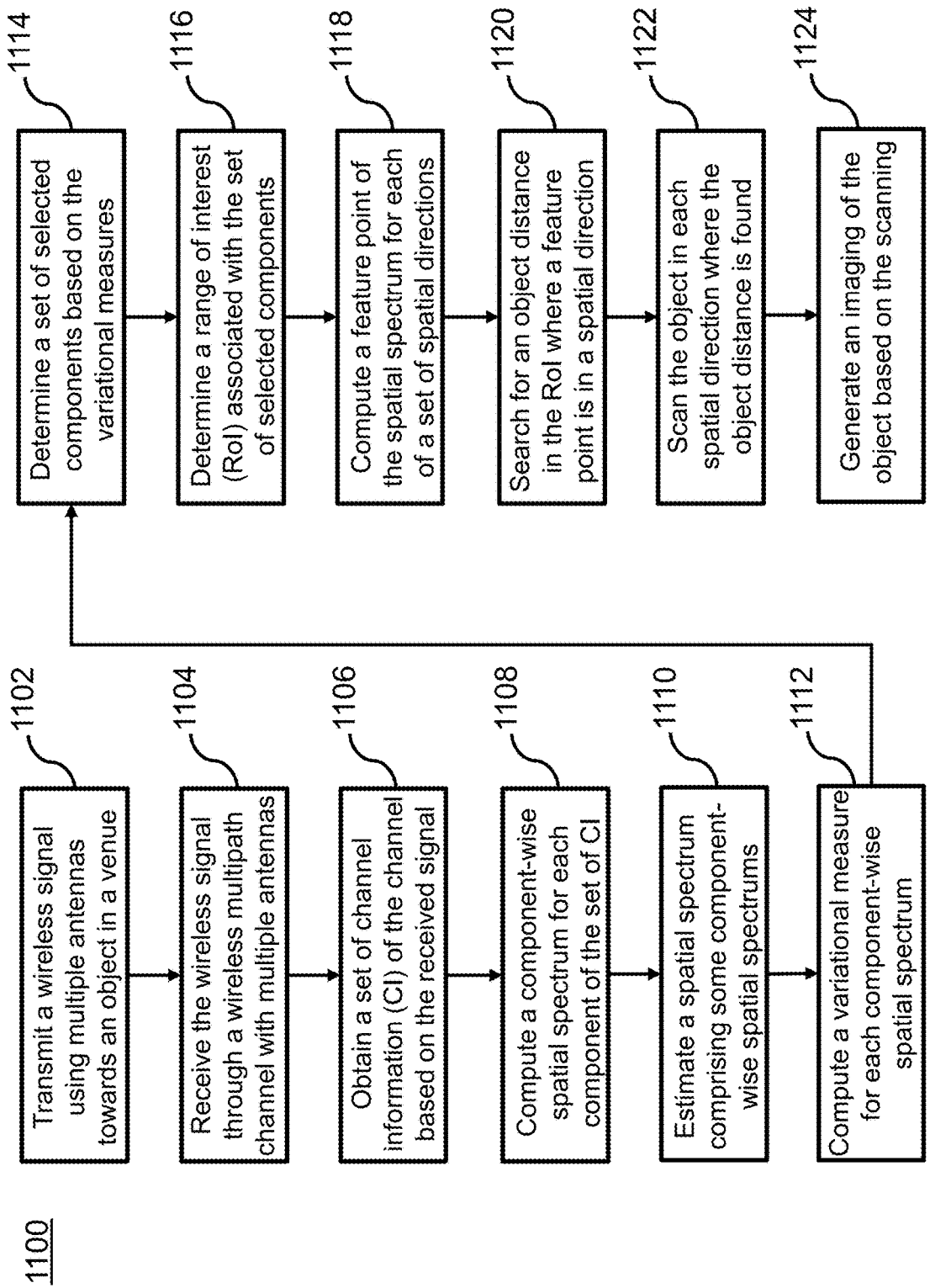
FIG. 11 illustrates a flow chart of an exemplary method for wireless object scanning, according to some embodiments of the present teaching.

FIG. 11 illustrates a flow chart of an exemplary method 1100 for wireless object scanning, according to some embodiments of the present teaching. At operation 1102, a wireless signal is transmitted using multiple antennas towards an object in a venue through a wireless multipath channel of the venue. At operation 1104, the wireless signal is received through the wireless multipath channel with multiple antennas. At operation 1106, a set of channel information (CI) of the channel is obtained based on the received wireless signal. At operation 1108, a component-wise spatial spectrum is computed for each component of the set of CI. At operation 1110, a spatial spectrum comprising one or more component-wise spatial spectrums is estimated.

At operation 1112, a variational measure is computed for each component-wise spatial spectrum. At operation 1114, a set of selected components is determined based on the variational measures. At operation 1116, a range of interest (RoI) associated with the set of selected components is determined. At operation 1118, a feature point of the spatial spectrum is computed for each of a set of spatial directions. At operation 1120, an object distance is searched for in the RoI where a feature point is in a spatial direction. At operation 1122, the object is scanned in each spatial direction where the object distance is found. At operation 1124, an imaging or a visual representation of the object is generated based on the scanning. The order of the operations in FIG. 11 may be changed in various embodiments of the present teaching.

In one embodiment, the disclosed system may be used to passively track and scan multiple users simultaneously using RF signals, e.g. mmWave signals. This system can be used for people counting, people tracking, building automation, perimeter security, workplace safety, etc. A major concern for many potential customers of video-based people counting solutions is privacy. This single concern frequently keeps them from deploying video-based people counting solutions. In contrast, the disclosed system utilizing the 60 GHz frequency can provide the people counting information in a facility to the facility manager without the privacy concerns. The disclosed system can determine whether or not there are people in a room, and a quantity of people in the room, with an imaging or a visual representation showing the quantity of the people but not the identities of the people. This can be important for applications such as management of conferences rooms, smart buildings, hotels, and much more. For example, hotels can implement smart energy efficient smart lighting or temperature control based on room occupancy.

In another example, the disclosed system can determine a trajectory or moving path of a moving object, e.g. a moving person, and show the trajectory with an imaging or a visual representation. This may be applied for tracking players in a maze of an amusement park, for monitoring intruders by security systems of homes, hotels, or for tracking runners of a long-distance race like marathon.

In one embodiment, a Type 1 device with N1 Tx antennas "illuminates" an object (e.g. a person, a pet, a thing, a living thing, a non-living thing) with a wireless probe signal (e.g. 60 GHz signal, 3.5 GHz bandwidth). The probe signal is modulated by the object (e.g. reflection, refraction, absorption, attenuation, Doppler effect, etc.). A Type 2 device with N2 Rx antennas receives the probe signal and obtains a set (e.g. N1*N2) of CI (e.g. channel state information or CSI, compressed CSI, uncompressed CSI, channel impulse response or CIR, channel frequency response or CFR, RSSI, etc.). Each CI may be associated with a pair of Tx antenna and Rx antenna. A scan (e.g. an image, a video, a depth map, a contour, a gesture recognition, a writing, a painting, a motion, a presence, an action, a material) of the object is computed based on the set of CI.

The wireless probe signal may be a probe request, a probe response, an enquiry, an acknowledgement, a response to the enquiry, a sounding signal, a beacon, a pilot signal, etc. CI may be channel state information (CSI), compressed CSI, non-compressed CSI, RSSI, channel impulse response (CIR), channel frequency response (CFR), magnitude response, phase response, etc. The Type 2 device may comprise the Type 1 device, or vice versa. The Type 2 device may be the Type 1 device.

The Type 1 device may have a first wireless chip/integrated circuit/IC to transmit the wireless signal. The Type 2 device may have a second wireless chip/integrated circuit/IC to receive the wireless signal. The Type 1 device may be the same as the Type 2 device. The first IC may be the second IC. The N1 Tx antenna may comprise the N2 Rx antennas, or vice versa. N1 may be equal to N2. The N1 Tx antennas may be next to the N2 Rx antennas. The N1 Tx antennas may be the N2 Rx antennas. The N1 Tx antennas (or the N2 Rx antennas) may be arranged in a 1-dimensional, 2-dimensional or 3-dimensional configuration and/or lattice. The 1D, 2D or 3D lattice may have a regular spacing.

For example, a 1-D/2-D/3-D configuration may have antennas uniformly spaced, or non-uniformly (e.g. pseudo-randomly, or locally uniform) spaced. For example, a 1-D configuration may have antennas arranged in a straight line (e.g. uniformly spaced or non-uniformly spaced), in multiple straight lines (e.g. outlines of a 2D or 3D shape), and/or in one or more curve in a 2-D space (e.g. a circle, an arc, a triangle, a parallelogram, a pentagon, a hexagon, a polygon, an outline of a shape, a zigzag pattern, a shape-filling line pattern) and/or 3-D space (e.g. a spiral, a curved line on a surface of a 3D object, a space-filling line pattern). For example, a 2-D configuration may have the antennas arranged in one or more rectangular lattice, circular lattice, elliptical lattice, triangular lattice, hexagonal lattice, polygonal lattice, and/or other. A 2-D configuration may have antennas arranged in a manifold, a mesh, or a curved surface (e.g. on a surface or mesh of/around/next to/related to a box, a sphere, an object, a body, a part of a body, and/or another item). For example, the 3D lattice may have 3 orthogonal axes, with characteristic spacing in each of the axis. Some nodes of the 1D, 2D or 3D lattice may be empty (not occupied).

In one embodiment, the N1 Tx antennas may be arranged in a first 2D rectangular array (with characteristics spacing's in x-direction and y-direction). The N2 Rx antennas may be arranged in a second 2D rectangular array. The normal direction (i.e. perpendicular direction) of the first rectangular array may be parallel to the normal direction of the second rectangular array. The first and second rectangular arrays may be coplanar. The Tx antenna array and Rx antenna arrays may be next to each other (e.g. less than 20 cm, or 10 cm, or 5 cm apart). While most locations of an array may be each occupied by, or associate with, one or more antenna, there may be one or more locations of the array not being occupied or associated with any antenna. One of the rectangular arrays may have an "axis" (e.g. a line in normal direction) in the "center" of the array. The "center" may be, or near, the center of gravity of the array. The array may be "aimed" at an object by having the axis close to the object. In other words, the object may enter the array's "monitoring area" by entering an area that the array is "aiming" at. The object may be on the axis. Or, the angle between the "axis" and an imaginary straight line connecting the "center" of the array and the object may be small (e.g. less than 10 degree, or 5 degree, or 1 degree, or another angle). First or second lattice may be a rectangular, or non-rectangular, array. It may be locally rectangular, or triangular, or hexagonal, or circular, or other lattice patterns. It may be a hybrid lattice with two rectangular lattices at an angle to each other.

In one embodiment, an overall algorithm of the mmEye includes the following: (a) preprocessing of CI; (b) spatial spectrum estimation based on CI; (c) object detection based on spatial spectrum; and (d) scanning of object.

In one embodiment, preprocessing comprises at least two steps: (a1) background cancellation and (a2) noise cancellation. The background cancellation may include: (1) collecting background CI from training probe signal(s) when object is absent (not present in venue) and (2) suppressing the effect of background CI on the set of CI. Because the object is absent, the background CI differs from the probe signal only due to the background multipath channel. The training probe signal may be the same as the probe signal.

In one embodiment, a possible way of "suppressing effect" of background CI is disclosed. The combined background CI may be computed by averaging (i.e. mean), weighted averaging (weighted mean), averaging after scaling (similar to weighted averaging), trimmed mean (e.g. by removing "extreme" or "untrustworthy" ones and then averaging), median, etc. Scaling may be used/applied to account for automatic gain control (AGC) module on the chip, or antennas with different gain.

In one embodiment, another possible way of "suppressing effect" of background CI is disclosed. The combined background CI may be computed based on weighted average (e.g. with equal or unequal weights) of the at least one set of background CI, or a subset of it. For example, a trimmed mean may be obtained by not including "extreme" or "untrustworthy" ones in the subset. The weight may be used to scale each background CI to account for AGC (during training, when object is absent) or antennas with different gain. The scaling before subtraction may be used to account for AGC (during scanning of the object).

For spatial spectrum estimation, each component may be associated with an index, a time delay or a distance. For CI being CIR with multiple taps, a tap may be a component. The magnitude (or phase) of a tap, or a function of it, may be a component. For CI being CFR with multiple subcarriers, a subcarrier (or its magnitude, or phase), and/or a function of it, may be a component. The computation may be based on MUSIC algorithm, a MUSIC-like algorithm, and/or another algorithm.

Spatial spectrum estimation may be performed for a particular component based on a combined correlation matrix associated with the particular component. The correlation matrix may be replaced by a covariance matrix. The correlation matrix or covariance may comprise (e.g. may be a function of) a steering matrix. The combined correlation matrix may be a linear combination, an average, a weighted average, and/or another combination of at least one correlation matrix associated with the particular component. For example, the at least one correlation matrix may be a number of 4×4 subarrays from a 6×6 Rx (antenna) array. Or, the at least one correlation matrix may be a number of 6×6 arrays associated with a 6×6 Rx antenna array. Each of the number of 6×6 arrays may be associated with a Tx antenna. There may be only one correlation matrix such that the combined correlation matrix is the correlation matrix.

For each radial direction (azimuth, elevation), a feature point (e.g. first local max) of the spatial spectrum may be found. The radial direction may be with respect to a point of the Rx antenna array or the Tx antenna array. The point may be a center, or a centroid, or one of the Rx/Tx antenna, or another point. The object may be scanned by declaring whether the object is found in that radial direction, and if found, declaring its distance (from a point associated with the receiving antennas, e.g. center of gravity of Rx antenna array). Scanning the object may include: identifying a set of PoI; computing object depth based on depth of all PoI. The object depth may be computed by some optimization (e.g. minimizing weighted square error, or plane fitting).

In a bi-static setup, Type 1 (Tx) and Type 2 (Rx) devices are two different devices placed at two different locations in the venue. In a monostatic setup (Radar-like), Type 1 (Tx) and Type 2 (Rx) devices are collocated (placed at the same location or similar location, e.g. in the same machine/device/housing/mounting/circuit/circuit board/module/chip) in the venue. In one embodiment, the Type 1 (Tx) device and the Type 2 (Rx) device are the same device.

The features described above may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., C, Java), including compiled or interpreted languages, and it may be deployed in any form, including as a stand-alone program or as a module, component, subroutine, a browser-based web application, or other unit suitable for use in a computing environment.

Suitable processors for the execution of a program of instructions include, e.g., both general and special purpose microprocessors, digital signal processors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

While the present teaching contains many specific implementation details, these should not be construed as limitations on the scope of the present teaching or of what may be claimed, but rather as descriptions of features specific to particular embodiments of the present teaching. Certain features that are described in this specification in the context of separate embodiments may also be implemented in combination in a single embodiment. Conversely, various features that are described in the context of a single embodiment may also be implemented in multiple embodiments separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Particular embodiments of the subject matter have been described. Any combination of the features and architectures described above is intended to be within the scope of the following claims. Other embodiments are also within the scope of the following claims. In some cases, the actions recited in the claims may be performed in a different order and still achieve desirable results. In addition, the processes depicted in the accompanying figures do not necessarily require the particular order shown, or sequential order, to achieve desirable results. In certain implementations, multitasking and parallel processing may be advantageous.

We claim:

1. A wireless scanning system, comprising:
a transmitter configured for transmitting a first wireless signal using a plurality of transmit antennas towards an object in a venue through a wireless multipath channel of the venue;
a receiver configured for receiving a second wireless signal using a plurality of receive antennas through the wireless multipath channel between the transmitter and the receiver, wherein the second wireless signal differs from the first wireless signal due to the wireless multipath channel and a modulation of the first wireless signal by the object; and
a processor configured for:
obtaining a set of channel information (CI) of the wireless multipath channel based on the second wireless signal received by the receiver, wherein
each CI in the set is associated with a respective one of the plurality of transmit antennas and a respective one of the plurality of receive antennas,
each CI in the set comprises a plurality of components,
computing a spatial spectrum comprising a number of component-wise spatial spectrums based on the set of CI, wherein each component-wise spatial spectrum is associated with a component of the set of CI,
determining a set of selected components associated with the object based on the spatial spectrum, and
computing an imaging of the object based on at least one of: the set of CI, the spatial spectrum, the component-wise spatial spectrum, or the set of selected components, wherein the imaging comprises at least one of:
a visual representation, processed representation, filtered representation, enhanced representation, augmented representation, presentation, pseudo-colored presentation, animation, rendering, augmented reality (AR) representation, virtual reality (VR) representation, multi-dimensional representation, depth map, contour map, a scanning, multi-dimensional imaging, 4 dimensional (4D) imaging, 3D imaging, 2D imaging, 4D representation, 3D representation, 2D representation, projection, 3D projection, 2D projection, a silhouette; a shape, a surface, animated projection, an imaging of action, movement, gesture, activity, timing, pace, frequency, period, duration, or an anomaly.

2. The wireless scanning system of claim 1, wherein:
the plurality of transmit antennas are arranged in a first lattice with at least one first characteristic spacing; and
the plurality of receive antennas are arranged in a second lattice with at least one second characteristic spacing.

3. The wireless scanning system of claim 1, wherein the processor is further configured for:
preprocessing the set of CI;
estimating the spatial spectrum based on the set of CI;
computing an object detection of the object based on the estimated spatial spectrum; and
computing the imaging of the object by scanning the object based on at least one of: the object detection, the estimated spatial spectrum, or the preprocessing of the set of CI.

4. The wireless scanning system of claim 1, wherein the processor is further configured for:
computing a background cancellation and/or a noise cancellation of the set of CI; and
preprocessing the set of CI based on at least one of: the background cancellation or the noise cancellation.

5. The wireless scanning system of claim 1, wherein:
the transmitter is further configured for transmitting at least one wireless training probe signal using the plurality of transmit antennas through the wireless multipath channel of the venue when the object is absent in the venue;
the receiver is further configured for receiving the at least one wireless training probe signal using the plurality of receive antennas;
the processor is further configured for:
obtaining at least one set of background CI of the wireless multipath channel when the object is absent based on the at least one received wireless training probe signal, wherein each background CI is associated with a respective one of the plurality of transmit antennas and a respective one of the plurality of receive antennas when the object is absent, and
computing a background cancellation of the set of CI by suppressing an effect of the at least one set of background CI on the set of CI.

6. The wireless scanning system of claim 5, wherein the processor is further configured for:
computing a set of combined background CI based on the at least one set of background CI; and
computing the background cancellation of the set of CI by subtracting the set of combined background CI from the set of CI.

7. The wireless scanning system of claim 5, wherein the processor is further configured for:
computing a set of characteristic background CI based on a weighted averaging of a subset of the at least one set of background CI; and
computing the background cancellation of the set of CI by scaling the set of characteristic background CI and subtracting the set of scaled characteristic background CI from the set of CI.

8. The wireless scanning system of claim 7, wherein the scaling is performed based on at least one of: a minimum mean square error (MANSE) estimation, a minimum mean absolute error (MMAE) estimation, a maximum likelihood (ML), or a maximum posterior probability (MAP).

9. The wireless scanning system of claim 1, wherein the processor is further configured for:
computing a spatial spectrum estimation based on at least one of: a multiple signal classification (MUSIC) algorithm, a MUSIC-like algorithm, a beamforming algorithm, minimum variance distortionless response (MVDR) beamforming, compression sensing (CS) based beamforming, a beamforming variant, a singular value decomposition (SVD), an eigen-decomposition, an Akaike Information Criterion (AIC), Bayesian information Criterion (BIC), Generalized Information Criterion (GIC), a criterion variant, a model order selection algorithm, a signal subspace determination, a noise subspace determination, or a projection.

10. The wireless scanning system of claim 1, wherein:
each CI in the set comprises a plurality of components each of which is associated with at least one of: an index, a frequency, a subcarrier, a time delay, a time of flight, a distance, a distance of flight, a distance from a transmit antenna, a distance from a receive antenna, a distance from a center of the plurality of transmit antennas, or a distance from a center of the plurality of receive antennas; and
the processor is further configured for computing a spatial spectrum estimation based on a particular component of a CI.

11. The wireless scanning system of claim 1, wherein:
each CI in the set comprises a plurality of components; and
for each component of the set of CI, the processor is further configured for:
computing at least one correlation matrix based on the component,
computing a combined correlation matrix based on the at least one correlation matrix, and
computing a component-wise spatial spectrum estimation associated with the component based on the combined correlation matrix.

12. The wireless scanning system of claim 1, wherein:
each CI in the set comprises a plurality of components; and
for each component of the set of CI, the processor is further configured for:
computing a current correlation matrix based on the component,
computing an additional correlation matrix based on the component of an additional set of CI, wherein the additional set of CI is obtained based on another wireless signal received by the receiver from the transmitter,
computing a combined correlation matrix based on the current correlation matrix and the additional correlation matrix, and
computing a component-wise spatial spectrum estimation associated with the component based on the combined correlation matrix.

13. The wireless scanning system of claim 1, wherein:
the plurality of transmit antennas includes N1 transmit antennas, where N1 is a positive integer;
the plurality of receive antennas includes N2 receive antennas, where N2 is a positive integer;
each CI in the set comprises a plurality of components; and
for each component of the set of CI, the processor is further configured for:
for each of the N1 transmit antennas of the transmitter:
determining N2 CI each of which being associated with the transmit antenna of the transmitter and a respective one of the N2 receive antennas of the receiver,
determining a N2-dimensional vector comprising the component of each of the N2 CI, and
computing a respective N2×N2 correlation matrix comprising the N2-dimensional vector multiplied by its conjugate transpose, to obtain N1 correlation matrices each having a dimension of N2×N2,
computing a N2×N2 combined correlation matrix comprising a weighted average of the N1 correlation matrices, and
computing a component-wise spatial spectrum estimation associated with the component based on at least one of: the component of each of the set of CI, the N1 correlation matrices, or the combined correlation matrix.

14. The wireless scanning system of claim 1, wherein:
the plurality of transmit antennas includes N1 transmit antennas, where N1 is a positive integer;
the plurality of receive antennas includes N2 receive antennas, where N2 is a positive integer;
each CI in the set comprises a plurality of components; and
for each component of the set of CI, the processor is further configured for:
for each of the N2 receive antennas of the receiver:
determining N1 CI each of which being associated with the receive antenna of the receiver and a respective one of the N1 transmit antennas of the transmitter,
determining a N1-dimensional vector comprising the component of each of the N1 CI, and
computing a respective N1×N1 correlation matrix comprising the N1-dimensional vector multiplied by its conjugate transpose, to obtain N2 correlation matrices each having a dimension of N1×N1,
computing a N1×N1 combined correlation matrix comprising a weighted average of the N2 correlation matrices, and
computing a component-wise spatial spectrum estimation associated with the component based on at least one of: the component of each of the set of CI, the N2 correlation matrices, or the combined correlation matrix.

15. The wireless scanning system of claim 1, wherein:
each component is associated with a respective distance;
the set of selected components is associated with a range of interest (RoI) comprising a range of distance;
for each of a set of spatial directions associated with an azimuth and an elevation, the processor is further configured for searching for an object distance in the RoI such that the spatial spectrum associated with the object distance and the spatial direction is a feature point,
the spatial spectrum at the feature point is greater than a threshold;
the feature point comprises at least one of: a local maximum, a first local maximum, a global maximum, a local minimum, a first local minimum, or a global minimum.

16. The wireless scanning system of claim 1, wherein, for each component, the processor is further configured for:
computing a variational measure based on a component-wise spatial spectrum with respect to the component, wherein the variational measure comprises at least one of: a standard deviation, a variance, a central moment, a high order statistics, a measure of variability, a measure of variation, a measure of spread, a measure of dispersion, a measure of deviation, range, interquartile range, total variation, absolute deviation, or total deviation; and determining whether to select the component as one of the set of selected components based on the variational measure.

17. The wireless scanning system of claim 16, wherein a component is selected when the corresponding variational measure is larger than a corresponding adaptive threshold.

18. The wireless scanning system of claim 1, wherein:
the processor is further configured for computing a feature point of the spatial spectrum for each of a set of spatial directions;
each of the set of spatial directions is associated with an azimuth and an elevation;
the spatial spectrum at the feature point is greater than a threshold;
the feature point comprises at least one of: a local maximum, a first local maximum, a global maximum, a local minimum, a first local minimum, or a global minimum; and
the feature point is associated with one of the set of selected components.

19. The wireless scanning system of claim 15, wherein:
the processor is further configured for determining the object is present at a point at the object distance in the spatial direction, when the object distance is found; and
the processor is further configured for determining the object is not present in the spatial direction, when the object distance is not found.

20. The wireless scanning system of claim 19, wherein the processor is further configured for:
identifying a set of point-of-interests (PoIs), wherein each PoI in the set of PoIs is a point in one of the set of spatial directions at a corresponding object distance where the object is determined to be present;
computing a rectangular coordinate for each PoI the rectangular coordinate comprising at least one of: a length, a width or a depth; and
computing an object depth based on the depth of each PoI.

21. The wireless scanning system of claim 20, wherein the object depth is computed based on at least one of:
a plane fitting of the set of PoIs,
projecting a plane for the set of PoIs,
projecting a plane for a subset of PoIs that are close enough to the projected plane,
minimizing a cost comprising mean square error (MSE) or total square error,
minimizing a cost comprising weighted mean of square error or weighted square error,
minimizing a cost comprising trimmed mean of square error,
minimizing a cost comprising a sorting of square error,
minimizing a cost comprising mean absolute error (MAE) or total absolute error,
minimizing a cost comprising weighted mean of absolute error or weighted absolute error,
minimizing a cost comprising trimmed mean of absolute error,
minimizing a cost comprising a sorting of absolute error,
maximum likelihood (ML),
maximum aposterior probability (MAP), or
a selection of PoI close enough to the projected plane.

22. The wireless scanning system of claim 1, wherein the processor is further configured for performing at least one of:
processing the imaging of the object;
analyzing the imaging of the object;
computing an analytics associated with the object based on the imaging of the object;
performing a task associated with the object based on the imaging of the object, wherein the task comprises at least one of:
detecting a motion of the object,
detecting a gesture of the object,
detecting a vital sign/breathing/heartbeat of the object,
monitoring a sleep of the object,
monitoring a movement/location/speed/velocity/acceleration of the object,
monitoring a gait/daily activity of the object,
monitoring a fall/an accident/a danger of the object,
monitoring a well-being/health-related condition of the object,
detecting a handwriting by the object,
detecting a presence/absence of the object,
detecting a biometric of the object, or
recognizing the object;
storing at least one of: the set of CI, the imaging of the object; the analytics, or an information of the task;
making available at least one of: the set of CI, the imaging of the object, the analytics, or an information of the task;
communicating to another device at least one of: the set of CI, the imaging of the object, the analytics, or an information of the task; or
presenting at least one of: the set of CI, the imaging of the object, the analytics, or an information of the task.

23. The wireless scanning system of claim 1, wherein the transmitter and the receiver are placed in at least one of the following manners:
placed at two different locations in the venue;
collocated and placed at similar locations in the venue;
coupled together as a same device comprising an integrated circuit (IC) that transmits and receives wireless signals; or
coupled together as a same device comprising the and the processor.

24. The wireless scanning system of claim 1, wherein:
there are multiple pairs of transmitters and receivers in the venue;
a respective receiver of each pair receives a respective wireless signal asynchronously transmitted from a respective transmitter of the pair and obtains asynchronously a respective set of CI;
at least one pair of transmitter and receiver are collocated;
at least one pair of transmitter and receiver are placed at two different locations in the venue; and
the imaging of the object is generated based on the sets of CI.

25. The wireless scanning system of claim 1, wherein at least one of the transmitter and the receiver is associated with an identifier (ID).

26. An apparatus for wireless scanning in a venue where a transmitter and a receiver are located, comprising:
at least one of the transmitter and the receiver, wherein:
the transmitter is configured for transmitting a first wireless signal using a plurality of transmit antennas towards an object in a venue through a wireless multipath channel of the venue, the receiver is configured for receiving a second wireless signal using a plurality, of receive antennas through the wireless multipath channel between the transmitter and the receiver, and the second wireless signal differs from the first wireless signal due to the wireless multipath channel and a modulation of the first wireless signal by the object; and a processor configured for:
   obtaining a set of channel information (CI) of the wireless multipath channel based on the second wireless signal, wherein each CI in the set is associated with a respective one of the plurality of transmit antennas and a respective one of the plurality of receive antennas, wherein each CI in the set comprises a plurality of components,
   for each component of the set of CI:
     computing at least one correlation matrix based on the component,
     computing a combined correlation matrix based on the at least one correlation matrix, and
     computing a component-wise spatial spectrum estimation associated with the component based on the combined correlation matrix, and
   computing an imaging of the object based on at least one of: the set of CI, the at least one correlation matrix, the combined correlation matrix, or the component-wise spatial spectrum.

27. The apparatus of claim 26, wherein:
the transmitter is further configured for transmitting at least one wireless training probe signal using the plurality of transmit antennas through the wireless multipath channel of the venue when the object is absent in the venue;
the receiver is further configured for receiving the at least one wireless training probe signal using the plurality of receive antennas;
the processor is further configured for:
   obtaining at least one set of background CI of the wireless multipath channel when the object is absent based on the at least one received wireless training probe signal, wherein each background CI is associated with a respective one of the plurality of transmit antennas and a respective one of the plurality of receive antennas when the object is absent, and
   computing a background cancellation of the set of CI by suppressing an effect of the at least one set of background CI on the set of CI.

28. The apparatus of claim 26, wherein the processor is further configured for:
estimating a spatial spectrum comprising a number of component-wise spatial spectrums based on the set of CI; and
computing an object detection of the object based on the estimated spatial spectrum; and
scanning the object to generate the imaging of the object based on at least one of the object detection or the estimated spatial spectrum.

29. A method, implemented by a processor, a memory communicatively coupled with the processor, and a set of instructions stored in the memory to be executed by the processor, comprising:
obtaining a set of channel information (CI) of a wireless multipath channel of a venue, wherein:
   a transmitter transmits a first wireless signal using a plurality of transmit antennas towards an object in a venue through the wireless multipath channel of the venue;
   a receiver receives a second wireless signal using a plurality of receive antennas through the wireless multipath channel and computes the set of CI of the wireless multipath channel based on the second wireless signal, and
   the second wireless signal differs from the first wireless signal due to the wireless multipath channel and a modulation of the first wireless signal by the object;
obtaining at least one set of background CI of the wireless multipath channel based on at least one wireless training signal transmitted from the transmitter to the receiver when the object is absent in the venue;
computing a background cancellation of the set of CI by suppressing an effect of the at least one set of background CI on the set of CI; and
computing an imaging of the object based on the set of CI.

30. The method of claim 29, further comprising:
processing the imaging of the object;
computing an analytics associated with the object based on the imaging of the object;
performing a task associated with the object based on the imaging of the object; and storing at least one of: the set of CI, the imaging of the object, the analytics, or an information of the task.

* * * * *